Nov. 12, 1957 B. A. RUNDE ET AL 2,812,902
ACCOUNTING APPARATUS
Filed June 1, 1955 26 Sheets-Sheet 5

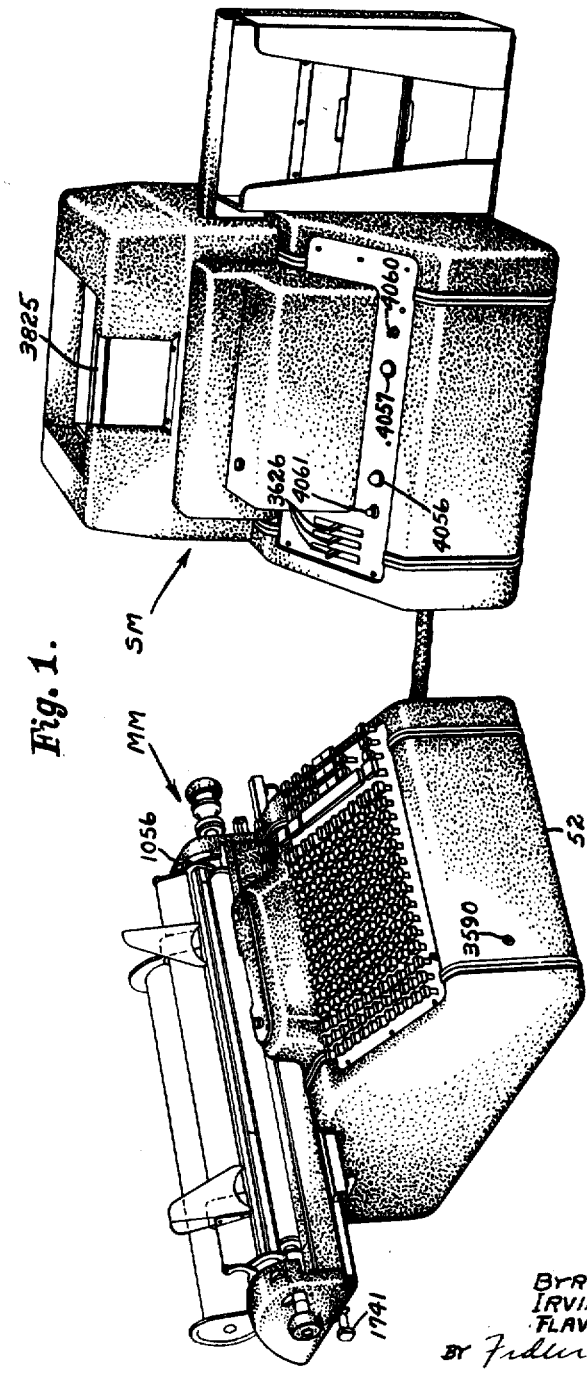

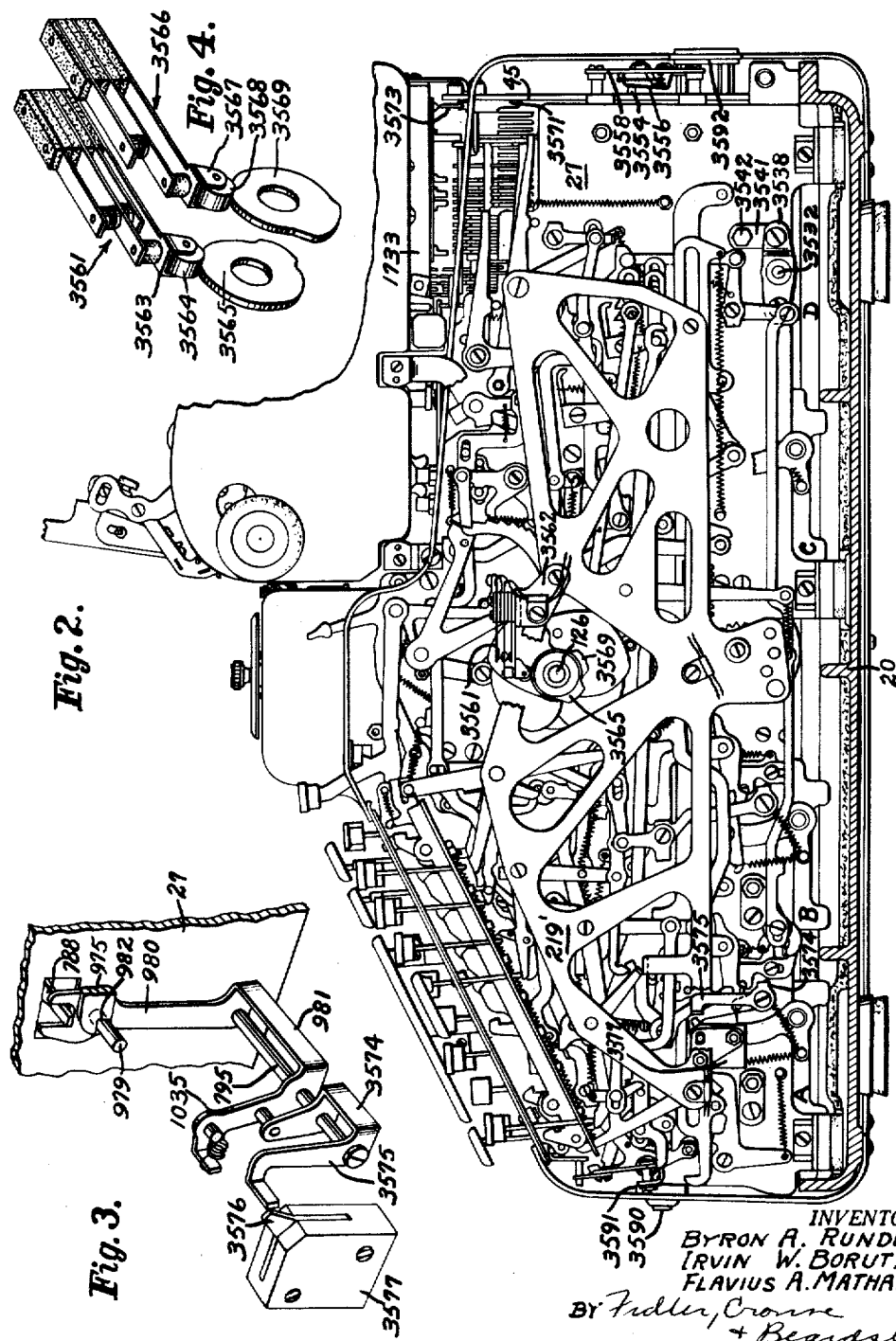

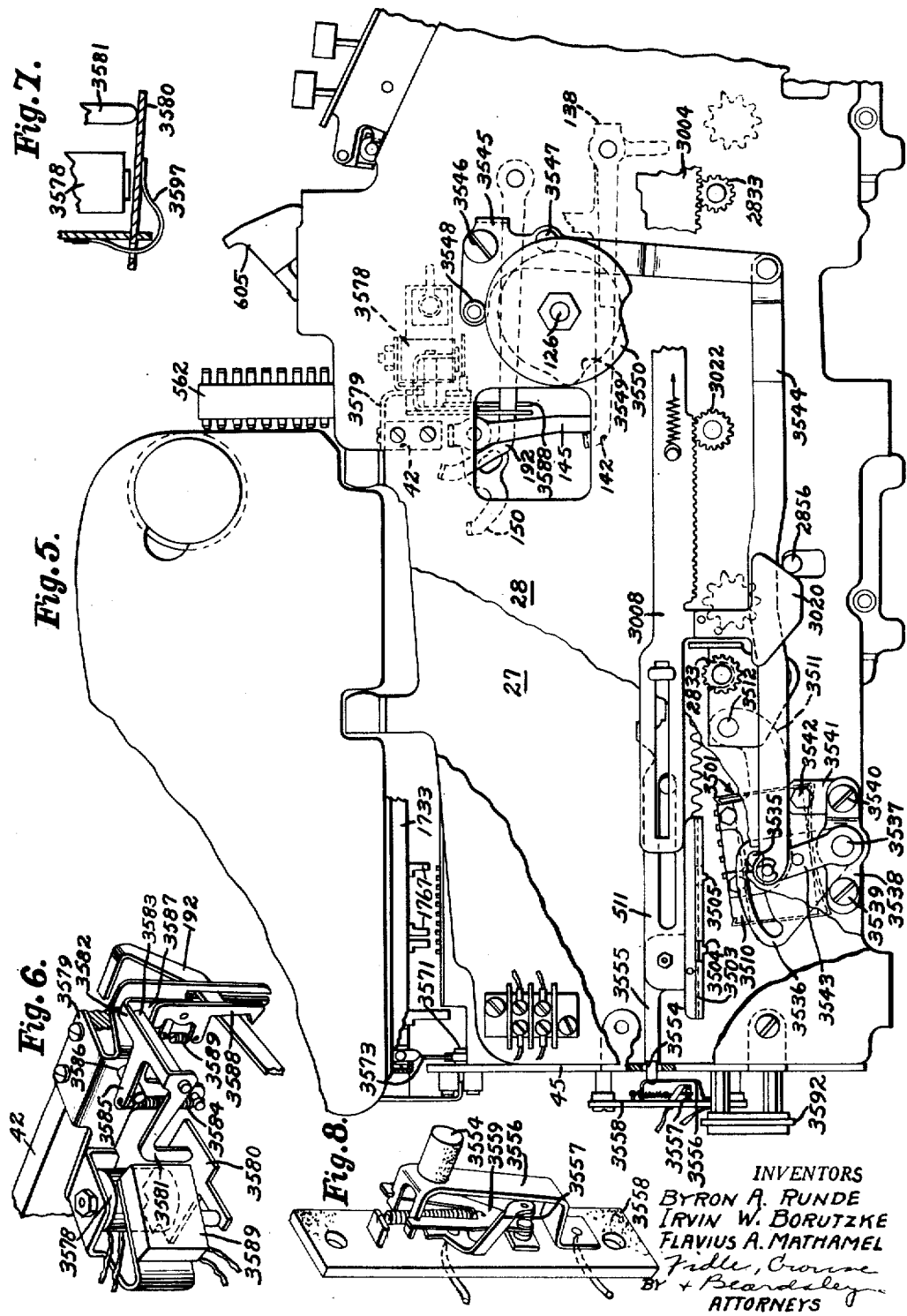

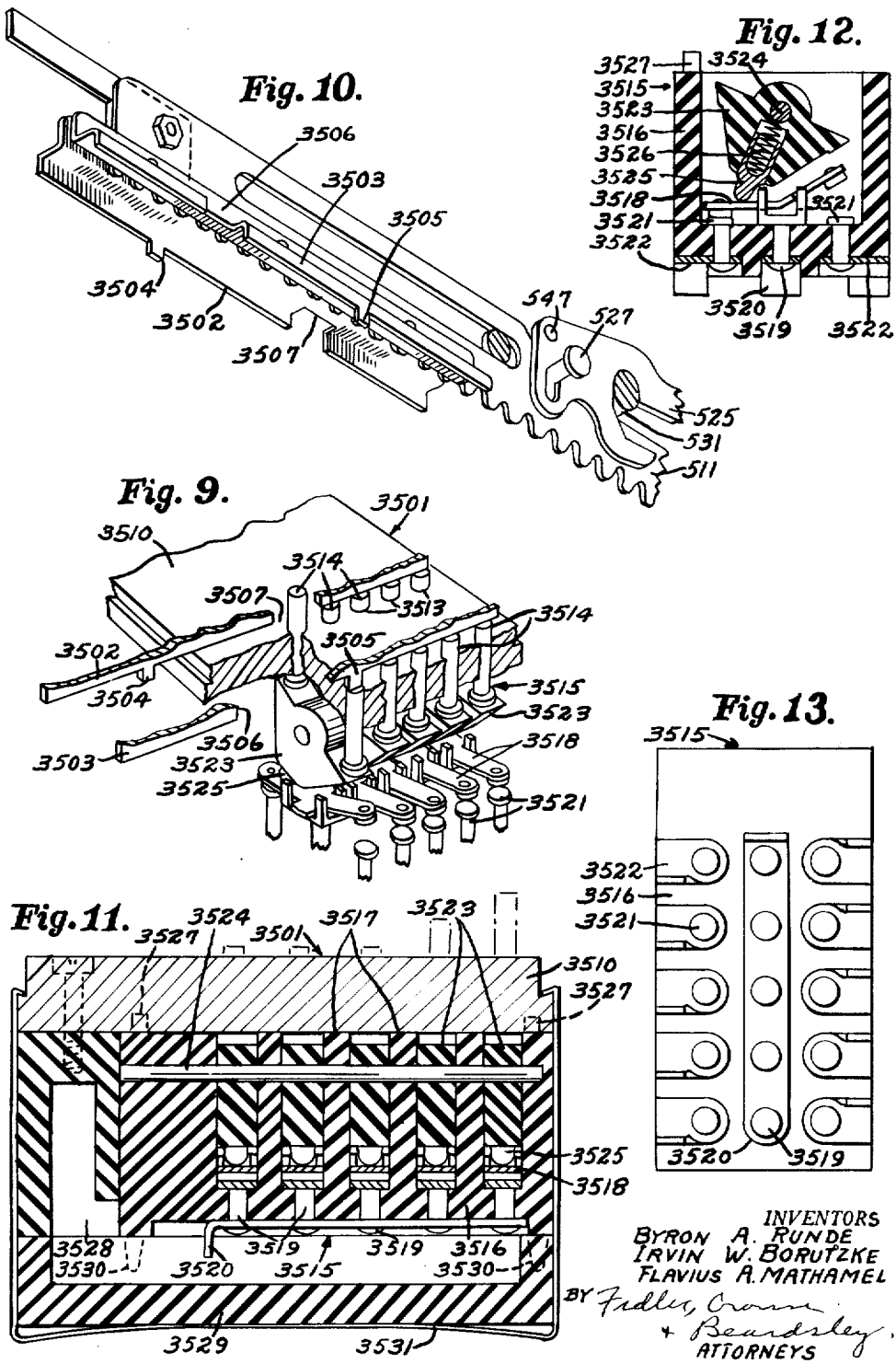

INVENTORS
BYRON A. RUNDE
IRVIN W. BORUTZKE
FLAVIUS A. MATHAMEL
BY Fidler, Crowne
& Beardsley
ATTORNEYS

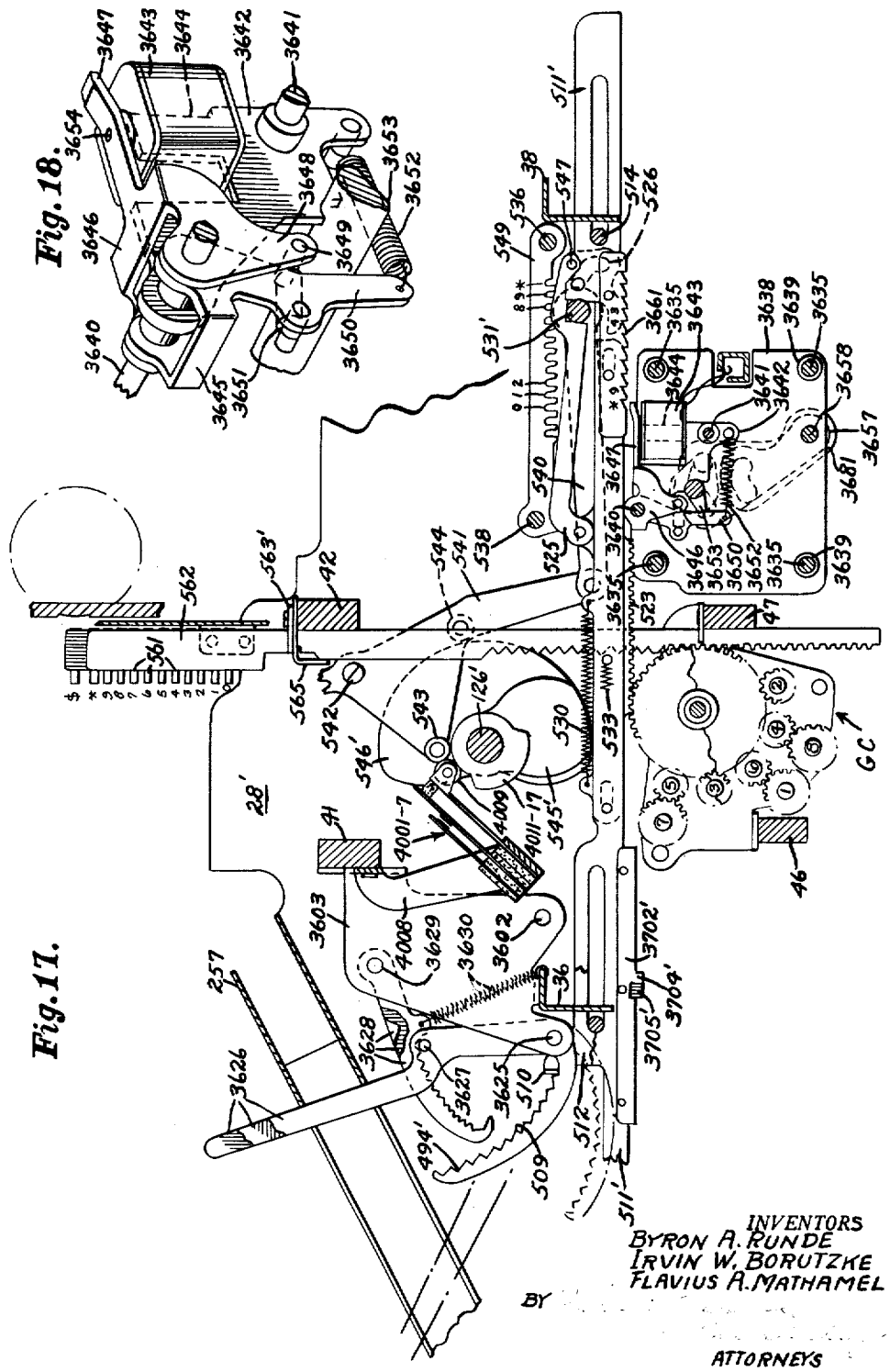

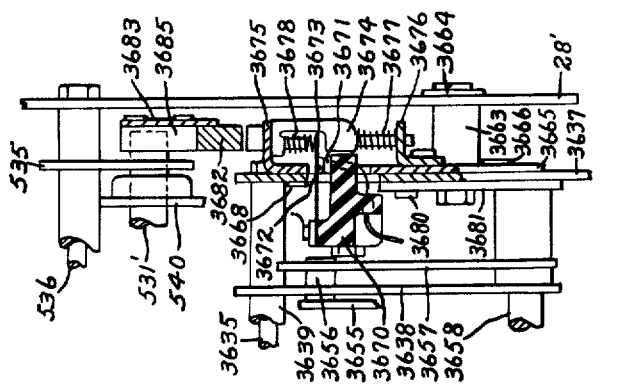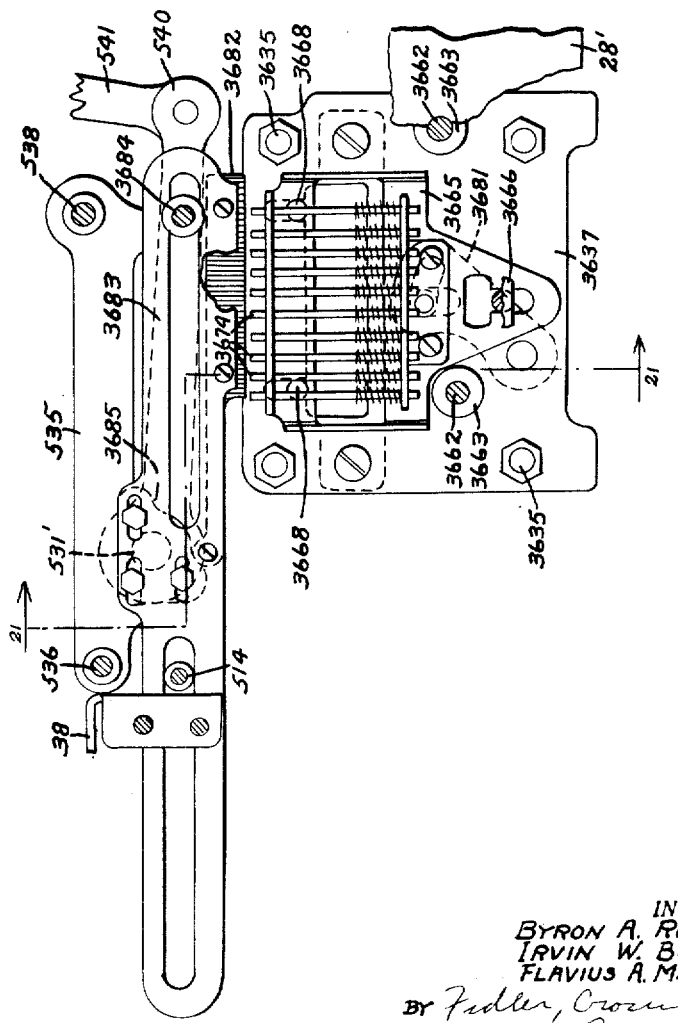

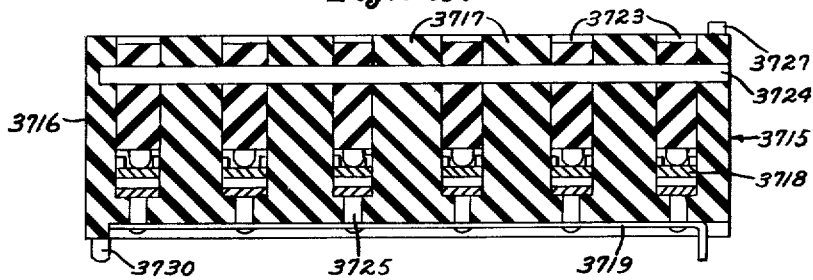
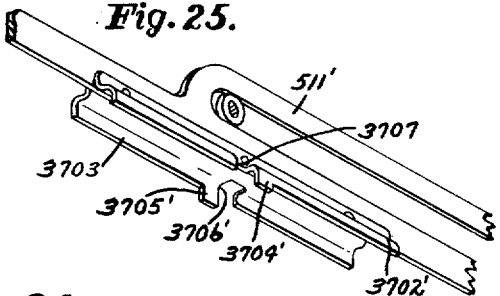
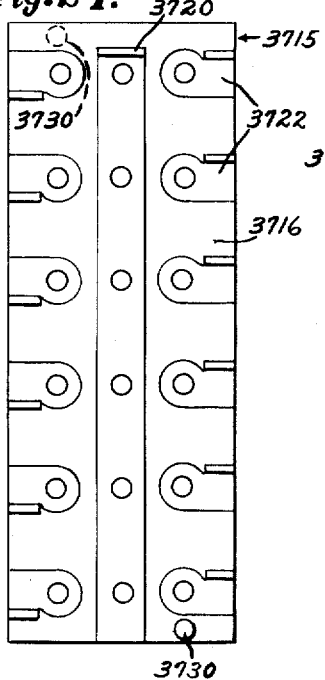
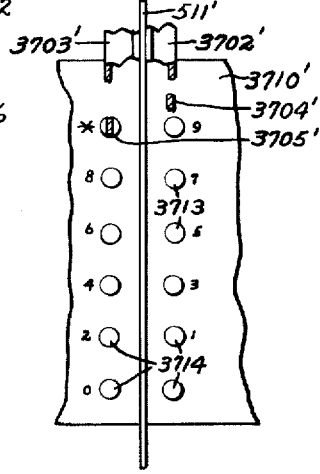
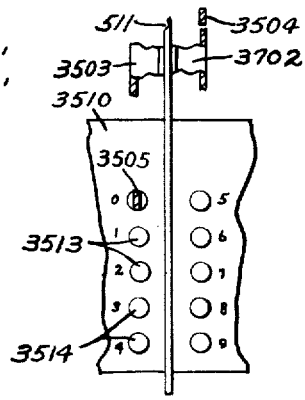

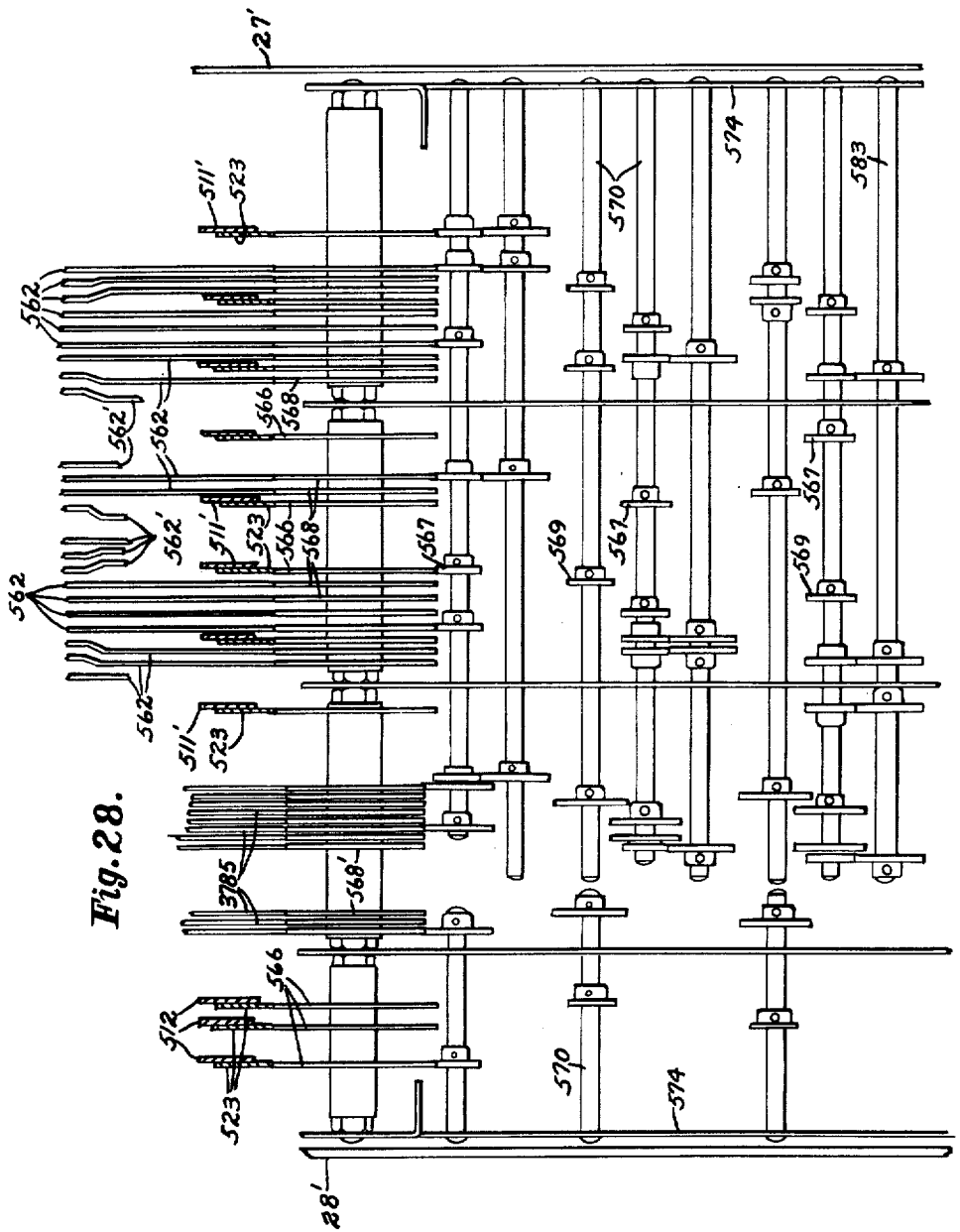

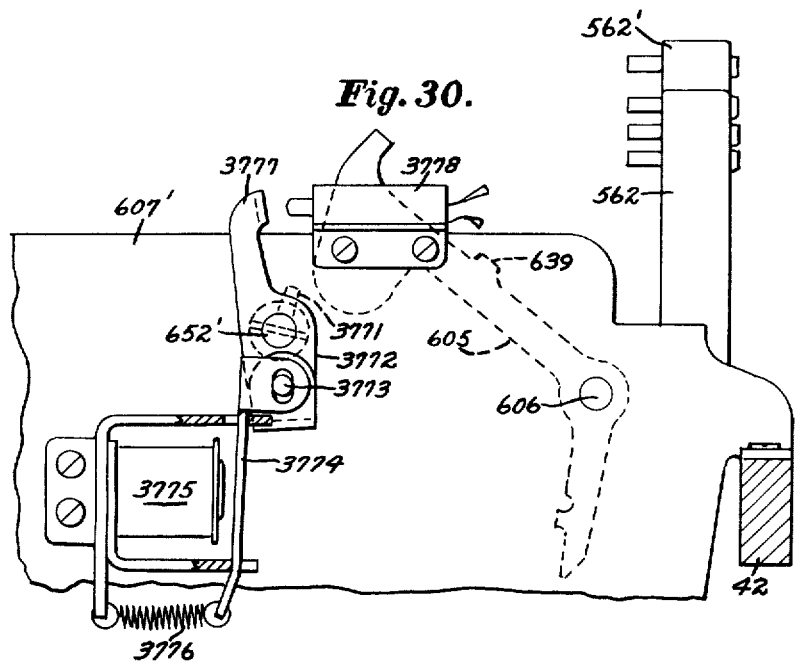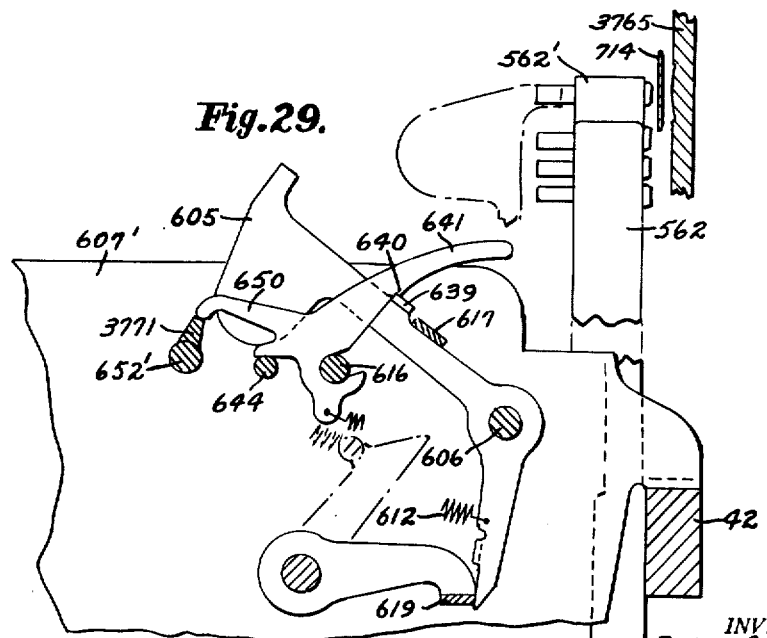

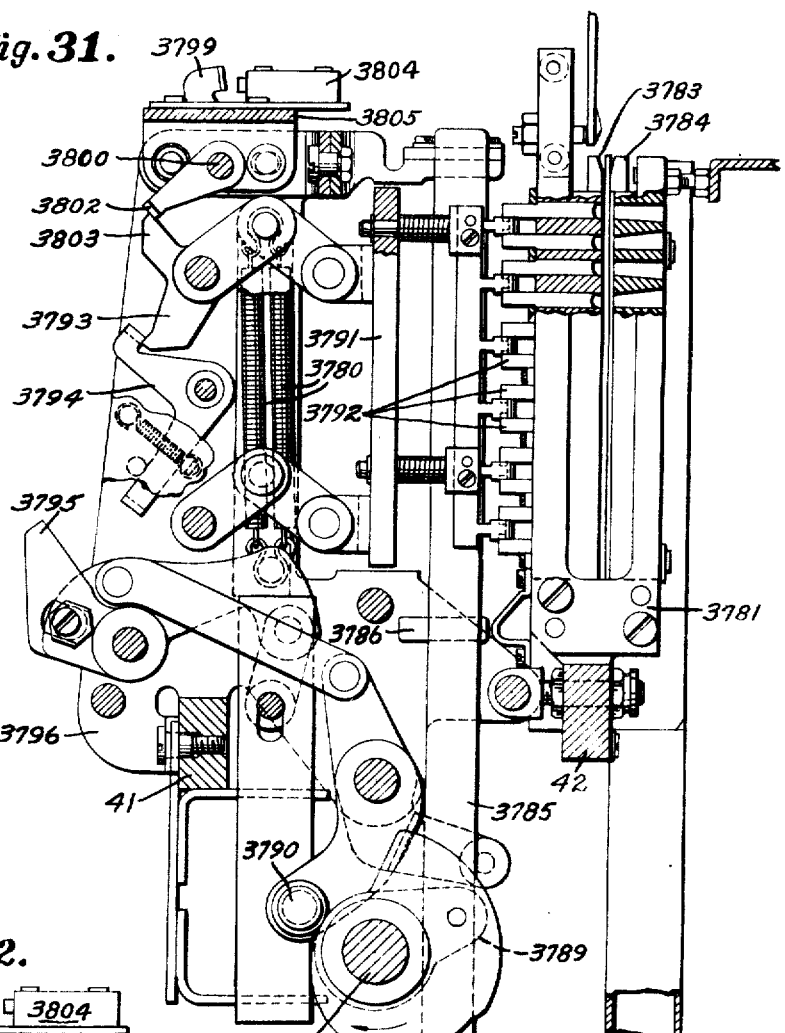
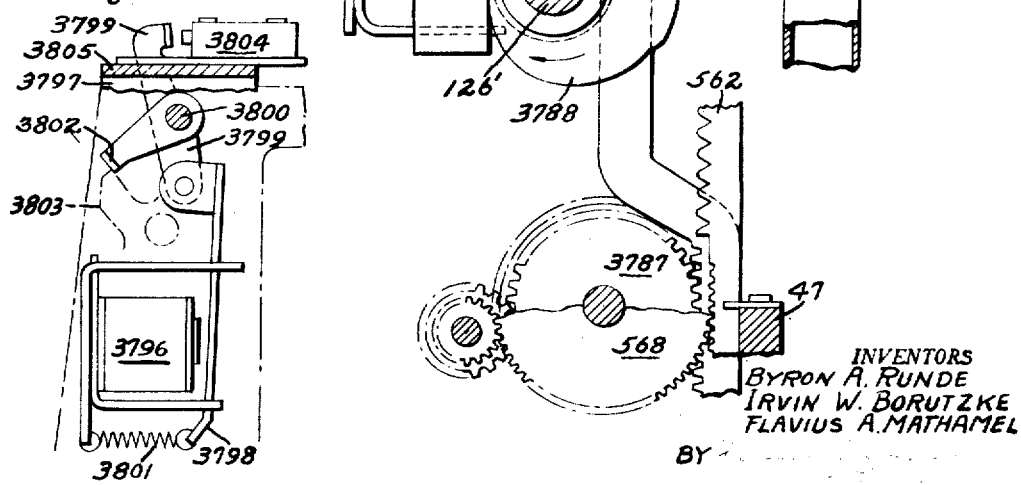

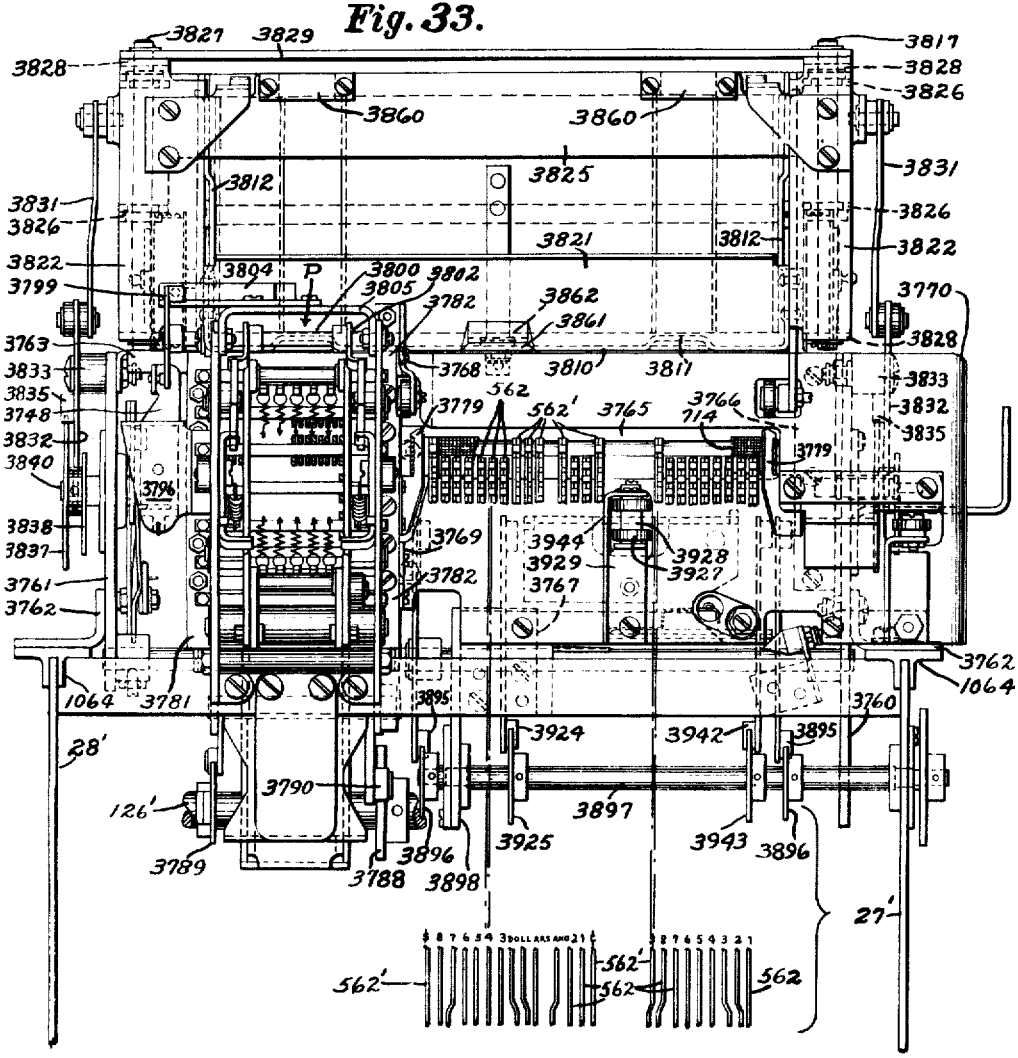

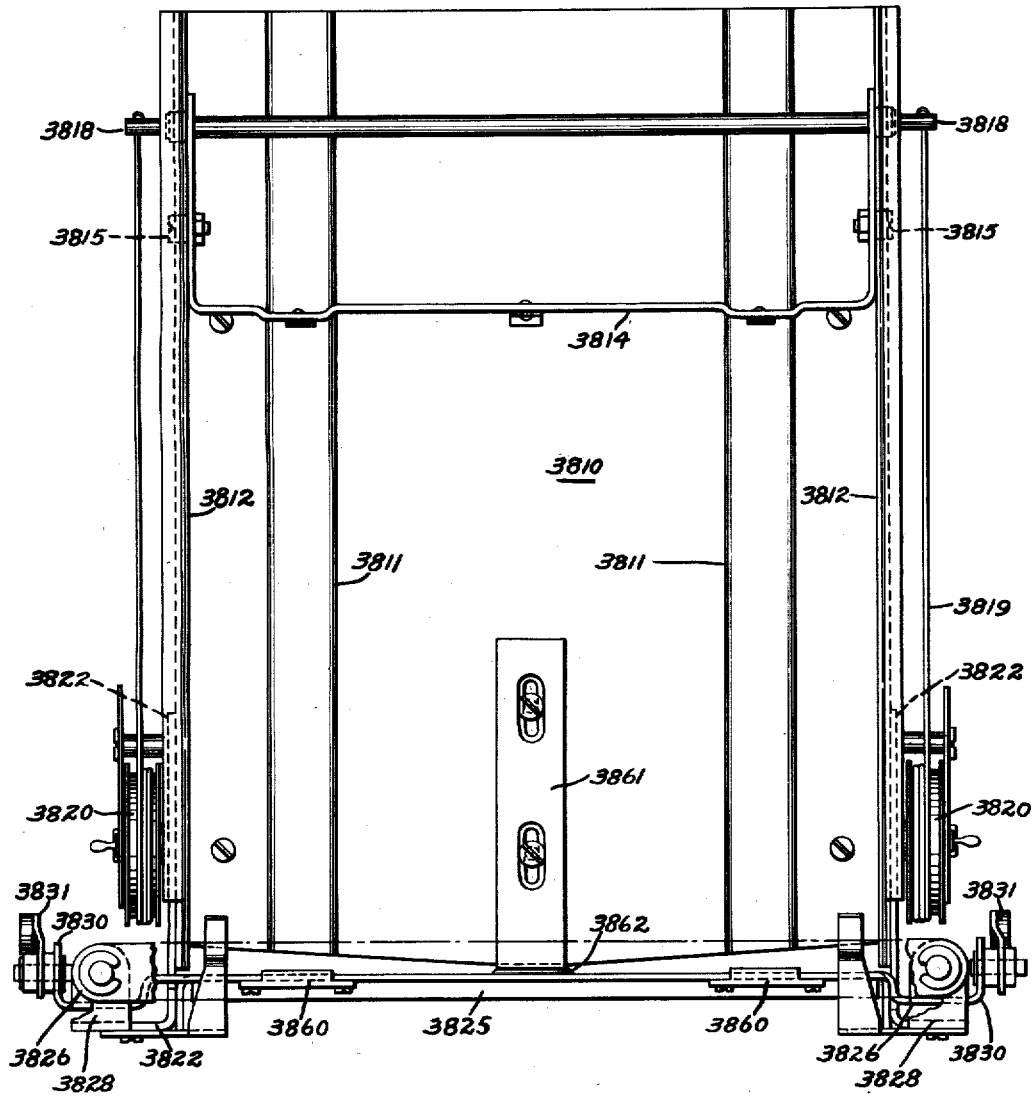

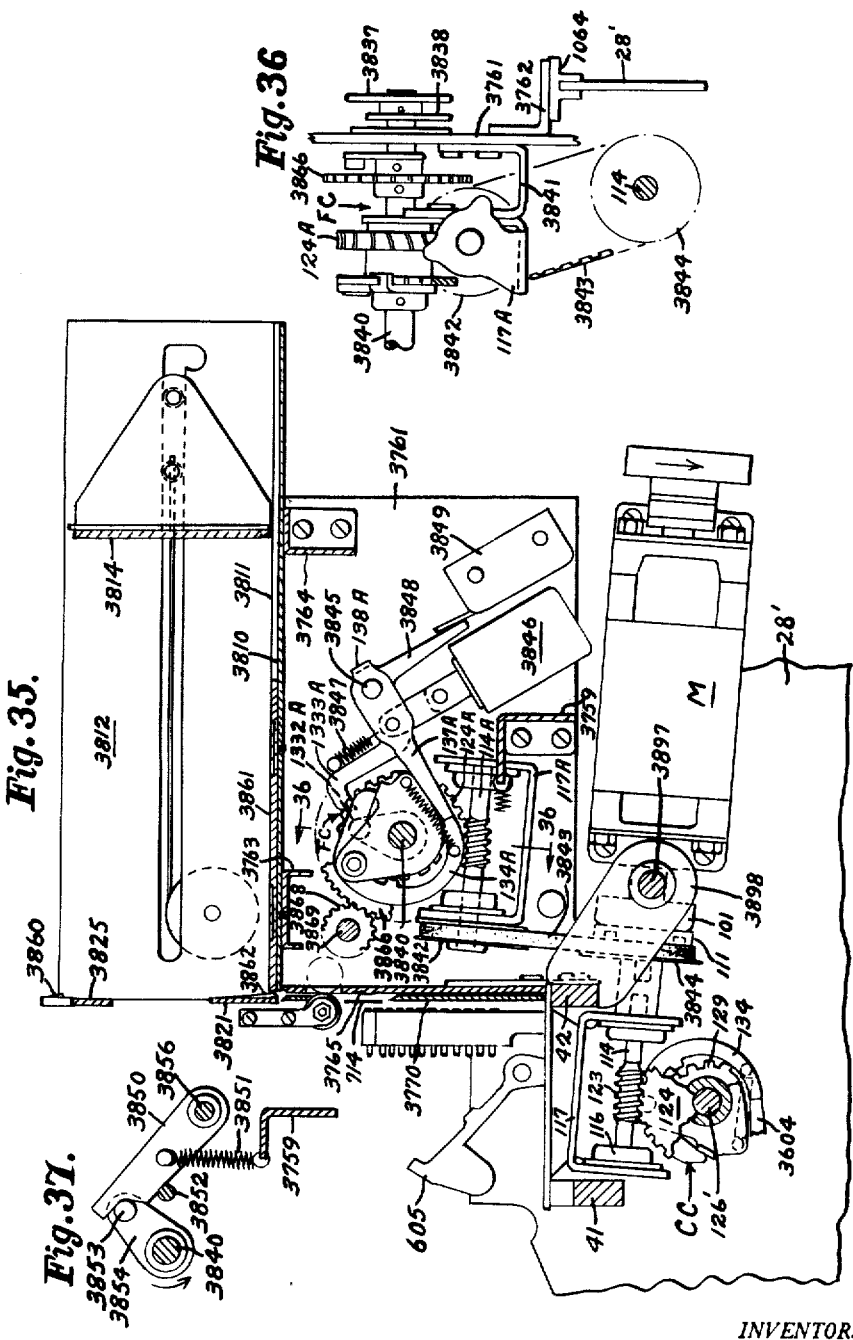

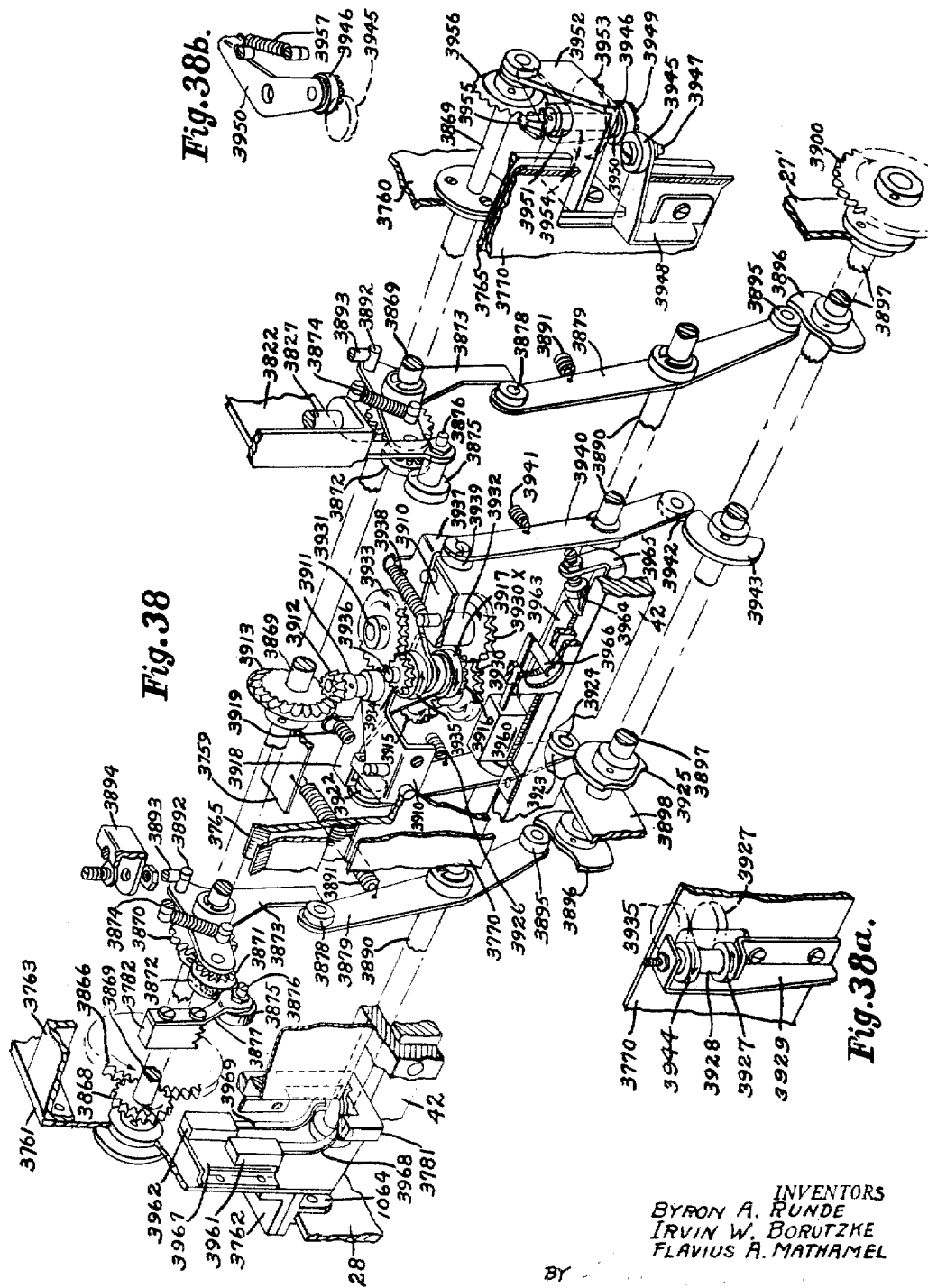

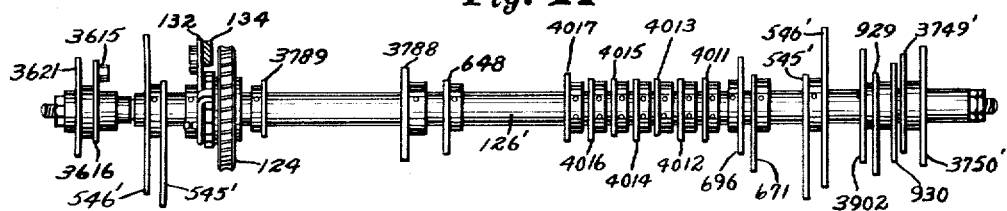
Fig. 41
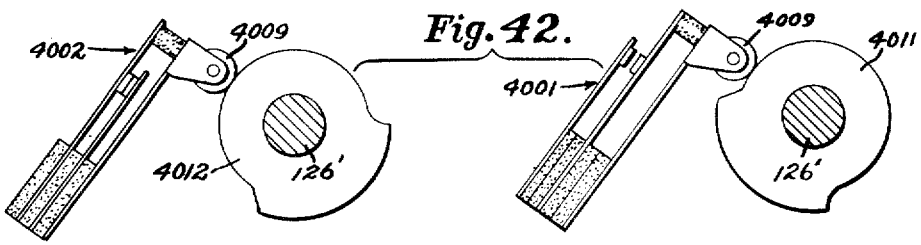
Fig. 42.
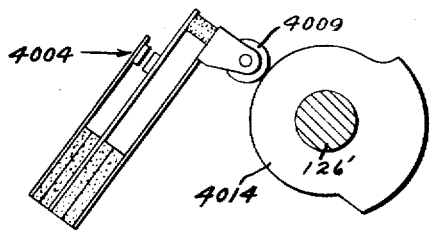
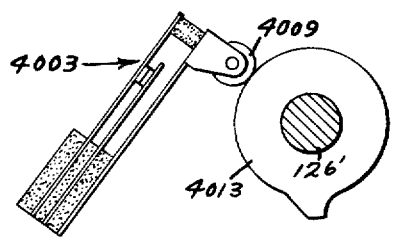
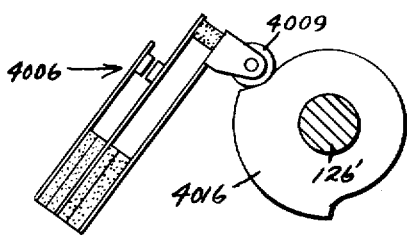
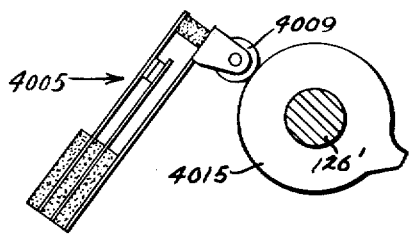
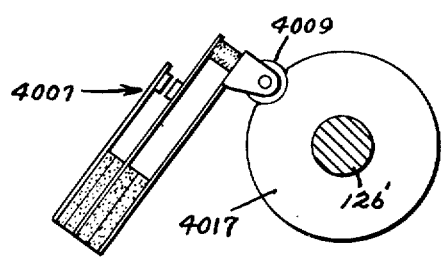

INVENTORS
BYRON A. RUNDE
IRVIN W. BORUTZKE
FLAVIUS A. MATHAMEL
BY
ATTORNEYS

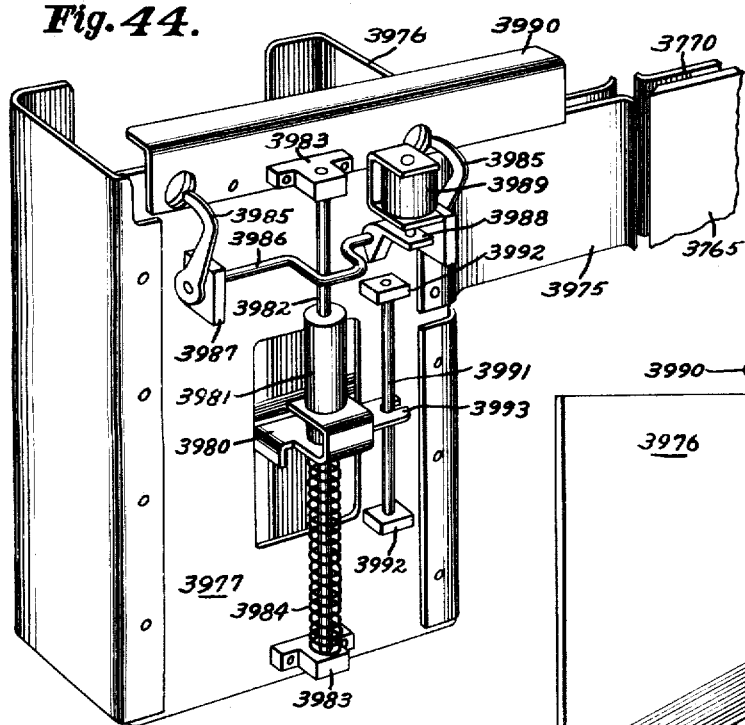
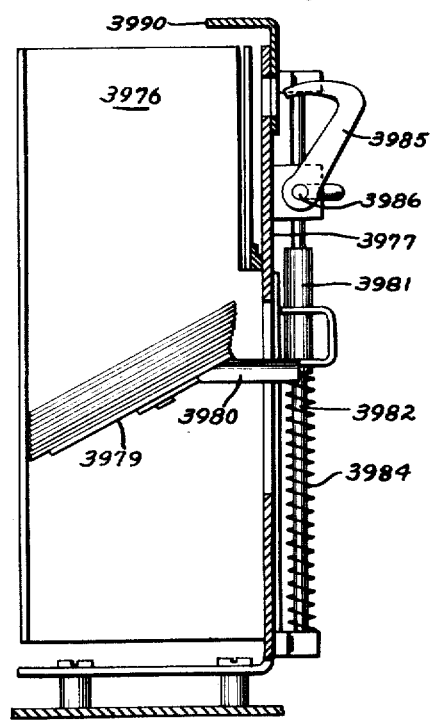

Nov. 12, 1957  B. A. RUNDE ET AL  2,812,902
ACCOUNTING APPARATUS
Filed June 1, 1955  26 Sheets-Sheet 23

SALARY RECORD (JOURNAL) (LEDGER)

NAME: John Doe
   10 Front St
DEPT: Shipping

| CHECK NO PRE-CHARGE | NET PAY | CHECK NO | BASE PAY | | | NIGHTS | | OVERTIME | | GROSS EARNINGS | DEDUCTIONS | | |
|---|---|---|---|---|---|---|---|---|---|---|---|---|---|
| | | | DATE | HRS | AMT. | HRS | AMT. | HRS | AMT. | | TAX | BONDS | MISC. |
| | Col.10 | Col.9 | | | Col.1 | Col.2 | Col.3 | | Col.4 | Col.5 | Col.6 | Col.7 | Col.8 |
| 987653 | 120.45 | 987654 | JAN20 | 45 | 122.00 | 2 | 6.00 | 3 | 10.50 | 138.50 | 10.00- | 5.00- | 3.05- |

(PAY CHECK)

987654      $***120.45

$***120 DOLLARS AND 45 CTS

PAY TO  John Doe

Signature

*Fig. 47.*

INVENTORS
BYRON A. RUNDE
IRVIN W. BORUTZKE
FLAVIUS A. MATHAMEL
BY
   ATTORNEYS

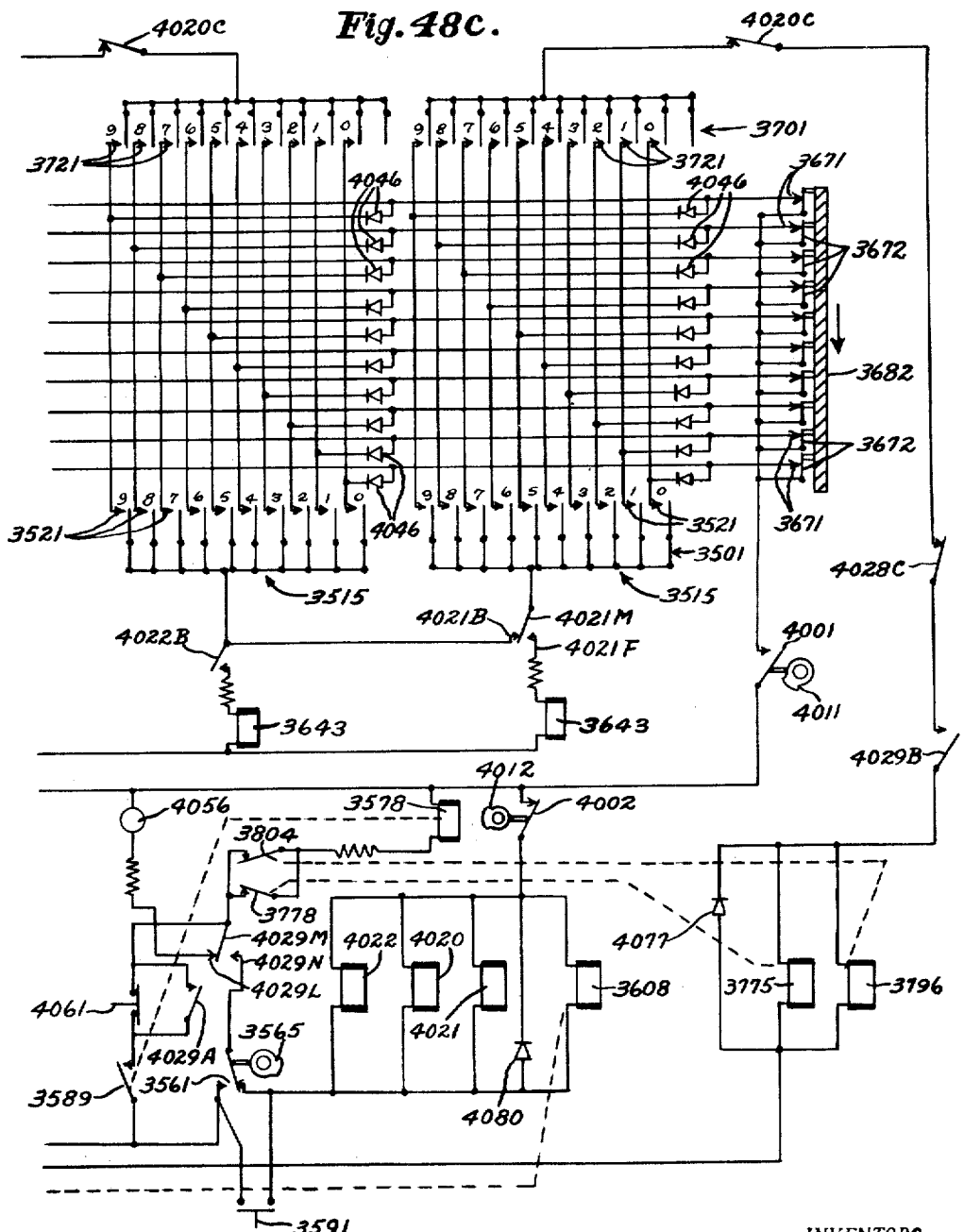

United States Patent Office 2,812,902
Patented Nov. 12, 1957

2,812,902

ACCOUNTING APPARATUS

Byron A. Runde, Farmington, Irvin W. Borutzke, Detroit, and Flavius A. Mathamel, Allen Park, Mich., assignors to Burroughs Corporation, Detroit, Mich., a corporation of Michigan Application June 1, 1955, Serial No. 512,414

22 Claims. (Cl. 235—60.13)

The present invention relates to improvements in accounting machines, and more particularly to the combination of a remote-controlled or slave machine capable of performing some accounting functions, such as the preparation of printed and punched documents, cards or records, with a controlling or master accounting machine having means enabling it to control the other machine and being capable of performing, without the aid of the remote-controlled or slave machine, kinds of accounting work not requiring the functions or products of the slave machine.

In the preferred embodiment of the invention herein described and illustrated, the master machine, except for certain additions thereto, is a well known mechanical accounting machine which is in wide use in performing a great variety of kinds of accounting work. It performs all the computations, stores all the amounts and totals, and produces the printed records, including ledgers, statements, journals, etc., needed for a great many kinds of accounting work, but it is not, in and of itself, capable of certain other functions, such as producing punched or perforated cards or records, or producing additional documents such as perforated and printed valued documents such as checks, as required in certain other kinds of accounting work. By redesigning and enlarging the last-mentioned machine and incorporating in it the necessary mechanisms for performing the desired further functions, special machines could be provided for performing such other kinds of work. However, such special machines are very expensive, their cost being quite disproportionate to the increase in mechanisms and functions.

In the herein disclosed embodiment of the present invention, the master machine consists of a machine which is produced in large numbers and is capable per se of performing a great many of the more usual kinds of accounting work, and has been provided with a relatively small amount of additional means to enable it to effect the necessary control of a separate remote-controlled or slave machine which has been produced for providing the desired additional functions and products. Thus, all but a relatively small part of the master machine is available at the economical cost obtainable by large scale production so that the cost of the combination of master and slave machines is less than the cost of a unitary special machine designed and produced for the special purpose.

In the herein disclosed embodiment of the invention, the master and slave machines are each operated through definite cycles of operation but the slave machine, when it operates, does not cycle synchronously with the master machine. While the cycle of operation of the slave machine is initiated under control of the master machine at a desired predetermined point in a predetermined cycle of operation of the latter, the further timing of the cycle of the slave machine is independent of the cycle of operation of the master machine, thus greatly simplifying the additional control means which are required in the master machine and the control means required in the slave machine for properly controlling the cycling of the latter.

By the present invention also, means are provided whereby that mechanism of the slave machine, more specifically the amount indexing mechanism, which must operate in strict accord with related mechanism in the master machine, is quite simply and accurately controlled as required. Such means includes indexing control circuits provided with switches by which, in cooperation with a relatively small amount of additional means, and circuitry, they are converted into proving circuits at the appropriate time in the machine operation. Further means are provided to interrupt operation of the master machine and provide a signal to notify the operator when a condition occurs to require the attention of the operator, as for example, when there is inaccuracy in the operation of the slave machine, or when a predetermined kind of result is produced in the master machine.

A preferred embodiment of the invention is described hereinafter by way of example with reference to the accompanying drawings in which:

Fig. 1 is a perspective view of a combination of machines embodying the invention;

Fig. 2 is a right side elevation of the master machine with the right side of the case and base cut away to reveal the internal mechanism in right side elevation;

Figs. 3 and 4 are detail perspectives of portions of Fig. 2;

Fig. 5 is a left side elevation of a portion of the master machine with portions of the left frame side member broken away to show more clearly certain interior elements;

Figs. 6, 7 and 8 are detail perspectives of portions of Fig. 5;

Fig. 9 is a detail perspective of a portion of a switch assembly in the master machine for controlling certain amount indexing means of the slave machine;

Fig. 10 is a detail perspective of a portion of a differential actuator member of the master machine having means for setting the switch means of Fig. 9;

Figs. 11 and 12 are longitudinal and transverse vertical center sections of a switch unit, portions of which are shown in Fig. 9;

Fig. 13 is a bottom view of the unit of Figs. 11 and 12;

Fig. 17 is a partial longitudinal section of the slave machine to illustrate portions not shown in Fig. 16;

Fig. 18 is a detail of the slave machine amount indexing detent means;

Figs. 20 and 21 are a left side elevation and a vertical transverse section, respectively, of a timing switch means for control of the amount indexing detent means of the slave machine;

Figs. 22 and 23 are vertical longitudinal and transverse sections respectively of a unit of the slave machine proving switch means;

Fig. 24 is a bottom view of the proving switch unit;

Fig. 25 is a detail perspective of a portion of a differential actuator slide of the slave machine with means for setting switches of the proving switch unit of Figs. 22, 23 and 24;

Figs. 26 and 27 are partial top plans of portions of the slave machine and master machine proving and indexing control switch means for comparison of spacing arrangements of certain elements;

Fig. 28 is a schematic development of a multiple gear train unit or cluster through which the slave machine type bars and punch indexing bars are indexed by the differential actuator slides;

Figs. 29 and 30 are details of portions of the slave machine printing control means as viewed from the right;

Fig. 31 shows the slave machine punch mechanism as seen from the right;

Fig. 32 is a detail of a punch control means;

Fig. 33 is a partial front elevation of the form holding, feeding, printing and punching means of the slave machine;

Fig. 34 is a top plan of the slave machine form supply holder and picker;

Fig. 35 is a partial longitudinal vertical section showing portions of the slave machine cycling and form feeding drives;

Figs. 36 and 37 are details of the drives;

Fig. 38 is a perspective of the form feeding means and portions of the drive thereof;

Figs. 38a and 38b are details related to Fig. 38;

Fig. 41 is a plan view of the main operating shaft of the slave machine with the various cams and gears thereon;

Fig. 42 shows in right side elevation each of a group of switches and their operating cams on the shaft of Fig. 41;

Figs. 44 and 45 are a perspective and vertical section of a receiver and stacker for forms ejected from the slave machine;

Fig. 47 illustrates a sample of work adapted to be performed by the machines described and illustrated; and Figs. 48A, 48B and 48C together constitute a circuit diagram of the illustrated machines, the several portions of the circuit diagram contained in the respective figures being related as indicated diagrammatically in Fig. 48.

Figure 15:
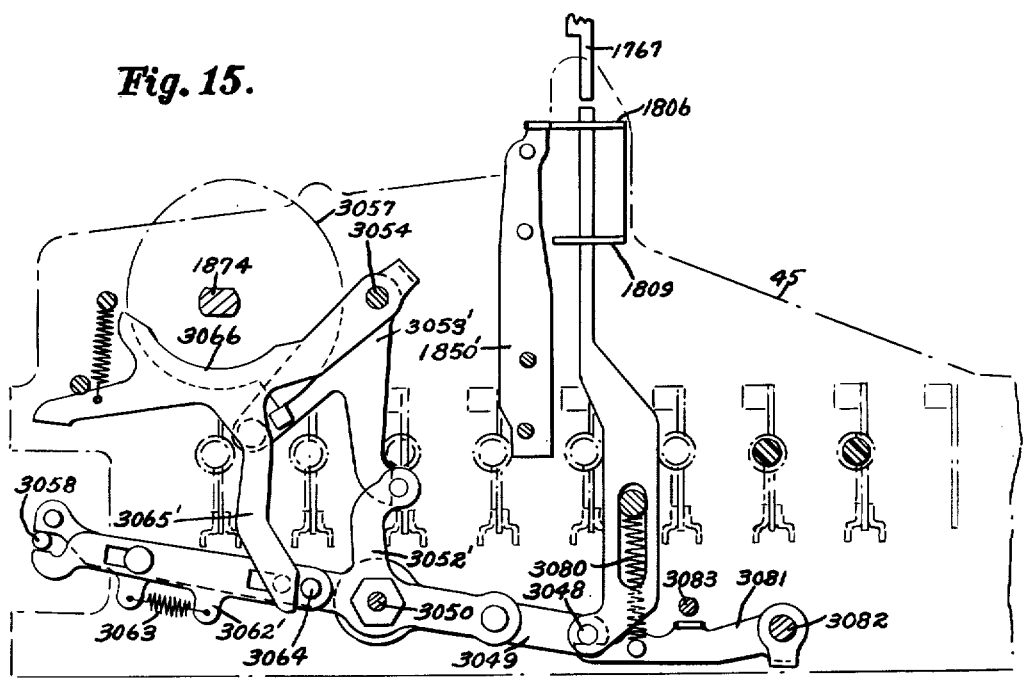
Fig. 15 is a partial rear elevation of certain register selection elements arranged to avoid mechanical interference with the means for operating certain of the switches of Fig. 14.
Figure 14:
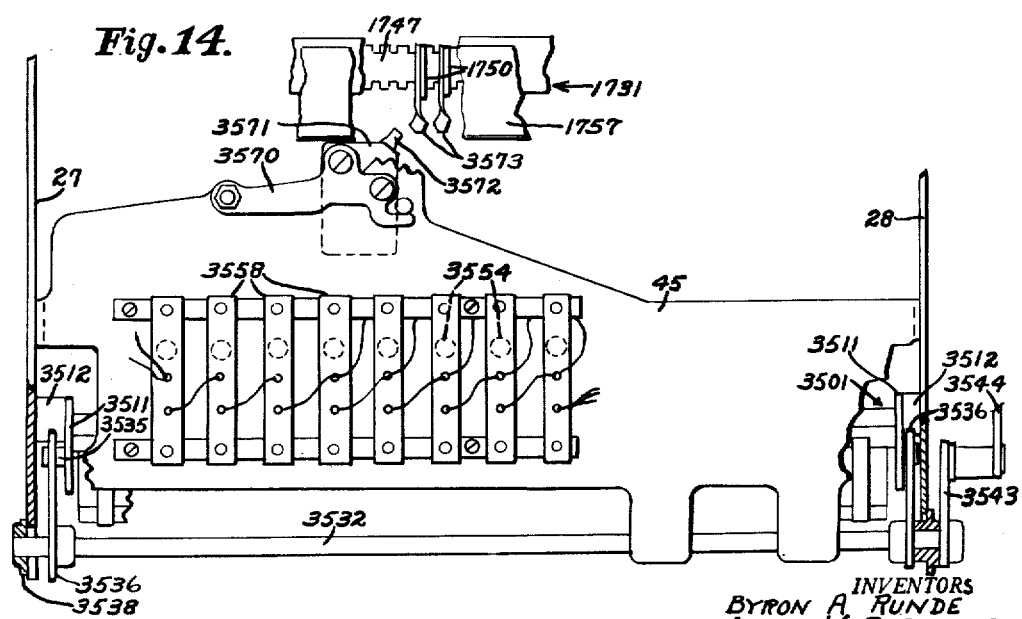
Fig. 14 is a partial rear elevation of control switch means at the rear of the master machine.
Figure 16:
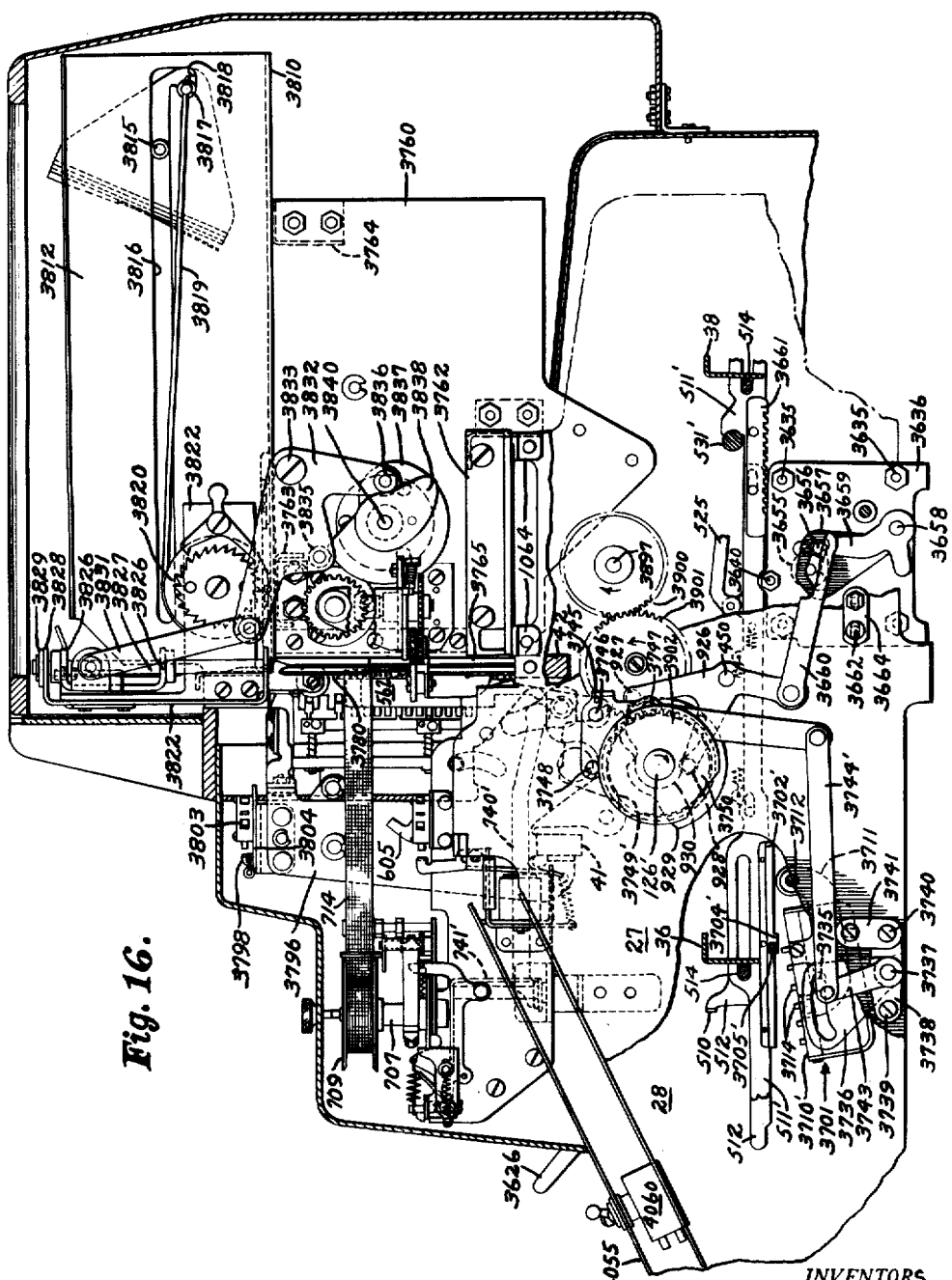
Fig. 16 is a partial right side elevation and partial section of the slave machine with the right side of its casing cut away.
Figure 19:
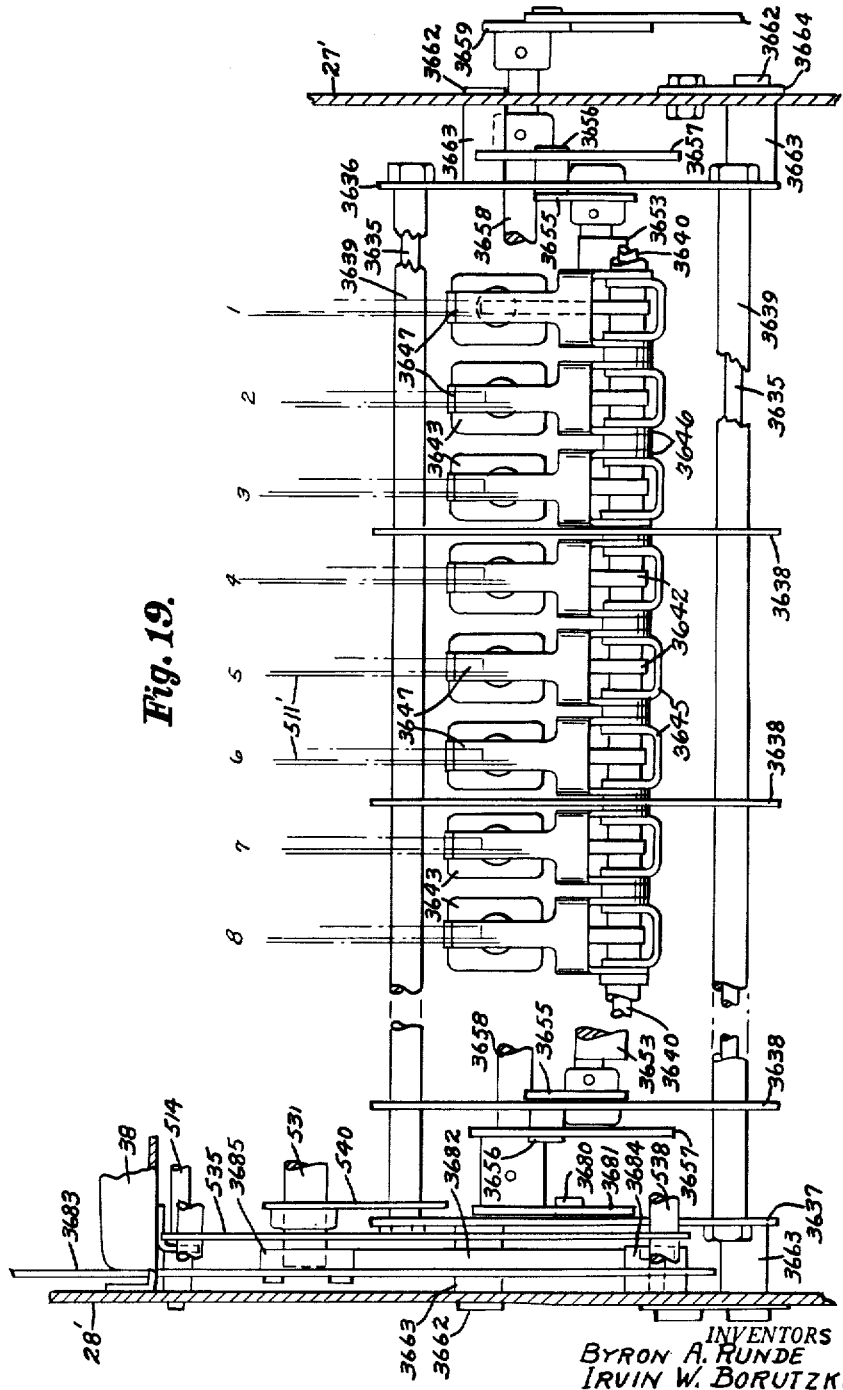
Fig. 19 is a top plan of the indexing detent control unit and some associated elements.
Figure 39:
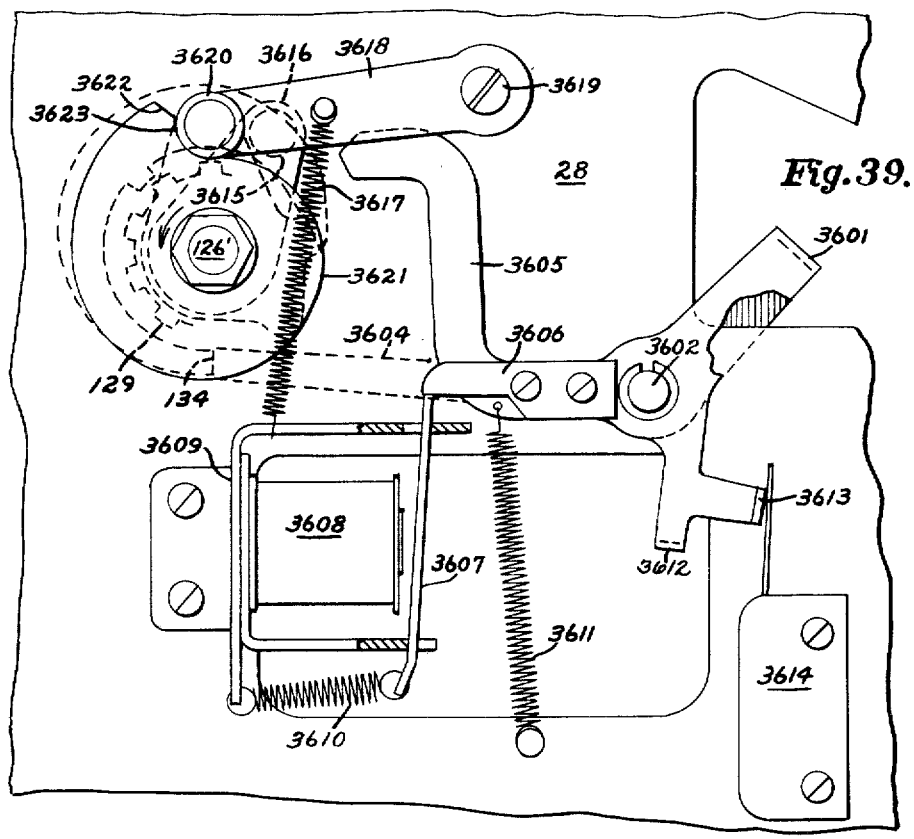
Fig. 39 is a detail of the slave machine cycling drive control as viewed from the left.
Figure 40:
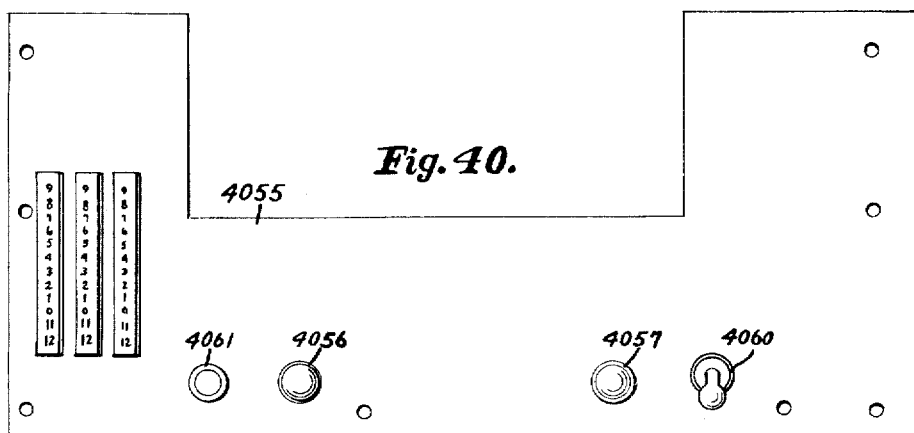
Fig. 40 shows a slave machine casing top panel with certain switches and signal means thereon.

Throughout the following description, consistently with the description in the Butler patent and Butler and Runde application hereinafter referred to, the words clockwise and counterclockwise will be used to describe positions and motions of elements of the machine as seen by an observer in front of, at the right, or above the moving parts in the positions in which they are located in the machine. The words right, rightward, left and leftward will be employed to describe positions and motions as seen by an observer in front of the machine. The words above, up, upward, below, down, downward, front, forward, rear, rearward, and behind will be employed to describe positions and motions as they occur in the machine when it is in its normal upright position.

MASTER MACHINE

In the illustrated embodiment of the invention, the master machine MM (shown at the left in Fig. 1) is generally, and except for certain changes and additions explained hereinafter, like the accounting machine disclosed in the Butler Patent No. 2,629,549, modified as disclosed in the application Serial No. 258,134, now Patent No. 2,721,695, filed November 26, 1951, by Thomas M. Butler and Byron A. Runde.

Those parts of the master machine (Figs. 1–15) which are like those disclosed in said patent and application are identified in the annexed drawings by the same reference numbers by which they are identified in said patent and application, and those parts of the herein disclosed master machine which are modified forms of parts disclosed in said patent and application will be identified by like numbers with primes added. New elements and mechanisms disclosed herein will be identified by numbers above 3500.

The master machine of the present case, instead of having two crossfooters as shown in the above-mentioned Butler patent and application and one nine-register multiple register unit as shown in said Butler and Runde application, has only the one crossfooter shown in the front or A position in the machine in the patent and application, the crossfooter therein shown in the B or next adjacent position rearward of the A position being replaced by a second nine-register multiple register unit controlled by the same carriage-controlled register selecting means which controls the rear or C multiple register unit and simultaneously with the latter. Whichever of the #1 to #9 registers of the C unit is selected by the carriage controlled register selecting means, the register of corresponding number in the B unit is also selected. Manual and carriage-controlled multiple register function control means like that shown in the Butler and Runde application is provided for each of the two multiple register units, that for the B position multiple register unit taking the place of the B crossfooter function controls shown in the Butler patent, so that the functions of the automatically selected B and C registers of like number are independently determined.

In the rearmost or D position beneath the differential actuator racks 511 of the master machine, there is now provided a switch assembly 3501 (Figs. 5 and 9–13) which is settable by means connected with the amount actuator racks 511 of the eight lowest orders (pennies to hundreds of thousands of dollars orders) in accordance with the amount to which said actuators are indexed in that machine operation. After being so set, the switch assembly retains such setting until set in accordance with a different amount in a subsequent machine operation. The switches in the assembly 3501 are connected in circuits which control the indexing of amount differential actuator racks of the slave machine in each cycle of operation of the latter machine, as hereinafter described.

The rear portion of each of the eight lowest order actuator racks 511 (Figs. 5 and 9) is provided with a pair of switch setting members 3503 having upward flanges secured to oposite sides of the actuator 511 and outwardly spaced downward flanges each having one of a pair of forwardly and rearwardly spaced switch operating projections 3504 and 3505 and each having a notch 3506 or 3507 laterally aligned with the projections 3504 or 3505 of the other switch setting member.

The switch assembly 3501 comprises a preferably unitary top plate 3510 extending transversely under all of the switch operating members 3502 and 3503 and secured at each end to one of a pair of forwardly extending arms 3511 which are pivotally mounted on studs 3512 secured in the machine frame side plates 27 and 28. The plate 3510 is formed with a row of five holes 3513 aligned with the downward flange of each of the switch operating members 3502 and 3503.

In each of the holes 3513 is an upwardly and downwardly movable switch operating pin 3514. The five holes and pins of each row are spaced apart in accordance with the spacing of the successive digit positions of the racks 511. In the normal or "0" position of the rack 511, the projection 3505 of the member 3503 is directly over the rearmost pin 3514 of the aligned row and, in the "5" position of the rack, the projection 3504 is directly above the rearmost pin of its aligned row.

On the underside of the plate 3510 is a series of eight multiple switch units or blocks 3515 (Figs. 10, 11 and 12) each comprising five single-pole double-throw toggle switches of the type disclosed and claimed in patent application Serial No. 480,266, now abandoned, filed January 6, 1955, by William W. Deighton. Each switch unit comprises a rectangular block 3516 of insulating material formed with five upwardly opening switch compartments separated by transverse walls 3517. In the bottom of each compartment, a switch blade 3518, having two upwardly diverging contact arms meeting at the center at an obtuse angle, is rockably supported in crossed channels between four corner posts of the enlarged head of a contact pin 3519 passing through the bottom of the block 3516 and connecting with a connection strip 3520 which the five pins 3519 also secure to the underside of the block. Also in the bottom of each switch compartment at each side of the contact pin 3519 is one of a pair of contacts 3521 each united with the head of a pin passing through the bottom of the block and connected with an individual connecting lug 3522 which it secures to the underside of the block 3516. In each switch compartment also is a toggle member 3523 rockably supported by a shaft 3524 supported in the ends and in transverse walls 3517 of the block above the row of center contacts 3519. Each toggle member 3523 comprises an insulating body formed with a downwardly opening bore containing a hollow plunger 3525 pressed downwardly against the switch blade 3518 by a coiled spring 3526 contained within the hollow plunger and bore. The insulating body of each toggle member 3523 is formed with a pair of upwardly facing shoulders on opposite sides of the shaft for engagement by a respective pair of switch operating pins 3514 of the pair of rows of pins 3514 provided for a respective one of the racks 511.

Each switch block 3516 has a pair of locating pins 3527 projecting upwardly, preferably from two top corners, into locating sockets in the underside of the plate 3510. Rearwardly of the series of blocks 3516, a downwardly opening transversely extending channel member 3528 of insulating material is secured to the rear portion of the underside of the plate 3510 to provide a channel to accommodate the wires connecting with the connecting strips 3520 and connecting lugs 3522 of the eight switch blocks. An insulating bottom closure 3529 having locating sockets to receive locating pins 3530 projecting from the bottoms of the switch blocks is held against the latter by a number of spring clips 3531.

Each of the supporting arms 3511 (Fig. 5) for the switch assembly 3501 carries on its outer side a roller 3535 engaged in a cam slot in a cam arm 3536 secured on a shaft 3537 extending outwardly through notches in the lower edges of the machine frame plates 27 and 28 and journalled in bearing plates 3538 secured at their rear ends to the machine frame plates 27 and 28 by screws 3539 and at their forward ends by screws 3540 to the lower ends of links 3541 which are vertically adjustably secured by screws 3542 to the frame plates 27 and 28 to permit vertical adjustment of the shaft 3537. An arm 3543 secured at its lower end to the projecting left end of the shaft 3537 is pivotally connected at its upper end to the rear end of a link 3544. The latter is pivotally connected at its forward end to the lower end of the downward arm of a bell crank 3545, having a yoke portion rockably supported on a shouldered screw stud 3546 secured to the outer side of the frame plate 28. The two arms of the bell crank 3545 carry rollers 3547 and 3548 cooperating with respective ones of two cam discs 3549 and 3550 secured on the left end of the main shaft 126 with rotates through one full revolution in each cycle of operation of the master machine as disclosed in the Butler patent.

The parts are so arranged that in about the 154° to 187° portion of the master machine cycle, that is, while all the differential actuator racks are stopped in their amount differential positions, the cams 3549 and 3550 rock the bell crank clockwise (counterclockwise as viewed in Fig. 5) to pull the link 3544 forwardly and rock the arm 3543, shaft 3537 and cam arms 3536 counter-clockwise to elevate the rollers 3535 and the arms 3511 about the pivot studs 3512, thereby raising the switch assembly 3501 to press all of its switch operating pins 3514 against the downward flanges of the switch setting members 3502 and 3503 on the eight lowest order actuator racks 511. As the switch assembly rises, one or the other of the projections 3504 and 3505 on each of those racks 511 will engage and depress one switch operating pin 3514 for each of the eight switch blocks or units 3515.

While the toggle members 3523 are in their central positions, their spring plungers 3525 press against the centers of the respective switch blades 3518 in the vertex of the angle between the two contact arms of each and hold the switch blades in their centered open positions. Upon depression of either of its operating pins 3514, the toggle member is rocked to shift its plunger onto the opposite arm of its switch member 3518 and press the contact on said arm against the associated contact 3521. Upon depression of either of its pins 3514 by a projection 3505 or 3504, the rocking of the toggle member elevates the other of its pins 3514 into the notch 3507 or 3506 in the opposite switch operating member 3502 or 3503. All of the eight remaining switch operating pins 3514 are engaged by one or the other of the downward flanges of the pair of switch operating members 3502 and 3503 and, together with their toggle members 3523, are returned to normal position to return their associated switch blades 3518 to open position. Thus, in each cycle of operation of the master machine, one, and only one, of the ten contacts 3521 in each switch block, corresponding to the amount differential position to which the associated amount differential actuator rack 511 is advanced, will be engaged by its switch blade 3518, and any other switch lever 3518 previously engaging a contact 3521 in the same switch block will be returned to normal non-contacting position.

After such setting of the switches of the eight switch blocks in accordance with the amount indexed on the eight lowest order actuator racks 511, the cams 3549 and 3550 return the bell crank 3545, link 3544 and shaft 3537 to normal position, lowering the switch assembly during about the 187° to 210° portion of the master machine cycle before the return of the actuator racks 511 toward their normal "0" positions begins.

For the purpose of eliminating the printing of "0's" to the left of amounts by the slave machine and preventing printing and punching by the slave machine when no amount is present (as explained in detail hereinafter) each of the eight lowest order amount actuator racks 511 of the master machine has secured on its rear end a rearwardly extending finger 3555 (Figs. 5 and 14) which, in the "0" position of the rack 511, engages a switch operating button 3554 which extends through an aperture in the rear frame plate 45 and is secured to an operating spring member 3556 (see also Fig. 8) of a respective one of eight switches 3557 carried by insulating supporting means 3558 secured to the rear face of the rear frame plate 45. The operating member 3556 and movable contact arm 3559 of each switch are self-restoring to contact opening position whenever the associated actuator rack 511 is advanced from its "0" position but are held in closed position by the finger 3555 while the rack is in "0" position.

To avoid interference with the fingers 3555, certain elements of the carriage-controlled register selecting mechanism located on the forward side of the rear frame plate 45, as shown in the Butler and Runde application, have been modified or reshaped as indicated in Fig. 15 where elements of the carriage-controlled register selecting mechanism are designated by the same reference numbers as in the Butler and Runde application, except that primes have been added to the reference numbers of the modified elements.

To enable the master machine, at the appropriate time in its cycle, to initiate a cycle of operation of the slave machine, the former is provided with a single-pole double-throw switch 3561 (Figs. 2 and 4), mounted on a bracket 3562 secured to the brace member 219' similar to the brace member 219 of the Butler patent. The center contact blade of the switch 3561 is controlled by a spring arm 3563 carrying a roller 3564 bearing on the periphery of a cam disc 3565 secured on the main shaft 126 and shaped to transfer the center contact of the switch from the normally closed opposing contact onto the normally open contact at about the 168° point in the master machine cycle, and to allow the center contact blade to restore itself to normal position at about the 222° point of said cycle.

On the same bracket 3562 at the left of the switch 3561, a normally open single-pole single-throw switch 3566 (Fig. 4) is mounted. The movable contact blade of the switch 3566 is controlled by a spring arm 3567 which carries a roller 3568 which bears on the periphery of another cam disc 3569 secured to the shaft 126 and shaped to close the switch 3566 at about the 107° point and reopen it at about the 161° point in the master machine cycle. The closing of this switch 3566, as will be explained in detail hereinafter, serves both to initiate paper feed in the slave machine and to operate means to prepare a circuit which will cause the cycle of the slave machine to be initiated by the return of the switch 3561 to normal.

The master machine is provided with a normally open single-pole, single-throw switch 3571 (Figs. 2, 5 and 14) which is controlled by means on the paper carriage so that the slave machine will be cycled only in consequence of those cycles of the master machine performed with the latter's paper carriage in certain predetermined columnar positions. The insulating case of the switch 3571 is secured to an arm 3570 adjustably mounted on the rear frame plate 45 in such position that, when the paper carriage moves to a predetermined columnar position or positions, the switch 3571 will be closed by actuation of its operating lever 3572 by a control projection 3573 carried by a bar 1750 mounted in the function control program unit 1731 on the paper carriage. The switch 3571 will be maintained closed as long as the paper carriage remains in that columnar position. The switch controlling projections 3573 are similar to certain of the longer control projections 1767 (Figs. 5 and 15) except that their lower ends are twisted and their lower corners are bevelled to permit them to have a switch closing camming action on the switch lever 3572 when they engage the latter in movement of the carriage in either direction into the selected columnar position where operation of the slave machine is desired.

The master machine has, as disclosed in the Butler patent, a yoke member 981 (Figs. 2 and 3) which is rockably mounted on the stud 795 and has on its leftward side an arm 980 which is normally in a clockwise or rearward position at all times except that it is shifted forwardly in about the 20° to 35° portion of a cycle of the master machine in which the function controls are conditioned for taking a total or subtotal from the front crossfooter while the matter contains a negative total, and is again returned to its rearward position after the 340° point in the same cycle. To permit suppression of the printing and punching functions of the slave machine in conjunction with any operation of the master machine in which a negative total or subtotal is drawn from the "A" crossfooter, the master machine is now provided with a further yoke member 3574 having a left side arm secured to the right side arm 1035 of the yoke 981 and a right side arm 3575 having at its upper end a rightwardly extending projection which, when the yoke 981 is rocked counterclockwise in an "A" crossfooter negative total or subtotal taking operation of the master machine, acts on the operating lever 3576 of a normally open single-pole, single-throw switch 3577 to close said switch and hold it closed until after the 340° point in the cycle, after which the switch, being self-opening, is permitted to restore to normal open condition. The switch 3577 is housed in an insulating case which is secured to a portion of a brace member 219' by screws permitting adjustment of position of the switch to secure accurate operation thereof. The suppression of printing and punching in the slave machine under control of the switch 3577 will be explained in detail hereinafter.

The master machine is provided with an interlock device to prevent initiation of a master machine cycle when the slave machine has not performed its printing and punching functions in a slave machine cycle as explained in detail hereinafter. This interlock device comprises an electromagnet 3578 (Figs. 5, 6 and 7) carried by a bracket 3579 mounted on the frame cross bar 42. The electromagnet has a pivotally supported armature 3580, the free end of which extends under the rightward arm 3581 of a yoke member 3582 rockably supported on a shaft 3583 secured in the bracket 3579. A tension spring 3584 connected between a stud on the bracket 3579 and a second leftward arm 3585 of the yoke member 3582 normally maintains the arm 3585 engaged against clockwise movement against a limit stud 3586 carried by the bracket 3579. A leaf spring 3597 (Fig. 7) insufficiently strong to overcome the spring 3584 maintains the armature in contact with the arm 3581. The yoke 3585 has a downward front arm 3587 which pivotally carries a latch hook 3588. A coiled spring 3589 urges the latch hook 3588 counterclockwise to a limit position where a lateral lug on the latch hook bears against the leftward edge of the arm 3582 and the hooked lower end of the latch 3588 is out of the downward path of the machine cycling trip-lever 192 while the yoke 3582 is in normal position. When the electromagnet 3578 is energized in a manner explained later, its armature 3580 is pulled up to rock the yoke 3582 against the tension of the spring 3584 to place the latch hook in the path of the trip-lever 192 and prevent the latter from moving downward far enough to initiate a cycle of operation of the master machine. The armature 3580, when so lifted, also operates to closed position a normally open single-pole, single-throw switch 3589 mounted on the frame of the electromagnet.

A push-button 3590 (Fig. 2) extending through and supported by the front panel 52 of the casing is operable to close a normally open switch 3591 also supported on said panel. The switch will be referred to again hereinafter.

The master machine is also provided with one or more receptacles 3592 (Figs. 2 and 5) having socket contacts connected with the various switches and contacts above described, and adapted to receive multiple pin plugs of cables for connection to circuits in the slave machine.

SLAVE MACHINE

Many elements of the slave machine SM (Figs. 16 to 26, 28 to 43, and at the right in Fig. 1) are the same as or similar to certain of the elements of the master machine. Those elements of the slave machine which are not significantly different from elements of the master machine will be identified by the same reference numbers except that the reference numbers for elements of the second of two like clutches of the slave machine will be distinguished from the reference numbers for corresponding elements of the first by the suffix *a*. New elements of the slave machine are identified by reference numbers above 3600.

Frame

The remote-controlled or slave machine has a base (not shown) which is substantially a duplicate of the master machine base 20 (Fig. 2) and a main frame comprising right and left side plates 27' and 28' which are connected in spaced relation by a number of crossmembers, some of which will be referred to hereinafter, said side plates being secured to the base member in the same manner as the frame side plates 27 and 28 of the master machine.

Drive

A drive motor M (Fig. 35) is mounted on the inner side of the left side plate 28'. Its armature shaft is connected through an overload slip clutch 101 and a flexible coupling 111 to a shaft 114 journalled in bearings 116 carried by a bracket 117 supported on the frame cross bars 41 and 42. A worm 123 on the shaft 114 meshes with a worm wheel 124 which is drivingly connectible with a main cycling drive shaft 126' through a single revolution machine cycling clutch like that disclosed in the Butler patent and indicated generally at CC in Fig. 31.

The clutch CC is normally held disengaged by a yoke member 3601 (Fig. 39) rockably supported on opposite sides of the frame plate 28' on a shaft 3602 supported in the frame plate 28' and in a bracket 3603 (Fig. 17) secured to the frame cross bar 41. Inwardly of the plate 28' the yoke member 3601 has a rearwardly extending arm 3604 (Figs. 39 and 35) which normally engages the end of the toothed lever 134 of the clutch to hold the clutch in disengaged condition. Leftward of the plate 28', a rearward arm 3605 of the yoke member carries an abutment 3606 which normally rests on the upper free end of the pivoted armature 3607 of an electromagnet 3608 mounted on a bracket 3609 secured on the outer side of the plate 28'. When the electromagnet is energized, the armature swings rearwardly about its lower pivoted end against the tension of its return spring 3610 and removes its upper end from beneath the abutment 3606 to permit a spring 3611 connected between the arm 3605 and a stud in the plate 28' to swing the yoke member about the shaft 3602 and pull the arm 3604 downwardly away from the toothed arm 134 of the clutch, such movement of the yoke being limited by engagement of a lateral lug 3612 on a downward left side arm thereof against an edge of the frame plate 28'. Thereupon the clutch engages to drive the shaft 126' clockwise. At the same time a second lateral lug 3613 on the downward left side arm of the yoke member 3601 acts on the operating arm of a normally open switch 3614 to close it to maintain the motor power circuit closed as hereinafter explained so long as the clutch remains engaged.

As will be explained in detail hereinafter, the electromagnet 3608 is again deenergized sufficiently early that when, late in the slave machine cycle, a stud 3615 carried on an arm 3616 secured to the shaft 126', leftwardly of the plate 28', engages the rearward upper end of the arm 3605 and returns the yoke member 3601 a little past its normal position and permits the switch 3614 to reopen, the spring 3610 returns the armature 3607 to its normal position with its upper end under the abutment 3606 to hold the yoke member and its arm 3604 again in normal position to arrest the clutch lever 134 and disengage the clutch just before completion of a single revolution of the shaft 126'. Rotation of the shaft 126' through its final few degrees is assisted by the tension of a spring 3617 connected between the frame of the magnet 3608 and a stud in a lever 3618 which is pivotally supported at its front end on a shouldered screw stud 3619 secured in the plate 28'. The rear end of the lever 3618 carries a roller 3620 which rides on the periphery of a snail cam 3621 which is secured on the shaft 126' and has an inclined edge portion 3622 extending steeply from its high edge portion to a radial edge portion 3623. A few degrees before completion of the revolution of the shaft 126' and almost simultaneously with the disengagement of the clutch CC, the steeply inclined portion 3622 of the cam comes under the roller 3620 which is pulled downwardly by the spring 3617 to urge the cam 3621 and shaft 126' to final rest position where the roller drops in front of the radial edge 3623 to lock the cam and shaft against retrograde movement.

Differential actuator mechanism

The slave machine has eight amount differential actuator slides 511' (Figs. 16, 17, 19 and 28) and three date differential actuator slides 512 all supported and guided in the same manner as the differential actuators 511 and 512 of the master machine, and by like means, for forward and rearward reciprocation. The amount actuator slides 511' are mounted in the positions in the slave machine corresponding to the positions of the eight lowest order amount actuator racks 511 in the master machine and the three date differential slides 512 of the slave machine are in positions generally corresponding to the leftward three date differential slides 512 of the master machine except that the rightward two slides 512 of the slave machine are closer to the highest order amount differential slide 512 to avoid mechanical interferences. All eleven differential actuator slides 511' and 512 are reciprocated by means like that which reciprocates the differential actuators of the master machine and including a rack slide 523 slidably mounted on each actuator slide 511' and 512 and a coupling pawl 525 pivotally mounted on each rack slide 523 and cooperating with a driving bail 531' guided at its ends in forwardly and rearwardly extending slots in guide plates 535 (Fig. 19) and connected at its ends to the rear ends of two links 540 (Fig. 17), the forward end of each link 540 being connected to the lower end of a respective one or two levers 541 pivoted at their upper ends on studs 542 which are secured in the frame plates 27' and 28'. As in the master machine, each of the levers 541 in the slave machine carries a pair of rollers 543 and 544 bearing on the edges of a pair of cam discs 545' and 546' secured on the shaft 126'. The cams 545' and 546' of the slave machine are shaped somewhat differently than the cams 545 and 546 of the master machine so that the differential slides 511' and 512 of the slave machine start forward from their normal rearmost positions at about 40° point of the slave machine cycle and, if not sooner arrested, reach the foremost differential positions by about the 108° point in the cycle and remain there until about the 230° point. Their return movement begins at that point and is completed at about the 296° point in the slave machine cycle. The forward movement of the slides 511' and 512 is assisted by springs 533.

As in the master machine, each of the differential slides 511' and 512 in its normal position is coupled to the driving bail 531' by its coupling pawl 525 and remains so coupled until, in the forward movement of the bail, the differential slide is arrested, whereupon the coupling pawl 525 is cammed from coupling position by the action of a stud 527 on the differential slide in a cam slot 526 in the coupling pawl during continuing forward movement of the pawl with the rack slide 523 against the tension of the spring 530 so that the rear end of the pawl 525 is lifted to engage its stud 547 into an appropriate one of the notches in a locking plate 549 to arrest the pawl and the rack slide 523 and to lock the differential slide 511' or 512 and the rack slide 523 in such differential position until, in the rearward return of the bail 531', the pawl 525 is cammed back to coupling position for returning the differential slide and the rack slide 523 with the bail 531' to normal position.

Arrest of the forward movements of the three date differential slides 512 in the slave machine is effected by engagement of a lug 510 on each of those slides with one of a series of stepped stop shoulders 509 on respective ones of three stop sectors 494' pivotally supported at their rear ends on a shaft 3625 supported at its ends in the frame plate 28' and in the bracket 3603. Each of the three stop sectors 494' has an arm 3626 extending upwardly from its rear end and through the top plate 257 to permit adjustment by the operator to appropriate date positions in which they are yieldingly retained by a stud 3627 in each arm 3626 cooperating with a respective one of three notched detent arms 3628 pivotally supported at their rear ends on a shaft 3629 supported at its ends in the frame plate 28' and in the bracket 3603. The detent arms are urged downward by springs 3630 connected between the differential slide guide comb 36 and the detent arms 3628 to hold the notched edges of the latter against the studs 3627.

The arresting of the amount differential slides 511' in amount differential positions is accomplished by detent means (Figs. 16–19) controlled from the master machine in a manner described hereinafter. This detent means for all of the amount differential slides is included in one assembly unit in a frame comprising four cross rods 3635 passing through right and left frame end plates 3636 and 3637 and three intermediate frame plates 3638 which are held in fixed laterally spaced relation on the rods 3635 by spacing sleeves 3639 surrounding the rods 3635 between the plates, and by nuts threaded on the ends of the rods and against the outer sides of the respective end plates. The end plates 3636 and 3637 and intermediate plates 3638 also support two cross-shafts 3640 and 3641 which also pass through eight soft iron plates 3642 each having an upwardly open cutout to accommodate an electromagnet winding 3643 placed around the upstanding rear leg 3644 of the plate. For each plate 3642 and electromagnet coil 3643 there is a pair of nested yoke members 3645 and 3646 rockably supported on the shaft 3640 on both sides of the respective plate 3642. The outer yoke member 3646 is formed of magnetically soft iron and has an arm 3647 extending rearwardly over the top of the plate 3642 and its rear leg 3644. The arm 3647 serves as an armature, and the leg 3644 and plate 3642 serve as core and return magnetic yoke for the electromagnet 3643.

A downwardly extending right side arm 3648 of the yoke 3646 carries a stud 3649 (Fig. 18) which is yieldingly held against the rear edge of a downwardly extending right side arm 3650 of the other yoke 3645 of the pair by a spring 3651 connected between the stud 3649 and a stud carried by the arm 3650. A spring 3652 connected between a stud in the plate 3642 and the arm 3650 urges the latter rearward normally into yielding engagement against a restoring blade 3653 pivotally supported in the right end plate 3636 and leftmost intermediate plate 3638 (Fig. 19) on an axis passing through the rearward portion of the blade. The rearward edge portion of the restoring blade is cylindrical and concentric with its pivotal axis and receives support in arcuate notches in the lower forward corners of all the plates 3642. When the restoring blade 3653 is in its normal position, it holds the arms forwardly against the tension of the springs 3652 and slightly away from the studs 3649 so that the springs 3651 hold the armatures 3647 downward with the heads of non-magnetic rivets on studs 3654 in the armatures engaging the upper ends of the core legs 3644 and separating the armatures slightly from the core legs and return yoke portions of the plates 3642 to permit quick release of the armatures when the electromagnets 3643 are not energized. The yokes 3645 and 3646 and plates 3642 are properly spaced on the shaft 3640 by suitable spacing sleeves, and the plates 3642 are also held spaced between suitable spacing sleeves on the shaft 3641.

The restoring blade shaft 3653 has rearwardly extending arms 3655 secured to it at both of its ends and carrying in their rearward ends studs 3656 passing freely through the plate 3636 and the leftmost plate 3638, respectively. Each stud 3656 engages in a cam slot in a respective one of a pair of cam arms 3657 secured rightwardly of each of the end frame plates 3636 and 3637 on a shaft 3658 rotatably supported in the plates 3636, 3637 and 3638. An arm 3659 (Fig. 16), secured at its lower end on the rightward end of the shaft 3658, is pivotally connected at its upper end with the rearward end of a link 3660 which is pivotally connected at its forward end to the downward arm of a three armed lever 926 rockably supported on a stud 450 secured in and extending outwardly from the machine frame plate 27'. The other two arms of the lever 926 carry rollers 927 and 928 bearing against the edges of respective ones of a pair of complementary cam discs 929 and 930 secured on the shaft 126' in such angular position that the lever 926 is actuated to rock the restoring blade 3653 toward its releasing position downward and away from the arms 3650 in about the 14° to 39° portion of the slave machine cycle and return the blade to normal position during about the 143° to 177° portion of the cycle.

When the arms 3650 are released from the restoring blade 3653, the springs 3652 urge the yokes 3645 and 3646 counterclockwise to raise the rear ends of the armatures 3647 upward, but such movement of any pair of yokes 3645 and 3646 and the related armature 3647 is prevented by the associated electromagnet 3643 if and as long as the latter is energized. Upon deenergization of the several electromagnets 3643 as explained hereinafter, the rear ends of the associated armatures 3647 are raised by their springs 3652 into engagement with the eleven-notched lower edges of the stop plates 3661 secured to each of the eight amount differential slides 511' and arrest the slides 511' in differential positions selected in a manner hereinafter explained in accordance with the settings of the corresponding ones of the multiple switch units 3515 by the eight lowest order amount actuators 511 of the master machine.

The unit end plates 3636 and 3637 are each supported by a pair of shouldered screw studs 3662 (Figs. 16 and 19) passing through forwardly and rearwardly elongated slots in the respective machine frame plates 27' or 28' and threaded into short posts 3663 secured to the outer side of the end plate. The forward one of each pair of shouldered screw studs 3362 passes snugly through an aperture in the forward end of a short link 3664, the rearward end of which receives an eccentric portion of a screw stud 3665 which is rotatable in a snugly fitting aperture in the machine frame plate 27' or 28' to adjust the link 3664 and the frame 3635—3638 precisely forwardly and rearwardly, after which the adjustment may be retained by tightening a nut on the inner end of each eccentric screw stud 3665 and tightening all the screw studs 3662.

The timing of the deenergization of the electromagnets 3643 is effected by means including a timing switch assembly (Figs. 20 and 21) comprising a supporting plate 3665 vertically slidably guided on the leftward face of the left end plate 3637 by a headed stud 3666 secured in the plate 3637 and passing through the vertical branch of a T-slot in the plate 3665 and by two headed studs 3668 secured in the plate 3665 and projecting rightwardly through vertical slots extending upwardly from the upper edge of a large cutout in the plate 3637. A shaped block 3670 of insulating material extends laterally across said cutout and on the right side of the plate 3637 to which it is secured at its forward and rearward ends at opposite sides of the cutout. The block 3670 carries ten pairs of contacts 3671, 3672, the lower contacts 3671 being carried on the upper ends of studs arranged in spaced relation in a forward and rearwardly running line in a ledge of the block extending rightwardly through the above-mentioned cutout in the plate 3637 and a generally registering cutout in the plate 3665. The ten upper contacts 3672 are carried by spring blades 3673 which are secured at their rightward ends to a raised right edge portion of the block 3670. The leftward end of each blade 3673 extends beyond the left side of the block 3670 and into the horizontal part of an L-shaped slot formed in the central wider portion of a respective one of ten upwardly and downwardly reciprocable flat plungers 3674, the narrower head portions of which are guided in slots in a leftward flange 3675 on the upper edge of the plate 3665 and project upwardly above said flange. The narrow lower stems of the plungers 3674 extend through and are guided in apertures in an angle piece 3676 secured against the left side of the plate 3665 below the lower edge of the above mentioned cutout therein. Each plunger 3674 is urged upwardly to engage the upper shoulders of its central widened portion against the underside of the top flange 3675 by a coiled compression spring 3677 surrounding the lower stem of the plunger 3674 between its central wide portion and the angle piece 3676. A light coiled spring 3678 surrounds the downward finger of the plunger formed by and leftward of the L-shaped slot and bears at its lower end lightly on a respective one of the contact blades 3673.

A stud 3680 secured in the plate 3665 extends rightwardly through a vertically elongated slot in the plate 3637 and into a cam slot in a cam arm 3681 secured on the shaft 3658 adjacent the right face of the plate 3637. The cam slot in the arm 3681 is so shaped and located that while the shaft 3658 is in normal position the plate 3665 is in its normal lower position as shown in Figs. 20 and 21, and when the shaft 3658 is rocked to rock the restoring blade 3653 to releasing position, the cam arm 3681, also rocked by the shaft 3658, raises the plate 3665 with its flange 3675 and angle piece guide 3676, although at that time all of the plungers 3674 are blocked against rising more than a very limited distance with the plate 3665 by engagement of their heads against the underside of a control bar 3682 secured on the lower edge portion of a slide 3683 forwardly and rearwardly slidably mounted leftward of the left guide member 535 on a roller between spacers on a stud 3684 secured in the frame plate 28' and on the rod 514 in like manner as the slides 511' and 512. The leftward end of the drive bail 531' engages in a socket member 3685 secured on the rightward face of the slide 3683 so that the slide and the bar 3682 move forwardly and rearwardly in accurate synchronism with the driving bail 531' and the differential slides which are coupled thereto.

The contact pairs 3671, 3672 are normally closed by the bias of the blades 3673 assisted by light pressure of the springs 3678, and all of them remain closed when the plate 3665 rises, the plungers 3674 being then blocked by the bar 3682 so that the compression of the springs 3677 is increased. However, as the bail 531' moves a little forward from its normal position and carries the differential slides 511' coupled thereto a little beyond their normal positions but substantially short of their first amount differential positions, the bar 3682 passes off of the head of the first plunger 3674 and allows the spring 3677 for the latter to elevate said plunger so that the bottom edge of its L-slot engages and lifts the blade 3673 of the rearmost one of the ten contact pairs 3671, 3672. After the bail 531' and differential slides 511' coupled thereto have passed their first amount differential position and substantially before they reach their next amount differential position, the bar 3682 frees the second rearmost plunger 3674 and allows it to be raised by its spring 3677 and open the second rearmost contact pair 3671, 3672 and so on until, when the bar 3682, the bail 531' and any amount differential slides 511' still coupled thereto have reached a point beyond the next to the last and the last amount differential position, the foremost plunger 3674 is freed and raised to open the foremost one of the contact pairs 3671, 3672.

The contact pairs 3671, 3672, as hereinafter described in detail govern circuits including the electromagnets 3643 (Figs. 17, 18 and 19) and the switches 3518, 3521 of the switch blocks 3515 (Figs. 9, 11, 12 and 13) of the master machine so that the armatures 3647 for each of the amount differential slides 511' of the slave machine are released at the proper times to arrest the latter slides in correct amount differential positions in accordance with the amount differential positions occupied by corresponding ones of the eight lowest order amount actuators 511 of the master machine at the time of setting the switches of the blocks 3515.

Understanding of certain portions of the following description will be facilitated by noting at this point that, for reasons relating to safeguard symbol printing as hereinafter explained in detail, the amount differential slides of the slave machine have ten digit differential positions forwardly of their normal positions, for which reason the notched detent plates 3661 (Figs. 16 and 17) have eleven equally spaced notches, the front notch being so located that when the armature 3647 engages therein it holds the differential slide in normal position against any but the very slight movement needed to provide necessary clearance. The first advanced position of the slides 511', corresponding to the second foremost notches in their plates 3661, are their "9" positions and the successive further advanced positions correspond to the digits of consecutively lower values down to "0." It will also be noted that the front two of the thirteen notches in each of the lock plates 549 for the eight amount differential slides 511' are not required.

*Proving means*

The slave machine is also provided with a proving switch assembly settable in accordance with the differential positions in which the eight amount differential slides 511' are arrested for the purpose of comparing those positions, as explained in detail hereinafter, with the differential positions of the eight lowest order amount actuator racks 511 of the master machine at the time of the last previous setting of the switch assembly 3501. The slave machine proving switch assembly is in general very similar to the switch assembly 3501 of the master machine so that only certain differences need be particularly explained. In the drawings the elements of the slave machine proving switch assembly 3701 (Figs. 16 and 22 to 26) and its operating means are identified by reference numbers which are higher by 200 than the reference numbers for the corresponding elements of the master machine switch assembly 3501 and its operating means, and a prime will be added where the elements are rather different.

Each of the eight switch block units 3715 (Figs. 22, 23 and 24) of the proving switch assembly includes six two-armed switch blades 3718 operated respectively by six toggle members 3723 rockable by twelve switch operating pins 3714 (Figs. 16 and 26) passing through two rows of apertures 3713 in the plate 3710'. Because of a shorter distance between successive differential positions of the differential slides 511' of the slave machine as compared with the distance between successive differential positions of the differential actuator racks 511 of the master machine, projections 3704' and 3705' and the notches 3706' and 3707' of the switch setting members 3702' and 3703' (Figs. 25 and 26) are arranged differently than the corresponding elements (Fig. 27) in the master machine. The fore and aft component of the center-to-center distance between the projections 3704' and 3705' is equal to the distance between successive digit positions of the differential slides 511' and the distance between successive pairs of laterally aligned pins 3714 in the two rows for each order is twice the latter distance so that in the advance of a slide 511', the two projections 3705' and 3704' are alternately positioned over successive pins 3714 in the respective ones of the two rows. The projection 3705' is over the rearmost pin 3714 in its row when the slide 511' is in its normal position and over the foremost pin in its row when the slide 511' is in its foremost ("0") differential position. The foremost pin 3714 in the row under the projection 3704' is utilized only for restoring the foremost toggle member 3723 and switch blade 3718 to central open position. There are two fixed contacts 3721 for each switch blade 3718 except the foremost blade for which only one contact 3721 is provided at the front of the right hand row.

The unit 3701 is placed in the forward portion of the slave machine, the switch operating members are mounted on the forward portions of the slides 511' and the unit 3701 is turned about so that its supporting arms 3711 extend rearwardly to their supporting pivot studs 3712 and the operating arm 3743 is at the rightward end of the shaft 3737. The yoke 3745 (Fig. 16) is also reversed, is connected with the arm 3743 by a shorter link 3744', and its supporting stud 3746 is located at the right side of the machine rearwardly of a vertical plane containing the axis of the shaft 126'. The cams 3749' and 3750' are secured on the rightward end portion of the shaft 126' and so angularly positioned that the switch unit 3701 is raised against the members 3702 and 3703 in the 114° to 140° portion of the slave machine cycle while the amount differential slides 511' are at rest in their differential positions and is returned to its normal lowered position in the 147° to 173° portion of the slave machine cycle before the slides 511' are returned toward normal. The manner and means of utilizing the settings of the switches of the unit 3701 thus effected will be described in detail hereinafter.

*Printing*

The slave machine has two laterally spaced sets of eight indexable amount type bars 562 (Figs. 16, 17 and 28) which are of the thirteen pitch variety like the four leftmost type bars 562 of the master machine except that the slave machine type bars are provided with types for the digits "0" to "9," with the "9" types in the second position from the top and the remaining digit types from "8" to "0" in successive lower positions. The six amount type bars for the dollars and higher orders in each of the two sets have "*" safeguard printing types in their top positions. The eight type bars 562 of the right hand set are compactly grouped to print amounts in the manner shown at the right hand portion of the check in the work example illustrated in Fig. 47. The left hand set of type bars is arranged in two groups, the right hand group containing the pennies and dimes order type bars being spaced from the other group containing the six type bars of the dollars and higher orders.

The slave machine is also provided with seven fixed type bars 562' which are generally like the indexable type bars except that the forward edges of their downward stems are located in shortened slots in the upper guide plate 608' and are notched to receive the edge of the guide plate at the ends of such shortened slots so as to be locked in fixed position. Those notches are so located as to position the fixed type bars with their uppermost type portions at the printing line.

One such fixed type bar 562' is immediately leftward of the highest order amount type bar of each of the two sets and has a "$" type at the printing line. Another one of the fixed type bars is immediately rightward of the pennies order type bar of the rightward set and has a "CTS" type at the printing line. Four more fixed type bars are located between the dollars and dimes order type bars 562 of the rightward set and have "DO," "L," "ARS," and "AND" types, respectively, at the printing line.

The eight indexable amount type bars 562 of each of the two sets are indexed to printing position by respective ones of the rack slides 523 of the eight amount differential slides 511' through gear trains contained in a compact gear cluster unit indicated generally at GC in Fig. 17 and which is of the same general character as the gear cluster unit of the master machine except that each individual gear train in the unit of the slave machine extends from the appropriate rack slide 523 to two type bars 562 of corresponding order, one in each of the two sets, and is further extended to a punch index bar of corresponding order of a punch mechanism referred to more particularly hereinafter. The gear cluster unit also contains in its left-hand portion three gear trains coupled with the three punch date indexing bars 3785 and with the three date differential actuator slides 512 to enable the latter to index said bars to date-punching positions in accordance with the settings of the levers 3626 (Fig. 17). One arrangement of the gear trains in each of the eight numerical orders and three date orders is indicated in the development of Fig. 28 but, as a considerable number of other suitable arrangements may readily be devised, need not be described in detail.

Unlike the master machine, the slave machine does not have a traveling paper carriage with a rotatable platen roller. A pair of spaced, parallel, vertical right and left side plates 3760 and 3761 (Figs. 16, 33 and 35) are each secured to one of two angle members 3762 (Figs. 33 and 38) each supported on and secured to the flat tops of the two mounting members 1064 secured on the upper edge of each of the two main frame plates 27' and 28'. The plates 3760 and 3761 are also spaced and rigidly braced by two cross members 3763 and 3764 connected to and between the upper edges of both at the front and rear, and by a third cross member 3759 connected to and between their central lower edge portions. An upright, flat, forwardly facing printing platen plate 3765 is secured, inwardly of its right-hand edge, to an angle member 3766 secured to the inner face of the plate 3760 adjacent its forward edge. The platen plate 3765 is also secured to a bracket 3767 secured to and extending upwardly in back of the plate 3765 from the rear face of the cross member 42. A guide plate 3770 spaced forwardly of the platen 3765 to form a paper chute of the desired thickness between them is secured to the lower edge portion of the platen 3765 by a number of screws which also pass through spacing elements of appropriate thickness located between the lower edges of the two plates. The upper and lower left corners of the plate 3770 also have forwardly bent lugs 3768 and 3769 (Fig. 33) which are secured to an upright side frame member 3782 of a punch unit referred to again hereinafter. The plate 3770 is formed with an opening extending laterally across the rearward sides of all the type carriers 562 and 562' to permit passage therethrough of all types at the printing line when struck by their printing hammers 605 said opening being preferably of a little greater vertical dimension than the ink ribbon 714.

The printing mechanism also includes, for all of the type bars 562 and 562', type hammers 605 like those of the master machine and similarly operated and controlled with two significant exceptions. As all of the hammers 605 of the slave machine are fired to print from all of the type bars in each printing operation, there are no latches controlled by the type bars to prevent firing of the hammers for type bars to the left of the highest significant digit of the amount being printed. Also, the shaft and notched disks, which in the master machine control the hammer-blocking latches 641, are replaced by a modified shaft 652' (Figs. 29 and 30) similarly rotatably mounted in the frame plates 607' of the printing mechanism but having a single radial flange or blade 3771. Normally, the blade 3771 is aligned with the forward ends of all of the latches 641 so as to prevent any of said latches from moving to permit printing operation of the associated hammers 605. The lower arm of a lever 3772 secured on the end of the shaft 652' rightwardly of the right hand plate 607' carries a stud 3773 engaging in a slot in a bent ear of the armature 3774 of an electromagnet 3775. A return spring 3776 normally holds the armature in clockwise retracted position against a limit stop and thereby holds the shaft 652' in the position in which the blade 3771 blocks movement of all of the hammer blocking latches 641 out of blocking position. In each cycle of operation of the slave machine the printing hammers are fired and re-cocked and the latches 641 are reset in the same manner and by similar means as in the master machine except that in the slave machine the hammer firing control cam is set in such angular position on the shaft 126' as to cause hammer fire at about the 192° point in the cycle and, furthermore, the hammers 605 are blocked by their blocking latches 641 unless the electromagnet 3775 is in an energized condition at the hammer firing time. The control circuit for the electromagnet 3775 will be described hereinafter.

While the electromagnet 3775 is energized and the blade 3771 is in blocking position, a lateral lug 3777 on an upper arm of the lever 3772 acts on the operating member of a normally self-closed switch 3778 to hold the latter open. The inking ribbon mechanism may be of any suitable form but is preferably substantially like that of the master machine with a few exceptions. As a ribbon vibrator or lift means is not required it is omitted and the two guides 3779 (Fig. 33) for the stretch of ribbon between the platen plate and the types at the printing lines are fixedly mounted on the guide plate 3770 at opposite sides of the array of type bars. Also, the ribbon spools 709 and their supporting and rotating spindles 707, together with the ribbon winding and reversing means, are mounted farther forward of the type bars to accommodate the punch mechanism hereinafter described, and the driving connections 740' and 741' for the ribbon winding mechanism have been lengthened accordingly.

Punch

The punch may be of any suitable form but is preferably like that shown generally at P in Fig. 33 and in vertical fore and aft section in Fig. 31. The punch frame is supported on and secured to the machine frame cross members 41 and 42 and includes left and right U-formed uprights 3781 and 3782, the latter of which was previously referred to as having the paper chute guide plate 3770 secured to it. The card slot between the punch guide plate 3783 and die plate 3784 is placed in coplanar alignment with the card slot between the printing platen 3765 and guide plate 3770 at the left end of the latter. The punch has a series of eight value or data indexing bars 3785 carrying punch operating plungers 3786. The lower stems of the bars 3785 are formed with rack teeth meshing with gears 3787 of the previously mentioned gear trains driven by the rack slide 523 carried by the differential slides 511', whereby, in each slave machine cycle, the punch is indexed for punching the same value as is printed by the type bars 562. The punch is powered and tripped or fired by a cam 3788 and restored by a cam 3789, both cams being secured on the shaft 126'. Power stored in springs 3780 by means including a cam follower roller 3790 operates toggle means which actuates a plate 3791 which drives the plungers 3786 to operate selected punches 3792 to effect punching upon release of toggle levers 3793 at both sides of the punch from latch levers 3794 tripped by arms 3795 also operated by the cam 3788. In the illustrated slave machine, means are provided to block punching operation of the punch under certain conditions as explained hereinafter. Such blocking means comprises an electromagnet 3796 (Fig. 32) mounted on the left side of the left side plate 3797 of the punch frame and having a pivoted armature 3798, the upper free end of which has a pin and slot connection with the lower arm of a lever 3799 secured on the left end of a shaft 3800 rotatably supported in both side plates 3797 of the punch frame. An armature return spring 3801 normally holds the armature 3798 retracted and the lever 3799 and shaft 3800 in such position that two arms 3802 secured on the shaft just inside of each of the side plates are positioned in the path of additional arms 3803 on the toggle levers 3793 so as to block said toggle levers and thereby prevent punching operation. Upon energization, the electromagnet 3896 pulls in its armature 3798 and rocks the lever 3799, shaft 3800 and arms 3802 to free the toggle levers 3793 for operation of the punch when the latches 3794 are tripped. At the same time, the lever 3799 also acts upon a normally self-closed switch 3804 mounted on the top plate 3805 of the punch frame, to open said switch. The latches 3794 are tripped at about the 185° point in the slave machine cycle. It will be apparent that the punching operation will then occur only if the electromagnet 3796 is in energized condition at that time.

Work form supply holder

A work form supply holder (Figs. 16, 33, 34 and 35) is supported on the front and rear cross members 3763 and 3764 connected between the upper edges of the plates 3760 and 3761. The form supply holder has a bottom plate 3810 formed with a pair of forwardly and rearwardly extending raised ridges 3811 to support the lower edges of the work forms and with turned up side edges to which are attached side plates 3812 also formed with lengthwise extending inwardly pressed portions to guide the side edges of the forms. A form stack follower 3814 is supported by roller studs 3815 secured to its rearwardly turned sides and running in forwardly and rearwardly extending slots 3816 in the side plates 3812. Rearwardly of the rollers 3815, the follower has a pair of studs 3817 also extending through the slots 3816 and adapted, when the follower is retracted to its rearmost position for placing a new supply of forms in the holder, to be dropped into retaining pockets 3818 in the rear ends of the slots to hold the follower in fully retracted position. The follower is urged forwardly by pull cords 3819 connected with the studs 3817 and with spring drums 3820 supported on rearwardly extending brackets 3822 secured to the outer sides of the side plates 3812, whereby the supply of forms in the holder is normally pressed forwardly against a low front plate 3821 extending across the lower part of the front of the holder and having forwardly bent ends secured to the brackets 3822.

Form feed and feed drive

The front form of the stack is also pressed against a picker plate 3825 (Figs. 16, 33, 34 and 35) having at each end a pair of upper and lower rearwardly bent ears 3826 which are apertured for upwardly and downwardly guided movement on rods 3827 secured in upper and lower rearwardly turned portions 3828 of the bracket 3822. A cross bar 3829 extends between and is secured to the two top portions 3828.

A rearwardly turned lug 3830 on each end of the picker bar 3825 is pivotally connected with the upper end of a link 3831 which is pivotally connected at its lower end to the forward extension of the forward arm of a crank 3832 pivotally supported on a stud 3833 secured to the outer side of a respective one of the plates 3760 and 3761. Each crank 3832 carries two rollers 3835 and 3836 (Fig. 16) bearing on the edges of respective ones of two complementary cams 3837 and 3838 secured on the outer ends of a shaft 3840 journalled in the plates 3760 and 3761.

The shaft 3840 is adapted to be driven through a clutch FC (Figs. 35 and 36) mounted on it rightwardly of and adjacent the plate 3761. The clutch FC is like the cycling clutch CC and its parts will be indicated by the same reference numbers with an "a" added. Its worm shaft bearing bracket 117a is supported by a bracket 3841 (Fig. 36) secured to the plate 3761 and its worm shaft 114a having secured thereon a pulley 3842 driven by a belt 3843 from a pulley 3844 coupled to the worm shaft 114 of the cycling clutch drive. The toothed arm 134a of the clutch FC is normally held in disengaged condition by one arm 137a of a yoke member 138a pivotally supported on a stud 3845 secured on the inner side of the plate 3761. The arm 137a is pivotally connected with the plunger of a solenoid 3846 supported by the plate 3761.

Upon energization, as hereinafter explained, the solenoid 3846 pulls in its plunger against the tension of a restoring spring 3847 to rock the control arm 137a counterclockwise to release the toothed arm 134a for movement to engaging position for rotation of the form picker drive shaft 3840. At the same time another arm 3848 of the yoke member 138a operates a self-opening single-pole, single throw switch 3849 to closed position to keep the power circuit of the motor closed until the shaft 3840 has completed an operation of the form picker. As the rotation of the form picker drive shaft 3840 nears completion of one revolution, the stud 1332a acts on the arm 1333a of the yoke member 138a to restore it to normal position to cause disengagement of the clutch at the end of the revolution of the shaft 3840 and to permit reopening of the switch 3849.

To prevent retrograde movement of the shaft 3840 after disengagement of the clutch FC, a detent arm 3850 (Fig. 37) is rockably supported on a stud 3856 secured in and extending leftwardly from the left side of the plate 3760. The detent arm is urged counterclockwise by a spring 3851 into engagement with a limit stud 3852 which is secured in the plate 3760 in position to locate a detent shoulder on the free end of the arm 3850 in the path of a pin 3853 carried by an arm 3854 secured to the shaft 3840. The parts are so arranged and proportioned that as the shaft nears completion of its revolution, the pin 3853 cams the arm 3850 away from the stud 3852 but permits the detent shoulder on the arm to drop behind the pin 3853 just as the shaft completes its revolution and thus prevent it from backing.

The picker plate 3825 carries two pickers 3860 extending through notches in the upper edge of the plate 3825 and projecting rearwardly therefrom almost one work form thickness over the top edge of the foremost work form. Each picker 3860 has at its front two lateral flanges of reduced thickness secured to the front face of the blade 3825 at opposite sides of the notches therein. On the front central portion of the upper face of the bottom plate 3810 of the form supply holder, a stop blade 3861 (Figs. 34 and 35) is adjustably secured by eccentrically shouldered screws so that the gap between the front end of the stop blade 3861 and a rearwardly pressed portion 3862 of the lower edge of the front plate 3821 may be nicely adjusted to slightly more than one form thickness.

Each revolution of the shaft 3840 lowers the picker blade 3825 from its normal upper position to cause the pickers to feed the foremost work form downwardly from the holder into the form chute in front of the printing platen plate 3765 and punch guide plate 3783 and behind the plate 3770 and the punch die plate 3784 (Fig. 31).

A gear 3866 secured to the worm wheel 124a which rotates continuously while the motor 88 is running, meshes with a gear 3868 secured on a shaft 3869 journaled in the plates 3760 and 3761. The shaft also has secured to it in laterally spaced relation two gears 3870 (Fig. 38) each meshing with a pinion 3871 having a friction feed roller 3872 secured to it and rotatable on a stud carried by the forward arm of a crank 3873 rockably supported on the shaft 3869 and urged clockwise by a spring 3874 to disengage the feed roller 3872 from a roller 3875 having a ball-bearing mounting on a stud 3876. The right hand stud 3876 is eccentrically adjustably mounted in a depending finger of the bracket 3822 and the left-hand stud 3876 is similarly mounted in a bracket 3877 secured on the forward part of the punch frame post 3782. Both the platen plate 3765 and the plate 3770 are apertured to permit the rollers 3872 and 3875 to have feeding engagement with the form inserted into the chute by the picker mechanism.

The downward arm of each crank 3873 bears against a roller 3878 on the upper end of a lever 3879 pivotally supported on a shaft 3890 supported in the plates 3760 and 3761. The levers 3779 are urged clockwise by springs 3891 strong enough to rock the respective cranks 3873 counterclockwise against the tension of the springs 3874 to engage studs 3892 in rearward arms against limit studs 3893 adjustably secured in brackets 3894 secured to the underside of the cross member 3763. Rollers 3895 carried by the lower ends of the levers 3879 are engageable by the edges of cam disks 3896 secured on a shaft 3897 journaled in the frame plate 27' and a bracket 3898 secured to the cross member 42. Rightwardly of the plate 27', a gear 3900 secured on the end of the shaft 3897 meshes with an idler gear 3901 (Fig. 16) which is rotatable on a stud secured in the plate 27' and in turn meshes with a gear 3902 secured on the shaft 126'. While the shaft 126' is in its normal rest position the rollers 3895 (Fig. 38) are free of the edges of the cams 3896 so that the springs 3891 maintain the cranks 3873 at their counterclockwise limits with the friction feed rollers 3872 in position for form feeding cooperation with the rollers 3875 so that the form injected into the chute by the picker mechanism is immediately fed down the chute by the rollers 3872 against suitable adjustable limit stops (not shown) for the bottom edge of the form.

A bracket 3910 secured to the back of the platen plate 3765 journals a vertical shaft 3911 having a bevel pinion 3912 secured thereto and meshing with a bevel gear 3913 secured on the shaft 3869. A gear 3915 secured on the shaft 3911 below the bracket 3910 meshes with a pinion 3916 having a friction roller 3917 secured thereto and rotatable on a stud carried in the end of a forwardly and leftwardly extending arm of a lever 3918 rockably mounted on the journal sleeve of the shaft 3911 and urged counterclockwise by a spring 3919 against a limit stop on the bracket 3910. The leftward down-turned end of the lever 3918 bears against the rear of a roller 3922 on the upper end of a lever 3923 rockably supported on the shaft 3890 and carrying on its lower end a roller 3924 bearing against a cam 3925 secured on the shaft 3897. The lever 3923 is urged clockwise by a spring 3926 but is normally held in a counterclockwise position by the cam 3925 so that the spring 3919 can hold the roller 3917 in retracted position to prevent it from impeding the down-feed of the form. However, at about the 128° point in the slave machine cycle, the cam 3925 permits the spring 3926 to rock the lever 3923 clockwise and the lever 3918 clockwise against the tension of spring 3919 to project the friction roller 3917 through an aperture in the platen plate 3765 into engagement with the form therein and behind a roller 3927 (Figs. 33 and 38a) positioned in an aperture in the plate 3770 and mounted on a ball-bearing on the lower part of a shaft 3928 supported in a bracket 3929 secured to the lower front face of the plate 3770. The roller 3917 then feeds the injected form leftward into engagement with adjustable limit means (not shown) so as to position the form for accurate location of the perforations to be made by the punch. After the form is stopped by its leftward limits, the leftward feed roller 3917 slips on the form and holds it against said limits until at about the 220° point in the slave machine cycle when the cam 3925 again restores the lever 3923 to normal and permits the spring 3919 to retract the roller 3917 from form engaging position.

A gear 3930 secured on the lower end of the shaft 3911 meshes with a gear 3930x secured on the lower end of another vertical shaft 3931 which is journaled in a sleeve 3932 secured in the bracket 3910 and has secured on its upper end a gear 3933 meshing with a pinion 3934 secured to a friction roller 3935 and rotatable on a stud 3936 carried by the end of a forwardly extending arm of a lever 3937 rockable on the upper part of the journal sleeve 3932 of the shaft 3931. A spring 3938 normally holds the lever clockwise against a limit stud on the bracket 3910 so that the friction roller 3935 is normally in a retracted and ineffective position. A downturned rightward end portion of the lever 3937 is engageable by a roller 3939 carried on the upper end of a lever 3940 rockable on the shaft 3890 and urged clockwise by a spring 3941. A roller 3942 carried by the lower end of the lever 3940 normally engages a cam disc 3943 secured on the shaft 3897 and thereby is normally held in a counterclockwise position permitting the spring 3938 to maintain the roller 3935 in retracted position. At about the 229° point in the slave machine cycle, after operation of the printing and punching mechanisms, the cam 3943 permits the spring 3941 to rock the lever 3940 clockwise and the lever 3937 counterclockwise to project the roller 3935 forwardly through an aperture in the platen plate 3765 into frictional engagement with the punched and printed form at a point behind a roller 3944 mounted on a ball-bearing on the shaft 3928 and positioned in an aperture in the plate 3770. The roller 3944 then feeds the form rightwardly into engagement between ejection rollers 3945 and 3946. At about the 318° point in the cycle, the cam 3943 restores the lever 3940 to normal and permits the spring 3938 to retract the roller 3935 to ineffective position. The front ejecting roller 3945 is rotatable on a stud 3947 eccentrically adjustably secured in a bracket 3948 secured to the plate 3770. The rear roller 3946 is secured to a pinion 3949 rotatable on a stud carried by the forward arm of a lever 3950 rockably supported on a journal sleeve 3951 carried by a bracket 3952 secured to the plate 3760. The pinion 3949 meshes with a gear 3953 secured on the lower end of a shaft 3954 journaled in the sleeve 3951 and having secured to its upper end a bevel pinion 3955 meshing with a bevel gear 3956 secured on the shaft 3869. A spring 3957 (Fig. 38b) urges the lever 3950 clockwise against a limit stud secured in the bracket 3952 to place the driven roller 3946 in effective position at all times to complete ejection of any form fed to the rollers 3945 and 3946 by the roller 3935.

When the form is in precisely correct position for proper punching and printing it closes three single-pole, single-throw switches 3960, 3961 and 3962 by acting on projections extending from the operating arms of each into the form chute. The switch 3960 is mounted on an arm 3963 secured at one end on the top of the cross member 42 and engaged at its other end by a conical cam head 3964 on an adjusting screw lockable in adjusted position in a bracket 3965 also secured to the member 42. A finger 3966 on the operating arm of the switch extends through openings in the plates 3765 and 3770 to be engaged by the form and to close the switch when the central lower edge of the form is in exactly proper position.

The switch 3961 is supported on a bracket 3967 secured to the inner side of the plate 3761 and its operating arm 3968 extends into the bottom of the left end of the form chute in proper position to be depressed by the left end of the lower edge of the form when the latter portion of the form is in exactly proper position.

The switch 3962 is also supported by the bracket 3967 and a finger 3969 on its operating arm extends into the left end of the form chute to be engaged by the form and close the switch when the left end edge of the form is in exactly correct position.

*Form receiver and stacker*

A receiver and stacker for the printed and punched forms may be placed with its receiving slot or chute in position to receive the printed and punched forms ejected laterally from the chute between the plates 3765 and 3770 by the ejecting rollers 3945 and 3946. The receiver and stacker may be of any suitable form and construction, such as that illustrated generally in Figs. 44 and 45, having a lateral receiving chute 3975 at a suitable height for alignment with the slave machine ejection chute and opening through a side wall 3976 of the stacker adjacent the rear wall 3977 thereof and immediately above a rail or ledge 3978 secured to the inner face of the rear wall to guide and support the lower edge of the received form until the form tips forwardly to fall face down upon a stack support plate 3979. The supporting plate 3979 is secured to an arm 3980 extending through a vertical slot in the rear wall 3977 and secured to a sleeve 3981 slidable on a vertical rod 3982 secured in spaced relation to said wall in mounting brackets 3983. An open-coiled spring 3984 surrounding the rod 3982 below the sleeve 3981 is of just sufficient strength to support the sleeve 3981, arm 3980 and stack supporting plate 3979 at their uppermost positions with the rear edge of the plate 3979 just below the form guide rail 3978, and soft enough that the weight of received forms stacked thereon will lower the plate enough to maintain the top of the stack always a little below the guide rail.

To insure that the received forms will be dropped face down on the stack in the same order as received, a pair of tipping fingers 3985 are secured to a shaft 3986 rotatable in projections 3987 extending rearwardly from the rear wall 3977. A crank arm 3988 secured to the shaft 3986 is connected to the plunger of a solenoid 3989 supported on the wall 3977 so that when the solenoid is energized the forwardly extending upper ends of the fingers 3985 will be projected through openings in the rear wall 3977 to engage the upper portion of the received form and tip it forwardly. A guard 3990 secured to the top of the wall 3977 has a top flange projecting forwardly over the wall 3977 to prevent forms from bounding out of the receiver stacker. A vertical guide rod 3991 mounted in projections 3992 extending rearwardly from the wall 3977 is engaged by a forked lateral lug 3993 of the arm 3980 to prevent horizontal turning of the arm and plate 3979 into frictional engagement with the walls of the stacker.

*Timing switches*

A series of single-pole, single-throw timing switches 4001—4007 (Fig. 42), mounted on a bracket 4008 (Fig. 17) secured to and depending from the cross member 41, is each operable by an individual roller 4009 engaging the edge of a respective one of a series of seven cam disks 4011 to 4017 secured on the shaft 126'. Four of these switches 4001, 4002, 4004 and 4007 are normally open, whereas the remainder are normally closed. These switches will be referred to again individually in the description hereinafter of the operating and control circuit of the machine.

*Relay unit*

Figure 43:
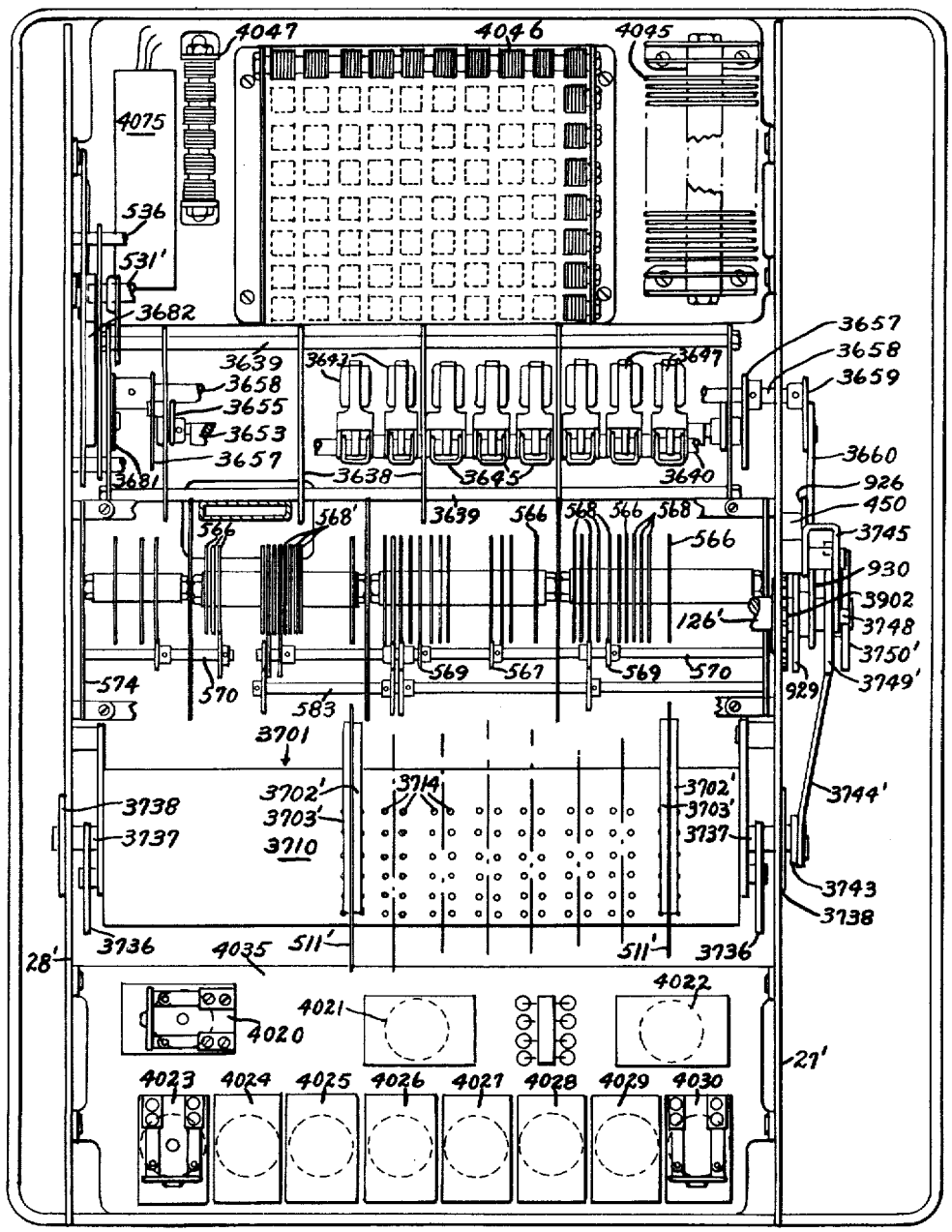
Fig. 43 shows the slave machine base pan with certain assemblies located in the lower part of the slave machine.

A series of eleven relays 4020–4030, and which will be referred to individually in the description of the operating and control circuit hereinafter, are assembled on a unitary supporting base 4035 secured at its sides to the frame plates 27' and 28' in the lower front portion of the machine as shown in Fig. 43. The same supporting plate 4035 also carries a group of eight current limiting resistors connected in series with the windings of the indexing detent control magnets 3643.

*Power rectifier and isolating rectifier unit*

A power rectifier 4045 (Fig. 43), an assembly 4046 of eighty isolating diodes or rectifiers, a further assembly 4047 of three additional isolating rectifiers or diodes, and a high capacity electrolytic capacitor 4075 are all mounted on a supporting plate 4049 secured to the side plates 27' and 28' at the lower rear portion of the machine.

*Signal lamps and manual control switches*

A cover plate 4055 (Fig. 40) mounted on the upper edges of the side plates 27' and 28' at the forward portion of the machine carries a pair of signal lamps 4056 and 4057 below small colored windows. Plate 4055 also mounts a main power control toggle operated double-pole, single-throw switch 4060 for the slave machine and a button-operated, normally closed, reset switch 4061 which will be referred to more particularly in the following description of the operating and control circuit.

CONTROL CIRCUIT

Figure 48A:
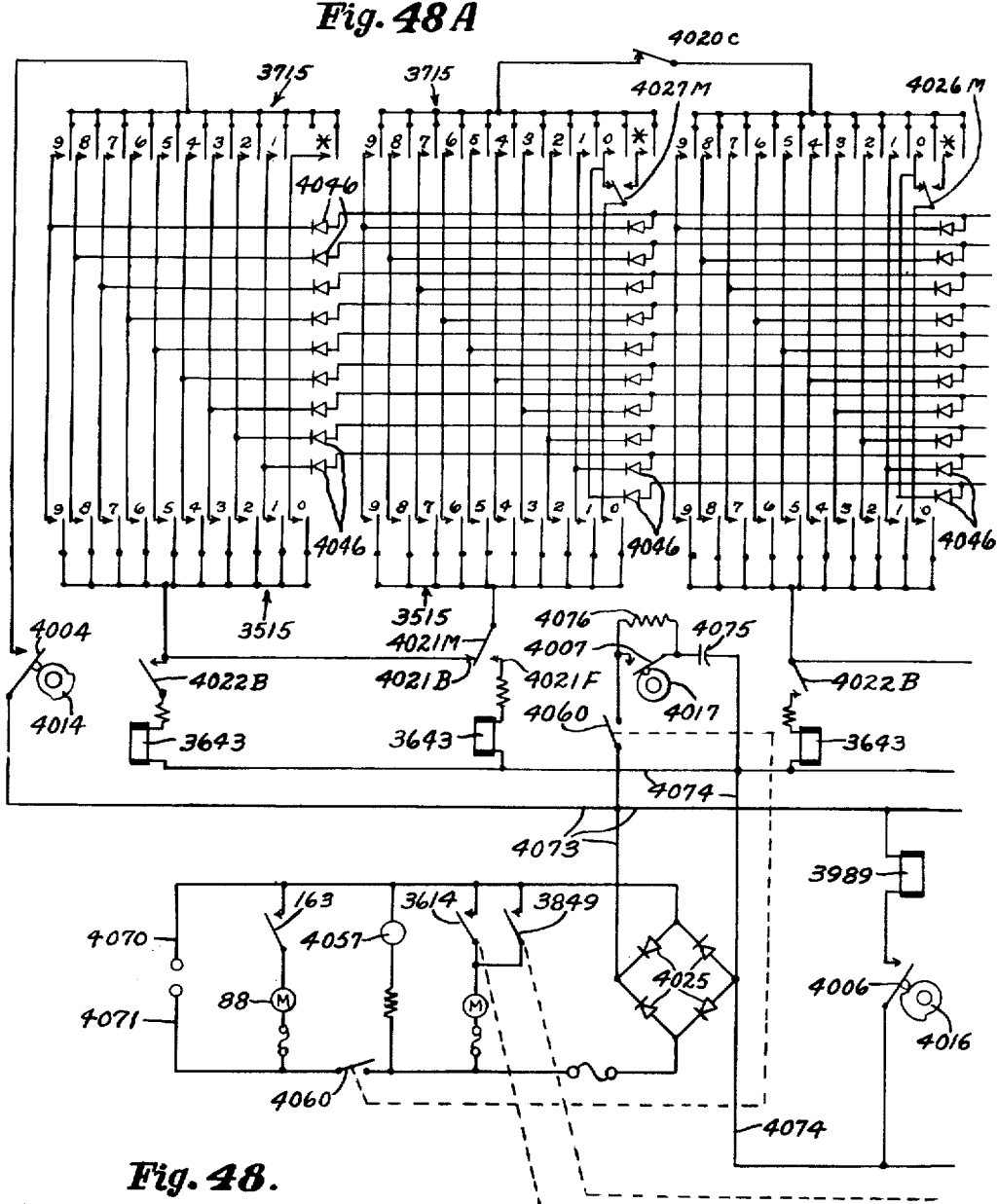
Figure 48B:
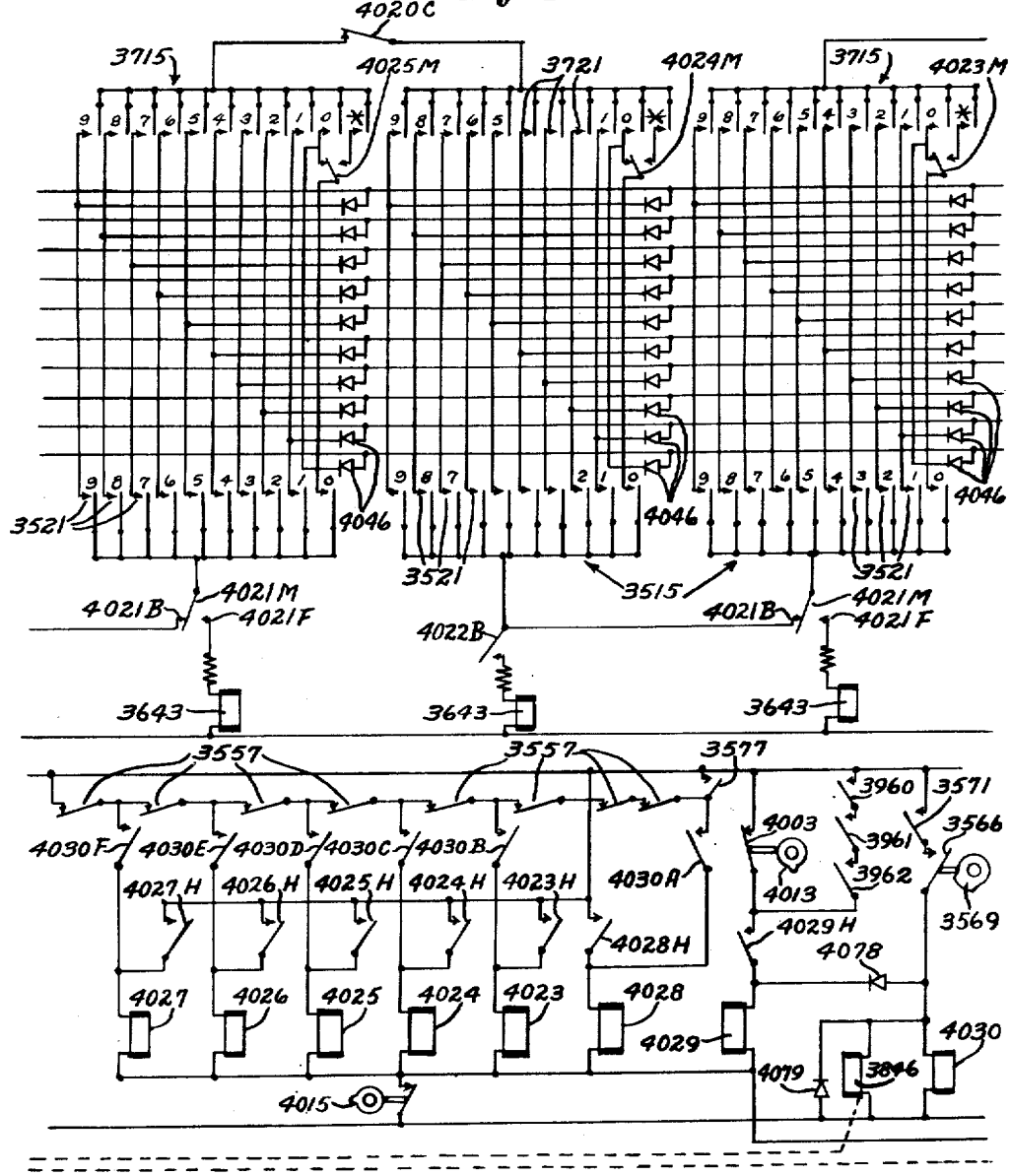

The control circuit is shown diagrammatically in Fig. 48A–C where components hereinbefore referred to and illustrated in other figures of the drawings are again identified by the same reference numbers.

The slave machine receives A. C. power supply through a pair of conductors 4070 and 4071 connected, respectively, to the two power supply conductors of the master machine. One contact pair of the previously mentioned toggle switch 4060 is inserted in the conductor 4071 and the lamp 4057 is connected in series with a current limiting resistor across the conductors 4070 and 4071 beyond the switch 4060 to indicate when the slave machine power is on. The two switches 3614 and 3849, actuated by the slave machine clutch control magnets 3608 and 3846, are connected in parallel, and the parallel combination is connected in series with the slave machine drive motor M across the A. C. line 4070, 4071.

The rectifier assembly 4025 is arranged as a full wave bridge rectifier receiving A. C. input from the line 4070, 4071 and supplying D. C. output power to positive conductor 4073 and negative conductor 4074. A filter circuit having voltage regulating means is connected across the conductors 4073 and 4074 and comprises a capacitor 4075 connected to the conductor 4074 and to one terminal of a resistor 4076, the other terminal of which is connected through the second contact pair of the toggle switch 4060 to the conductor 4073, the terminals of the resistor being also connected to the normally open contacts of the switch 4007. The filter capacitor 4075 is sufficiently large (125 mf.) in relation to the load current drawn from the power rectifier 4025 that, when the contacts 4007 are closed, the capacitor will draw sufficient charge during the peak portion of each rectified half wave to maintain the average voltage on the D. C. conductors 4073 and 4074 relatively near the peak voltage. The resistor 4076 is of a value (1500 ohms) which permits the capacitor 4075 to be charged sufficiently while the switch 4007 is open so that the contacts of said switch will not be fused and stuck by a heavy charging surge at the instant of closing, but limits the current both in and out the capacitor 4075 while the switch 4007 is open and is so limited that the average voltage across the conductors 4073 and 4074 is near the average of the A. C. input reduced by the voltage drop through the rectifier. The purpose of that will be explained hereinafter.

The negative D. C. power conductor 4074 is connected to one side of the magnet winding 3643 of each of the slave machine differential slide arresting detents. The other side of each of the windings 3643 for the even numbered orders, counting the lowest order as the first order, is connected through a current limiting resistor with one contact of a respective one of four normally open contact pairs 4022B of the relay 4022, the other contact of each of said pairs being connected to all of the movable contact levers 3518 of the switch block 3515 for the corresponding even numbered order in the master machine. The other side of each of the remaining windings 3643 is connected through a current limiting resistor to the normally open forward contact 4021F for a respective one of four movable contact blades 4021M of the relay 4021, each of said blades 4021M being connected to all of the movable contact levers 3518 of the switch block 3515 of the corresponding odd numbered order in the master machine. Normally, all of the movable contact levers 3518 in the switch block 3515 for each even numbered order are connected through one of four normally closed back contacts 4021B to the movable contact 4021M connected to the movable switch blades 3518 of the block 3515 for the next lower order.

Each of the fixed contacts 3521 for the digits from "1" to "9" in each block 3515 is connected, through a cable conductor, to the fixed contact 3721 for the corresponding digit in the block 3715 in the slave machine. In the first (lowest) and second orders, the "0" contact in the block 3515 is connected to the "0" contact in the block 3715, and the "*" contact in the block 3715 is unconnected, whereas in the eighth (highest) order, the "0" contact of the block 3515 is connected to the "*" contact in the block 3715 and the "0" contact of the latter is left unconnected. In each of the remaining third to seventh orders, the "0" contact 3521 of the block 3515 is connected to the movable contact of a respective one of the relays 4023 to 4027, each of said movable contacts 4023M to 4027M being normally engaged with a back contact 4023B to 4027B connected to the "0" contact 3721 in the block 3715 for the corresponding order, and disengaged from a forward contact 4023F to 4027F connected with the "*" contact 3721 of the block 3715 for the corresponding order.

Through the same cable conductors, each of the contacts 3521 for the digits "1" to "9" of each of the switch blocks 3515 of the master machine is connected to the cathode of a respective one of the rectifiers or diodes 4046, the anode of which is connected to the corresponding digit contact 3671 of the timing switch assembly of the slave machine. In the two lowest orders, the "0" contacts 3521 are also likewise connected through individual isolating rectifiers to the "0" contact 3671 of the timing switch. In the third to seventh orders, the "0" contacts 3521 are connected to the movable contact 4023M—4027M of the relay 4023—4027 of corresponding order and the normally closed back contacts of all of the relays 4023 to 4027 are connected through individual isolating diodes to the "0" contact 3671 of the timing switch. The "0" contact 3521 of the eighth or highest order has no connection with the "0" contact 3671. All of the contact blades 3672 of the timing switch are connected by a common conductor to one of the contacts of the normally open switch 4001, the other contact of which is connected to the positive D. C. power conductor 4073.

The movable contact levers 3718 of the highest order switch block 3715 are connected to one of the contacts of the normally open switch 4004, the other contact of which is connected to the positive D. C. power conductor 4073. The movable contact levers 3718 of each of the switch blocks 3715 for the seventh, fifth and third orders are connected through a respective one of three pairs of normally closed contacts 4020C of the relay 4020 to the movable contact levers 3718 of the block 3715 of next lower order. The movable contact levers 3718 of the lowest order block 3715 are connected through a fourth normally closed pair of contacts 4020C of the relay 4020 and thence through a normally closed pair of contacts 4028C of the relay 4028 with one of a normally open pair of contacts 4029B of the relay 4029. The other contact of the pair 4029B is connected to one side of the windings of each of the printing and punch control magnets 3775 and 3796, the other side of both of said magnets being connected through the normally closed switch 4005 to the negative D. C. power conductor 4074. Surge potentials developed in the windings of the magnets 3775 and 3796 as they are deenergized are shorted by diode or rectifier 4077.

All the "0" switches 3557 for the eight lowest order master machine differential racks 511 are all connected in series between the positive D. C. power conductor 4073, to which the eighth order switch 3557 is connected, and one contact of a normally open contact pair 4030A of the relay 4030. The latter contact is also connected to one of the contacts of the negative total switch 3577, the other contact of which is also connected to the positive D. C. power conductor 4073. The other contact of the pair 4030A is connected to one side of the winding of the relay 4028. The same side of the latter winding is connected to one of a pair of holding contacts 4028H of the relay 4028 to the positive D. C. power conductor 4073. Each of the conductors between each two adjacent "0" switches 3557 is connected to one contact of a respective one of five normally open pairs of contacts 4030B to 4030F of the relay 4030, the other contact of each of said pairs being connected to one side of the winding of a respective one of the relays 4023 to 4027. The same side of the winding of each relay is connected to one of a pair of normally open holding contacts 4023H to 4027H of the same relay, the other contact of each pair being connected to the positive D. C. power conductor 4073. The remaining side of the winding of each relay 4023 to 4028 is connected through the normally closed switch 4005 to the negative D. C. power conductor 4074.

The master machine carriage position controlled switch 3571 and cam controlled switch 3566 are connected in series between the positive D. C. power conductor 4073 and the anode of an isolating diode or rectifier 4078, one side of the winding of the relay 4030, and one side of the winding of the form feed clutch controlling solenoid 3846 of the slave machine. The remaining sides of the last-mentioned two windings are connected directly to the negative D. C. power conductor 4074. Surge potentials developing in both of the last-mentioned windings upon deenergization are shorted by a diode or rectifier 4079.

The cathode of the isolating diode or rectifier 4078 is connected to one side of the winding of the relay 4029. The same side of the latter winding is connected to one of its pair of holding contacts 4029H, the other contact of the pair being connected through the normally closed switch 4003 to the positive D. C. power conductor 4073. The other side of the winding of the relay 4029 is connected through the normally closed switch 4005 to the negative D. C. power conductor 4074.

The three form position verifying switches 3960, 3961 and 3962 are connected in series around the switch 4003.

One side of the winding of the master machine interlock magnet winding 3578 is connected to the positive D. C. power conductor 4073. The other side of the later winding is connected through a current limiting resistor and through both normally closed switches 3778 and 3804 in parallel to a movable contact 4029M of the relay 4029 and to one side of the reset switch 4061, the other side of which is connected to one contact of the switch 3589 operated by the magnet 3578, the other of said contacts being connected to the negative D. C. power conductor 4074. The reset switch 4061 is normally closed and shunts a pair of normally open contacts 4029A of the relay 4029.

A series combination of warning lamp 4056 and current limiting resistor are connected between the positive D. C. power conductor 4073 and the contact 4029L normally engaged by the contact 4029M so that the lamp 4056 will light whenever the interlock magnet 3578 is energized while the relay 4029 is in normal deenergized condition.

The normally open forward contact 4029N for the movable contact 4029M of the relay 4029 is connected to the movable contact of the switch 3561, the normally open forward contact of which is connected to the negative D. C. power conductor 4074. One side of the windings of each of the relays 4020, 4021 and 4022 and one side of the winding of the slave machine cycling clutch control magnet 3608 are all connected through the normally closed switch 4002 to the positive D. C. power conductor 4073 and the other side of each of those four windings is connected to the normally closed back contact of the switch 3561. Surge potentials developed in the latter four windings upon deenergization are shorted by a diode or rectifier 4080.

The normally open front contact and the normally closed back contact of the switch 3561 are connected to opposite sides of the normally open switch 3591 on the front panel of the master machine.

The four contact pairs 4022B, of the relay 4022, the four forward contacts 4021F, of the relay 4021, the switch 4601, and the ten contact pairs 3671, 3672 of the timing switch assembly, when all of them are closed, and the four pairs of contacts 4020C of the relay 4020 are opened, establish, for each of the differential actuator slides 511′ of the slave machine, an indexing control circuit including the switches of the master machine switch blocks 3515 and the slave machine differential actuator slide indexing detent magnets 3643, the operation of which indexing control circuits will be further described presently. As above stated, the various digit contacts of the switch blocks 3515 of the master machine are connected through cable conductors to the corresponding digit contacts of the switch blocks 3715 of the corresponding orders of the slave machine. The switch 4004 when closed, the four pairs of normally closed contacts 4020C of the relay 4020, the four pairs of normally closed back contacts 4021B of the relay 4021, the normally closed contacts 4028C of the relay 4028 and the contacts 4029B of the relay 4029, when closed, establish a proving circuit through the pairs of switch blocks 3715 and 3515 of all orders in series to test correct indexing of the slave machine differential actuator slides 511′ as will be explained more fully presently.

In the normal condition of the circuit as described above, and shown in Figs. 48A–C, none of the relays, magnets and solenoids is energized.

MODE OF OPERATION AND EXAMPLE OF WORK

The operation of the invention will be explained with reference, by way of example, to a particular kind of payroll posting and pay check writing work illustrated in Fig. 47.

The mode of operation of the master machine, excepting the operation of the new provisions made therein by the present invention, is substantially as disclosed in the Butler patent and need not be described herein beyond the necessary explanation of the operation and effects of the new provisions. A complete series of master machine operations for a complete posting of one payroll account will be described before entering into a description of the operation of the slave machine.

In making ready for a payroll posting and pay check writing run, a supply of serially prenumbered pay check forms of the kind indicated generally in Fig. 47 is placed in the form supply holder 3810 of the slave machine, with the lowest numbered check form facing forward at the front. A continuous journal sheet and an overlying carbon sheet are threaded around the platen of the master machine carriage. After running the master machine through the necessary clearing operations to make sure that the crossfooter and all registers are cleared, the ledger sheet or card for the first payroll account to be posted is inserted in the master machine carriage which is then moved to position for printing on the journal carbon leftward of the left margin of the ledger form. At this point the slave machine power switch 4060 is closed to place the master machine interlock magnet 3578 under control of certain elements of the slave machine as hereinafter explained to prevent further operation of the master machine unless the slave machine is in proper condition. Then the serial number of the last previously issued pay check is entered on the keyboard of the master machine and a cycle of operation of that machine is initiated by depression of a motor bar. In the course of that operation the previous check number is printed in the column designated "Check No. Pre-charge" in Fig. 47, and added in the number 8 register of the multiple register unit in the B position of the machine. After printing, the carriage skip-tabulates to the columnar position designated as "Col. 1" in Fig. 47, and the machine is ready to begin the payroll posting and check-writing run.

The amount of base pay, the number of regular work hours completed, and the payroll period date are entered on the keyboard of the master machine which is again cycled to print those figures in the base pay column of the ledger sheet and to add the amount of base pay into the #1B register and in the A crossfooter. After printing, the paper carriage tabulates to the column 2 position, which is a non-print position intermediate the base pay and "Nights" column, where a further machine cycle is automatically initiated. In that cycle the check number register #8B is automatically advanced one unit by means forming no part of the present invention and not disclosed herein, and the carriage tabulates to the column 3 position whereupon the operator enters the number of hours of night work performed and the amount of pay therefor on the master machine keyboard and again cycles that machine to print those figures in the "Nights" column of the ledger form and to add the amount of night work pay in #2B register and the A crossfooter. The paper carriage tabulates to the "Overtime" column 4 position where the hours of overtime and the amount of overtime pay are entered on the keyboard of the master machine, which is again cycled to print those figures and to add the amount of overtime pay in the #3B register and the A crossfooter. The carriage then tabulates to the column 5 position where a machine cycle is automatically initiated to subtotal the A crossfooter and print the gross earnings. Then the paper carriage tabulates to the column 6 position where the tax deluction is entered on the keyboard and the machine is again cycled to print that amount in the "Tax" column and to add that amount in the #5B register and subtract it from the A crossfooter. The paper carriage then tabulates to the column 7 position where a bond purchase payment is entered on the keyboard and the machine is cycled to print the payment amount in the "Bonds" column and to add the amount in the #6B register and subtract it from the A crossfooter. The paper carriage then tabulates to the column 8 position where a total of miscellaneous deductions is entered on the keyboard and the master machine is again cycled to print that figure in the "Misc." column, and add it in the #7B register and subtract it from the crossfooter, after which the paper carriage automatically returns across the machine to the column 9 position.

When the carriage reaches the column 9 position, there is automatically initiated a cycle of operation of the master machine in which a subtotal is taken and printed from the #8B register and printed in the "Check No." column. This number corresponds to the number of the check form which is at the front of the supply stack in the slave machine form supply holder. In the course of this operation of the master machine, the paper carriage again moves in the return direction to the column 10 "Net Pay" where another cycle of operation of the master machine is automatically initiated to take a total from the A crossfooter and print it. This total will be the "Net Pay" figure which is to be printed and punched by the slave machine upon the check form bearing the number just previously printed in the "Check No." column. The slave machine does not operate during any of the operations of the master machine initiated with its carriage in the columns 1–9 positions because the switch 3571 controlled by the master machine carriage is not closed when the carriage is in any of the columnar positions 1 to 9, but when the paper carriage of the master machine reaches the column 10 or "Net pay" columnar position, the switch 3571 (Figs. 14 and 48B) is closed by the action of the switch controlled lug 3573 on the paper carriage upon the switch operated arm 3572. The closing of this switch 3571 is prerequisite to any operation of the slave machine, so that in the example of work being described the slave machine will not operate in any cycle of operation of the master machine excepting a cycle initiated with the paper carriage in the column 10 position.

Figure 46:
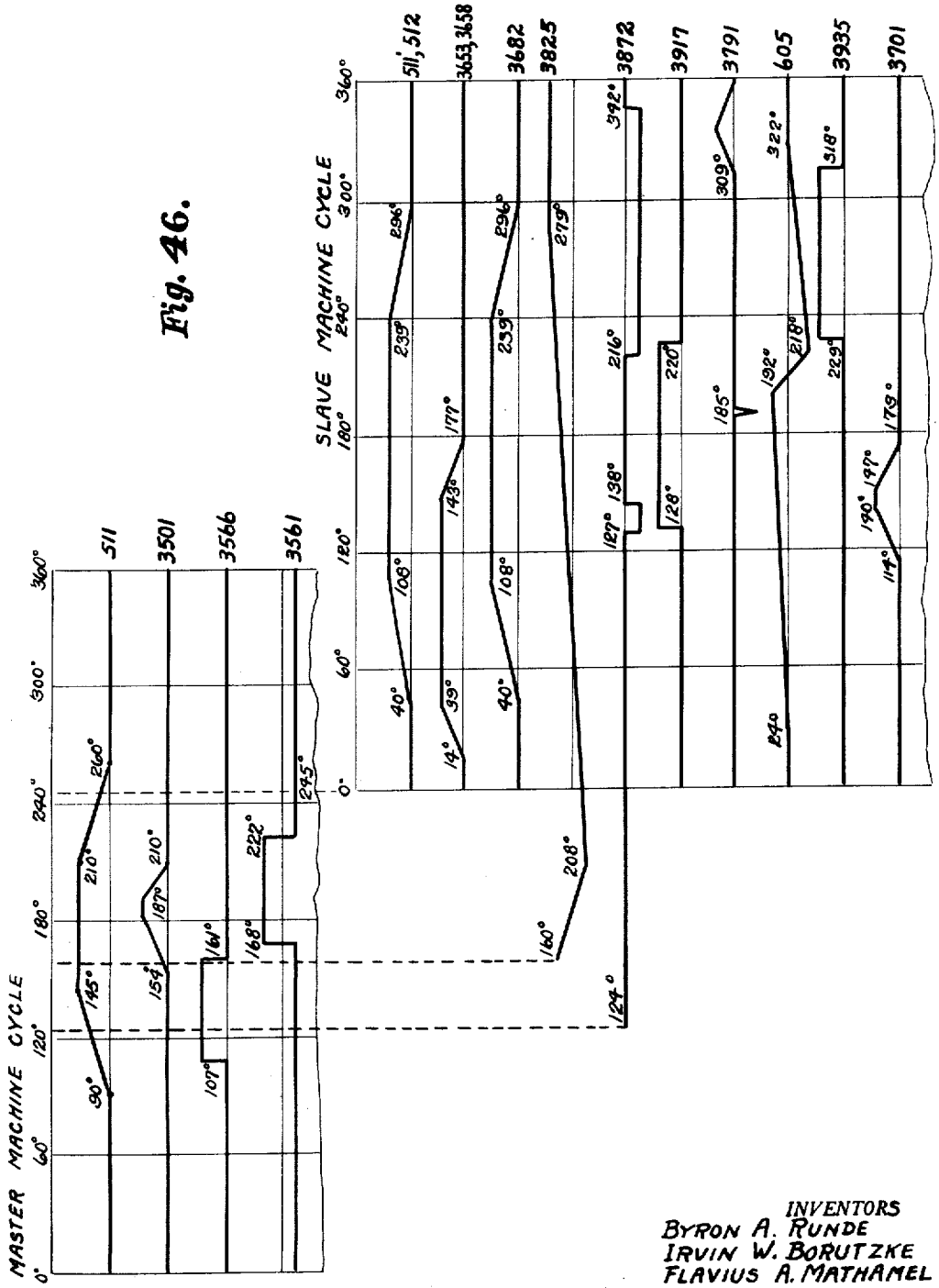
Fig. 46 is a timing chart.

In each cycle of operation of the master machine the switch 3566 (Fig. 4) is closed at the 107° point and remains closed until the 161° point as shown in the timing chart of Fig. 46. The closing of the switch 3566 in a master machine cycle initiated with the paper carriage in the column 10 position, where the carriage controlled switch 3571 is held closed, completes the energizing circuits for the relays 4029 and 4030 and the slave machine form-feeding clutch control solenoid 3846 (Fig. 35).

The relay 4029 closes its holding contacts 4029H to complete its holding circuit through the normally closed switches 4003 and 4015, closes its contacts 4029A to bypass the reset switch 4061 so that inadvertent opening of the latter switch will not affect operation of either machine, transfers its movable contact 4029M from the back contact 4029L to the forward contact 4029N, and closes the pair of contacts 4029B in the proving circuit.

The relay 4030 closes all of its contact pairs 4030A to 4030F to close energizing circuits for the relays 4023 to 4028 for all orders including and above the highest order in which a switch 3557 is open because the differential actuator rack 511 of corresponding order of the master machine has moved from its normal "0" position to a significant digit differential position. It will be noted that the relay 4028 serves for the two lowest or cents orders, and there is an individual relay 4023—4027 for each of the five next higher orders, but no corresponding relay for the highest of the eight orders of the slave machine. The reason for this arrangement of the relays 4023 to 4028 will appear presently.

Each one of the six relays 4023 to 4028 which is energized closes its holding contacts 4023H—4028H and each one of the five relays 4023 to 4027 which is energized transfers its movable contact 4023M—4027M from its back contact to its forward contact whereby the "0" contact 3521 of the switch blocks 3515 for all orders including and higher than the highest order in which the differential actuator rack 511 of the master machine is moved to a significant digit differential position, are disconnected from the isolating rectifiers 4046 connected to the "0" contact 3671 of the timing switch assembly, and are likewise disconnected from the "0" contacts 3721 of the switch blocks 3715 of corresponding orders and connected to the "*" contacts 3721 of the latter switch blocks. As will appear presently, there is no need to use the "0" contact 3721 of the highest order switch block 3715 because "0" will never be printed by the highest order type bar of the slave machine, and the "*" contacts 3721 of the pennies and dimes order blocks are not needed as it is not desired to print "*" from the type bar of either of the latter orders.

Except in the case where the total in the master machine A crossfooter is negative, which will be explained later, the relay 4028 is not energized unless all of the switches 3557 remain closed because of a zero total from the master machine A crossfooter in the column 10 operation. As it is not desired to print a check if the amount is either zero or negative, the relay 4028, when energized, opens its normally closed contacts 4028C in the proof circuit and thereby, as later explained, prevents operation of the printing and punching mechanisms of the slave machine.

The solenoid 3846 requires a little time to operate sufficiently to close the slave machine motor switch 3849. However, that switch is closed and the form feed clutch FC is engaged at about the 124° point of the master machine cycle, whereupon the form picker 3825 is reciprocated to insert the first prenumbered pay check form of the supply stack in the holder 3810 into the form chute between the platen 3765 and the plate 3770 of the slave machine. As soon as the lower edge of the check form is engaged between the down feed roller pairs 3871, 3875 and 3872, 3877, these rollers feed the check downwardly to place its lower edge firmly and accurately at the bottom of the chute. The downstroke of the slave machine form picker 3825 begins at about the 160° point of the master machine cycle and is completed at about the 208° point of that cycle.

In each cycle of operation of the master machine the switch assembly 3501 is operated in the manner previously described, being elevated from its normal position from about the 154° point to about the 180° point to cause one of the switch levers 3518 to be operated to close upon one of the ten contacts 3521 corresponding to the differential position of the corresponding actuator rack 511, after which the switch assembly 3501 is restored downwardly to normal from the 187° point to about the 210° point of the master machine cycle. Thus from slightly prior to the 180° point of each master machine cycle, switches in all of its switch blocks 3515 will be set in accordance with the digits in the eight lowest orders of the amount ordered or total drawn in that cycle of operation of the master machine, and the switches in the blocks 3515 will remain so set until shortly after the 154° point in the next master machine cycle.

At about the 168° point of the master machine cycle the movable contact of switch 3561 is transferred from the normally closed back contact to the forward contact to thus close the energizing circuit of the interlock magnet 3578 extending from the positive D. C. power conductor 4073 through the winding on said magnet and its current limiting resistor and through the normally closed switches 3778 and 3804, through the closed forward contact 4029N of the relay 4029 and through the now closed forward contact of the switch 3561 to the negative D. C. power conductor 4074. As the interlock magnet 3578 operates to place the interlock latch hook 3588 in latching position, it also operates the switch 3589 to close a holding circuit for the magnet 3578 extending from the normally closed switches 3778 and 3804 through the closed contacts 4029A of relay 4029 in parallel to the reset switch and through the now closed switch 3589 to the negative D. C. power conductor 4074. It will be apparent that this holding circuit for the interlock magnet 3578 will now remain closed until and unless both of the printer and punch controlled switches 3778 and 3804 are opened.

At about the 222° point in the master machine cycle the movable contact of the switch 3561 is again disengaged from its forward contact and reengaged with its back contact, which closes an energizing circuit for the slave machine cycling clutch controlled magnet 3608 and for the three relays 4020, 4021 and 4022, said circuit being traced from the negative D. C. power conductor 4073 through the normally closed switch 4002 and through the windings of the magnet 3608 and of all three of the relays 4020, 4021 and 4022 in parallel to the now closed back contact of the restored switch 3561 to the closed forward contact 4029N of the relay 4029 and through the reset switch 4061 and interlock switch 3589 to the negative D. C. power conductor 4074.

The relay 4020 operates to open its four pairs of normally closed contacts 4020C of the proving circuit.

The relay 4021 transfers its four movable contacts 4021M from their back contacts 4021B of the proving circuit to their forward contacts 4021F of the indexing control circuits for the odd numbered orders.

The relay 4022 operates to close its four normally open contact pairs 4022B to complete the indexing control circuits for the even numbered orders.

Thus, except for the closing of the switch 4001, the indexing control circuits for all eight orders are thus readied in the interval following the setting of the switches of the blocks 3515 in the column 10 operation of the master machine and the beginning of the slave machine cycle.

The slave machine cycling clutch control magnet 3608 requires a little time to operate. Although its energizing circuit is closed as described above at about the 222° point in the master machine cycle, the engagement of the slave machine cycling clutch CC to start the slave machine cycle to drive the slave machine main drive shaft 126' is not effected until about the 245° point of the master machine cycle.

At the 5° point in the slave machine cycle, the cam 4017 closes the switch 4007 to short the resistor 4076 in the filter circuit and increase the average voltage across the D. C. power conductors 4073, 4074 in the manner previously explained. If for any reason, the slave machine should fail to cycle in response to cycling of the master machine with the carriage switch 3571 closed, the switch 4007 will remain open, the voltage across the D. C. power conductors 4073 and 4074 will not be so increased, and the risk of any circuit components being damaged by overheating before the failure is noticed and corrected. The switch 4007 reopens at the 355° point of the slave machine cycle.

At about the 10° point in the slave machine cycle, the switch 4001 is closed by operation of the cam 4011, whereupon all of the indexing detent control magnets 3643, excepting those for orders higher than the highest order in which a master machine actuator 511 moved to a significant digit differential position are now energized over circuits extending from the positive D. C. power conductor 4073, one or another of the normally closed contact pairs 3671, 3672 of the timing switch assembly, the associated rectifiers 4046, the now closed related pair of contacts 4022B or the related now closed forward contact 4021F, and through the respective magnet winding 3643 to the negative D. C. power conductor 4074.

Within the first few degrees of the slave machine cycle, the cams 929 and 930 begin the clockwise rocking of the shaft 3658 and the two cam arms 3657 and the cam arm 3681 secured on the shaft 3658. The cam arm 3681 elevates the timing switch plunger supporting plate 3665 to its elevated position a little prior to the 39° point of the slave machine cycle but as the timing switch control member 3682 then in blocking position above all of the plunger 3674, none of the ten normally closed contact pairs 3671, 3672 is opened at that time.

From about the 14° point to about the 39° point of the slave machine cycle, the cam arms 3657 rock the restoring bail 3653 for the indexing detents out of holding position in relation to the detent control arms 3650 and subject the indexing detents 3647 to the pull of the springs 3652 urging the detents to elevated position. As the magnets 3643 for any and all orders from the lowest order to the highest order in which a master machine amount differential actuator rack 511 moved to a significant digit differential position are at that time energized, all the detents 3647 for the differential actuator slides 511' of corresponding order of the slave machine will remain held down against the pull of the springs.

However, in all of the higher orders, if any, in which the actuator racks 511 of the master machine remained in "0" position and held their switches 3557 closed, the movable contact of the corresponding one of the relays 4023–4027 will have broken the connection of the "0" contact of the switch block 3515 to the "0" contact 3671 of the timing switch and as all the "1" to "9" contacts 3521 in those orders are open, the enrgizing circuits for the indexing detent magnets 3643 of those orders will be open so that their detents 3647 will immediately rise to engage in the "*" notches of the notched plates 3661 on the differential actuator slides 511' of the same orders to lock those slides 511' in their normal "*" positions. Also, in the highest order in which the master machine differential actuator rack 511 moved to a significant digit position, the "0" contact 3521 will have been disconnected from the "0" contact 3671 of the timing switch but that is of no consequence because such "0" contact 3521 is open and the circuit of the magnet 3643 of corresponding order is closed through one of the other digit contacts 3521 for that order.

At about the 40° point in the slave machine cycle, the slave machine bail 531' begins its forward movement carrying with it the timing switch control member 3682 and all of the differential slides 511' which have not been locked by their detents 3647. The position of the rear edge of the control member 3682 is so related to the ten digit differential positions of the slides 511' that spring contact blade 3673 of each of the ten digit contact pairs of the timing switch is released to open its digit contact pair before the slides 511' reach the corresponding digit differential position, but after they have moved beyond the previous position. Accordingly, the energizing circuit of each energized magnet 3643 will remain closed until the differential slide of the same order approaches the digit differential position corresponding to the digit differential position to which the master machine amount differential rack 511 of the same order moved, after the slide 511' has moved forwardly at least a little beyond its previous differential position. As each magnet 3643 is deenergized by such opening of its circuit, its detent 3647 will be snapped upwardly to engage in the proper notch in the plate 3661 of its slide 511' to arrest the latter in the digit differential position corresponding to the digit differential position to which the master machine differential actuator rack 511 of the same order was moved in the master machine cycle initiated with the paper carriage in the column 10 position.

The forward movement of any differential actuator slide 511' which moves as far forward as its "0" position is completed at about the 108° point of the slave machine cycle. As all of the slides 511' are locked in their differential positions by the locking plates 549 until they are again picked up by the bail 531' in the return movement of the latter, it is not necessary for the detents 3647 to continue to hold the slides 511' more than a brief interval after they have arrested the slides. The detents 3647 are lowered to normal position by their restoring bail 3653 and the timing switch plate 3665 and plungers 3673 are lowered to normal position during the 143° to 177° portion of the slave machine cycle, notwithstanding that the return of the differential actuator slides 511' by the bail 531 is not effected until the 239° to 290° portion of the slave machine cycle.

As the differential actuator slides 511' move to their differential positions they carry with them the rack slides 523 which, through the gear trains previously referred to, elevate the punch indexing bars 3785 of corresponding order and the type bars 562 of corresponding order in both type bar sets of the slave machine. As in the master machine, the driving bail 531' drives each of the rack slides 523 a uniform distance beyond the position in which the corresponding differential slide 511' is arrested. In the slave machine this amount of additional movement of the rack slides 523 is sufficient to elevate the punch indexing bars 3785 from normal position to lowermost punch positions, and to raise the type bars 562 from their normal positions below the printing line to their "*" printing positions. This extra amount of movement of the punch indexing bars and the type bars 562 occurs after arrest of the differential actuator slides 511' in differential positions. In any case however, all of the punch indexing bars and all of the type bars 562 are in their proper punching and printing positions corresponding to the amount printed by the master machine at or before the 114° point of the slave machine cycle.

At about the 108° point in the slave machine cycle the normally closed switch 4002 is opened by the cam 4012 to break the energizing circuits of the slave machine cycling clutch control magnet 3608, and of the relays 4020, 4021, and 4022. The relay 4022, restoring, now reopens its four contact bars 4022B, interrupting the circuits of the indexing control magnets 3643 in the even numbered orders and the relay 4021, restoring, transfers its four movable contacts 4021M from their forward contacts 4021F to their back contacts 4021B, thereby opening the energizing circuits of the indexing control magnets 3643 of the odd numbered orders, prior to the reclosing of the contact pairs 3671, 3672 of the timing switch. The relay 4020, restoring, recloses its four pairs of contacts 4020C which together with the transfer of the movable contacts 4021M of the relay 4021 to their back contacts 4021B prepares the proving circuit for completion by the closing of the switch 4004 after the switches of the proving switch assembly have been properly set in accordance with the positions of the slave machine differential actuator slides 511', as will be described presently.

The deenergization of the magnet 3608 at this time is of no consequence since the slave machine motor switch 3614 is held closed by the spring 3611 (Fig. 35) until the arm 3605 is restored by the crank stud 3615.

At about the 114° point of the slave machine cycle the proving switch assembly 3701 is elevated by the cams 3749' and 3750' to set the switches in the switch blocks 3715 in all orders to close the switching lever 3718 upon that one of the contacts 3721 which corresponds to the position then occupied by the differential slide 511' of the corresponding order. When the switches in the switch blocks 3715 are thus set, and providing that the differential slides 511' of the slave machine have been moved to positions correctly related to the positions to which the actuator racks 511 of corresponding order in the master machine were moved, the contact 3721 engaged by a switch lever 3718 in each of the block 3715 will be that contact 3721 which is connected through a cable conductor with that one of the contacts 3521 of the block 3515 of corresponding order in the master machine which is engaged by a switch lever 3518 in that block.

At about the 127° point in the slave machine cycle the form injecting feed rolls 3871 and 3872 which, prior to that time, have moved the check form to the bottom limits of the chute between the platen 3765 and the plate 3770 and have thereafter been slipping on the rear surface of the form, are retracted by the action of the cams 3896 on the rolls 3895. Almost immediately thereafter— that is, at about the 128° point of the slave machine cycle—the roller 3924 drops off the high edge of the cam 3925, releasing the lever 3923 to the action of the spring 3926 which rocks the latter left and the lever 3918 against the tension of the spring 3919 to project the feed roll 3917 against the rear surface of the form to move it leftwardly into engagement with the left edge form limits in the chute to insure accurate columnar position of the perforations in the form to be made by the punch.

When the form reaches its left edge limits, the left feed roll 3917 slips on the rear surface of the form to maintain the left edge of the form accurately positioned until about the 220° point of the slave machine cycle; that is, until after the printing and punching have been effected. The purpose of retraction of the down-feed rolls 3871 and 3872 is to insure that they will not interfere with any necessary leftward movement of the form required for accurate positioning. However, as that accurate leftward positioning is quickly effected, the cams 3896, at about the 138° point of the slave machine cycle, again act on the rollers 3895 to rock the levers 3879 against the tension of the springs 3891 to again permit the springs 3874 to return the down-feed rolls 3871 and 3872 to active position, so as to maintain the lower edge of the inserted form also accurately positioned against its lower edge limits in the chute, as the down-feed rolls slip on the rear surface of the form, until about the 216° point of the cycle when the cams 3896 again retract the down-feed rolls 3872 to hold them retracted until near the end of the slave machine cycle when the cams 3896 again permit the down-feed rolls to be returned to active position in preparation for the next cycle of operation of the slave machine. It will be apparent that the form will be in accurate position for printing and punching at a time intermediate the 127° and the 138° points of the slave machine cycle, and will be maintained accurately positioned until after printing and punching. Whether or not printing and punching are permitted depends, however, upon whether or not the punching and printing mechanism of the slave machine are properly indexed.

At about the 140° point of the slave machine cycle the switch 4003, which is normally closed to short the series combination of the three form position verifying switches 3960, 3961 and 3962, is opened by its cam 4013. At this time, unless all three of the form position verifying switches are closed by a properly positioned form, the holding circuit of the relay 4029 will be broken. Long prior to this time the original energizing circuit for the relay 4029 has been broken by the reopening of the switch 3566 in the master machine at about the 161° point of the master machine cycle. Providing that the switches 3960, 3961 and 3962 are closed, the relay 4029 remains energized and does not release. The switch 4003 is permitted by its cam 4013 to close at about the 158° point of the slave machine cycle so as again to maintain the holding circuit for the holding relay 4029 thereafter independently of the form position verifying switches. If, however, one of the latter is open during the 140° to 158° portion of the slave machine cycle, the relay 4029 will be released and will open its back contacts 4029B in the proving circuit with an effect which will be explained later.

At about the 151° point in the slave machine cycle the switch 4004 is closed by its cam 4014 and thereby completes the proving circuit if the slave machine is otherwise properly conditioned for printing and punching a check form. This proving circuit extends from the positive D. C. power conductor 4073 for the switch 4004 to all of the switch levers 3718 of the highest order switch block 3715 and to one of the contacts 3721 of that switch block corresponding to the position of the differential actuator slide 411' of the highest order of the slave machine. From the latter contact 3721 the circuit extends through a cable conductor to the corresponding contacts 3521 of the highest order switch block 3515 of the master machine. If the position of the 8th order differential slide 511' of the slave machine corresponds to the differential position of the eigth order actuator rack 511 of the master machine at the time of setting the switches in the highest order switch block 3515, the last mentioned contact 3521 will be engaged by a switch lever 3518 to extend the proving circuit to the now closed 7th order back contact 4021B of the relay 4021, and thence to the switch levers 3518 of the 7th order switch block 3515 and to the closed contact 3521 of the latter switch block. From the last mentioned contact 3521, which corresponds to the position of the 7th order differential actuator 511 of the master machine at the time the switches in the 7th order block 3515 were set, the circuit extends through the corresponding cable conductor to the corresponding contact 3721 of a 7th order switch block 3715. If the position of the 7th order differential slide 511' of the slave machine corresponds to the position to which the corresponding actuator rack 511 of the master machine was indexed, the last mentioned contact 3721 will be engaged by its switch lever 3718 to extend the circuit through the now closed 6th order contact pair 4020C of the relay 4020 to the switch levers 3718 of the 6th order block 3715. If all of the slave machine differential slides 511' are properly positioned in accordance with the positions which the corresponding differential actuators 511 of the master machine occupied at the time of setting the switches of the switch assembly 3501 of the master machine, the proving circuit will similarly be extended through the switch blocks 3715 and 3515 of each of the 8 orders from the highest to the lowest, and finally through the lowest order pair of contacts 4020C of the relay 4020, and thence through the back contacts 4028C of the relay 4028, unless the relay 4028 was previously energized by reason of all of the zero switches 3557 of the master machine having been held closed by the occurrence of a zero total in the master machine, or by reason of the switch 3577 having been closed by the occurrence of a negative total in the master machine. Also, if any of the eight differential actuator slides 511' of the slave machine is in a position other than that to which the actuator rack 511 of correspondnig order of the master machine was moved in the column 10 operation, the contact 3721 engaged by a switch lever 3718 in the block 3715 for that order will be one of the contacts 3721 other than the one which is connected through the cable conductor to that one of the contacts 3521 which is engaged by a switch lever 3518 in the block 3515 of corresponding order, so that the proving circuit will not be closed through the switch blocks 3515 and 3715 of that order.

Assuming, however, that none of the above-mentioned contingencies has arisen and that the contacts 4028C are still closed, the proving circuit is extended through the still closed contacts 4029B of the relay 4029, and thence through the windings of the print and punch control magnets 3775 and 3796 in parallel and through the still closed switch 4005 to the negative D. C. power conductor 4074. In other words, if the slave machine is properly conditioned for printing and punchnig a check for the correct amount, the magnets 3775 and 3796 will be energized immediately after the 151° point of the slave machine cycle.

The magnet 3775 (Fig. 18), upon being energized, rocks the hammer latch control bail 3771 to releasing position to permit movement of all of the hammer latches 641 to hammer releasing position by their springs 612, so that the hammers 605 are thus conditioned for printing operation when they are released from their firing bail 619 at about the 192° point of the slave machine cycle. Energization of the magnet 3775 also rocks the arm 3777 to open the switch 3778.

The magnet 3796, when energized, rocks the latch arms 3802 out of blocking position to permit subsequent punching operation of the punch mechanism when it is tripped by operation of its latches 3794 at about the 185° point of the slave machine cycle. Energization of the magnet 3796 also rocks the lever 3899 to open the switch 3804 (Fig. 22).

The opening of both switches 3778 and 3804 breaks the holding circuit of the master machine interlock magnet 3578 and permits the latter to release and reopen its holding contacts 3589 so as to prevent lighting of the warning lamp 4056 when the relay 4029 releases later. When the interlock magnet 3578 releases, it also permits the interlock detent 3588 (Fig. 4) to return to normal out of the path of the master machine cycling control lever 192 so that a further cycle of operation of the master machine may be initiated at any time thereafter. In other words, it is not necessary to delay further work of the master machine beyond the point at which it has been ascertained that the slave machine may properly complete its operation.

As already mentioned, if the print control magnet 3775 and the punch control magnet 3796 are energized in the manner explained above, the punch will operate at the 185° point of the slave machine cycle to punch the appropriate date and amount on the check form as illustrated in the date column and amount column of the left hand portion of the check form in Fig. 45, and at the 192° point the printing hammer will be fired to cause printing of the amount together with the "$" sign symbols and the words "Dollars And" and "CTS" as shown in Fig. 45.

After the printing and punching operation, and at about the 216° point of the slave machine cycle, the switch 4005 is opened by its cam 4015 and remains open until the 254° point of the slave machine cycle, when it is again restored to normal closed position. When the switch 4005 opens, it breaks the circuits of all of the relays 4023 to 4029, permitting these relays and all of their contacts to restore to normal condition. The opening of the switch 4005 also opens the proving circuit including the printing and punch control magnets 3775 and 3796, permitting the latter to restore and reclose their switches 3778 and 3804 in the circuit of the interlock magnet 3578. The circuit of the interlock magnet 3578 has, however, previously been opened by the opening of the switch contacts 3589, which also prevents lighting of the warning signal lamp 4056 upon return of the movable contact 4029M of the relay 4029 to its back contact 4029L.

Finally, at about the 229° point of the slave machine cycle, the cam 3943 releases the lever 3940 through the action of its spring 3941 to permit the spring 3938 to project the ejecting feed roll 3935 into engagement with the printed and punched check form, which is thereby moved rightwardly and engaged by the ejecting rollers 3946 and 3945 which remove it completely from the printing and punching chute into the stacker. In the early portion of the next slave machine cycle, the switch 4006 is closed by its cam 4016 to operate the stacker solenoid 3989 (Fig. 44) to drop the completed check form face down upon the pile in the stacker.

It was previously mentioned that if any of the differential actuator slides 511' of the slave machine are not indexed to the positions which correspond to the positions to which the differential actuator racks 511 of the master machine were moved in the column 10 operation, the proving circuit would not be closed. It was also mentioned that if the amount actuator racks 511 of the eight lowest orders of the master machine remain in their normal zero positions in the master machine cycle during which the slave machine cycle was initiated, the relay 4028 would be energized to open the proving circuit at the normally closed contacts 4028C. It was also mentioned that if a negative total were drawn in that operation of the master machine, the switch 3577 would be closed to energize the relay 4028 and likewise cause it to open the proving circuit. It was further mentioned that if a check form were not properly positioned in the printing and punching chute in the slave machine, one or more of the switches 3960, 3961 and 3962 would be open to cause the relay 4029 to deenergize during the 140° to 158° portion of the slave machine cycle. If so deenergized, the relay 4029, upon release, would reopen its normally open contacts 4029B in the proving circuit prior to the closing of the switch 4004 in the proving circuit.

If, for any of the above reasons, the proving circuit is not closed upon the closing of the switch 4004, the printing and punch control magnets 3775 and 3796 are not energized and consequently the printing hammer latch bail 2771 remains in blocking position to prevent printing operation of the printing hammers and the punch blocking latch arms 3802 remain in position to block operation of the punch. Likewise because of the failure of the magnets 3775 and 3796 to be energized, the switches 3778 and 3804 are not opened to break the energizing circuit of the interlock magnet 3578. The latter remains energized to maintain the master machine interlock latch 3588 (Fig. 6) in position to prevent a further master machine cycle initiating downward movement of the master machine cycling control lever 192. Likewise, upon release of the relay 4029, when the switch 4005 is opened, or immediately if the release of the relay 4029 occurred previously because of the failure of one of the form position verifying switches 3960, 3961 and 3962 to close, the warning signal lamp 4056 will be lighted by current through the circuit completed at the back contact 4029L of relay 4029.

After the master machine has been locked in the manner above described, any of a number of different procedures may be followed as may be desirable in connection with the particular account system or work system in effect. One of such procedures may be as follows: Upon noticing the warning light or upon finding the master machine locked against operation, the operator should depress the error key of the master machine, if that is necessary, to clear the amount section of the keyboard. Also the slave machine power switch 4060 may be opened. This will deenergize and restore all relays and magnets of the slave machine as well as the interlock magnet 3578 of the master machine. The operator may then move the paper carriage of the master machine to the column 1 position and, beginning in that position, may repeat all of the operations above described in columns 1 to 8 except that the register subtract key should be maintained in depressed position. This will insure that all of the entries made in the several registers during the previously unsuccessfully attempted posting would be removed therefrom and that "1" will be subtracted from the check numbering register #8B to reduce the number therein to that which it contained prior to the attempted posting. Any suitable measure may be adopted for avoiding accumulation of any incorrect amount in the crossfooter during such register correcting operations, such as, for example, maintaining the crossfooter non-add key in depressed position throughout all of those operations. After the manually initiated correcting operation in column 8 and the following automatically initiated operations in columns 9 and 10, the carriage will again return to column 1, whereupon the operator, after reclosing the slave machine power switch 4060, may again start the posting to the same account unless, of course, the previous failure of the slave machine to operate was due to the occurrence of a negative balance or a zero balance in the account. In any event the unpunched, unprinted check form which is uppermost in the stacker (Figs. 44 and 45) may be taken therefrom and reinserted in the slave machine form supply holder at the front of the stack of forms therein prior to the reposting of the same account or the posting of the next account. It may be noted that the opening of the slave machine power supply switch 4060 will deenergize all of the magnets and relays so that any of them, such as the interlock magnet 3578 which may be energized at the time of the lock-up, will be deenergized and will restore to normal, thereby restoring the entire circuit to normal.

In certain other procedures which may be followed following a locking of the master machine due to an erroneous operation, the master machine may be released for operation simply by opening the reset switch 4061, which breaks the circuit of the interlock magnet 3578 to permit the interlock latch 3588 to return to normal non-locking position.

In some circumstances, as for example when a form becomes wedged in the slave machine printing and punching chute and does not eject therefrom, the switch button 3590 at the front of the master machine may be operated to close the switch 3591 which will close the energizing circuit for the cycling clutch control magnet 3608 as well as the relays 4020, 4021 and 4022. In that event, the slave machine will be cycled and the ejecting rollers 3946 and 3945 will operate and may succeed in ejecting the form from the slave machine. It will be readily apparent that in such a cycle of operation of the slave machine the switches 3561 and 3566 will not be operated and the proving circuit will not be closed because of the failure of the relay 4029 to energize so that the printing and punch mechanisms of the slave machine will not operate in that cycle.

In the event that it should be desirable not to energize the stacker operating solenoid 3989 during such an independent cycle of the slave machine resulting from manual closing of the switch 3591, the stacker solenoid, instead of being connected in series with the cam-operated switch 4006 across the D. C. power conductors 4073 and 4074 as shown in Fig. 48A, may be connected in parallel with the form feed clutch controlling solenoid 3846 which, as indicated previously, is energized only in those cycles of operation of the slave machine which are initiated automatically in a cycle of operation of the master machine in which both the switches 3566 and 3571 are closed.

It will also be apparent that the normally closed switch 3778 operated by the printing control magnet 3775, instead of being connected in parallel with the switch 3804 operated by the punch control magnet 3796, may be replaced by a normally open switch connected in the energizing circuit of the latter magnet immediately adjacent thereto so that the printing control magnet 3775, by operation of such switch, closes the energizing circuit of the punching control magnet 3796, which in turn operates the switch 3804 in the manner already described to control the master machine interlock magnet 3578.

All of the isolating rectifiers and diodes 4046 of Figs. 48A, B and C may be replaced by a solenoid operated switch unit having an individual pair of normally open contacts replacing each rectifier 4046 and having its operating winding connected in parallel with the cycling clutch control magnet 3608. All of such contact pairs would, therefore, be closed by energization of the operating solenoid of the switch unit at the same time as the magnet 3608 is energized and establish the indexing control circuit at the proper time to govern the indexing of the slave machine differential actuators 511', and would be opened (restored) before the proving circuit is established. It will further be apparent that as such a solenoid operated switch unit would be operated with the same timing as above disclosed for the relays 4020, 4021 and 4022, all three of such relays may be dispensed with by including in the solenoid operated switch unit contacts corresponding to and replacing the four pairs of normally closed contacts 4020C of the relay 4020, the four sets of single-pole double-throw contacts 4021B, M and F of the relay 4021, and the four pairs of normally open contacts 4022B of the relay 4022.

In the foregoing, only one example of work has been described. It will, however, be apparent that any of a variety of kinds of work may equally well be performed by the apparatus of the present invention, it being only necessary to provide the function control program unit 1731 of the master machine with the necessary arrangement of function control projections 1767 and with one or more slave machine cycling control projections 3573 located in the proper position.

It will be readily apparent that by providing the necessary arrangements of control projections 1767 and 3573 in the automatic function control program unit 1731 of the master machine, the combination of the two machines may readily be conditioned for the performance of any desired one of four predetermined kinds of work by merely rotating the program control knob 1741 to the correct position in the same manner as the machine of the Butler patent is conditioned for different kinds of work requiring different automatic function control programs. Any one of the slave machine cycling control lugs 3573 in the program control unit 1731 of the master machine will, of course, hold the switch 3572 closed only when the master machine carriage is in a predetermined columnar position in a predetermined program setting of the control unit 1731 corresponding to one position of the control knob 1741.

In the foregoing, a preferred embodiment of the invention and certain modifications thereof have been disclosed by way of example. It will, however, be understood that the invention is susceptible of various further modifications within the scope of the appended claims.

The read-out and read-in means herein described and shown as employed in transfer of information from the master machine to the slave machine is a modification of means included in the subject matter of an application Serial No. 497,901, filed March 14, 1955, by William W. Deighton and Uselma Clarke S. Dilks for "Data Transmission System."

We claim:

1. Accounting apparatus comprising a master accounting machine and a slave machine, each machine having a means to drive it through cycles of operation, a corresponding plural order series of differential actuators each movable between a normal position and any of a series of differential positions, means driven by the drive means of the respective machine to advance its differential actuators to differential position and again return them to normal position in a cycle of operation of the respective machine, and differential stop means to arrest the differential actuators of the respective machine in any selected ones of their differential positions, said apparatus further comprising a settable static memory means for each of said differential actuators of the master machine, means operated by the drive means of the master machine while the differential actuators of the master machine are in differential position to set said memory means in accordance with the different positions of the latter actuators, cycle-initiating electrical circuit means operable under control of the drive means of the master machine after the beginning of the return movement of the differential actuators of the master machine to initiate a cycle of operation of the slave machine, and indexing electrical circuit means controlled by said static memory means and including circuit-controlling means controlled by the drive means of the slave machine to operate the differential stop means of the slave machine to arrest the differential actuators of the latter in differential positions determined by the setting of said memory means.

2. Accounting apparatus comprising a master accounting machine and a slave machine, the master machine having recording means including a traveling carriage movable to any of a plurality of recording positions, and each machine having a means to drive it through cycles of operation, a corresponding plural order series of differential actuators each movable between a normal position and any of a series of differential positions, means driven by the drive means of the respective machine to advance its differential actuators to differential position and again return them to normal position in a cycle of operation of the respective machine, and differential stop means to arrest the differential actuators of the respective machine in any selected ones of their differential positions, said apparatus further comprising a settable static memory means for each of said differential actuators of the master machine, means operated by drive means of the master machine while the differential actuators of the master machine are in differential position to set said memory means in accordance with the differential positions of the latter actuators, cycle-initiating electrical circuit means, including elements governed by said carriage in accordance with the recording position thereof and further elements operable under control of the drive means of the master machine, to initiate a cycle of operation of the slave machine after the beginning of the return movement of the differential actuators of the master machine in a cycle of operation of said master machine performed with said traveling carriage in a predetermined one of its recording positions, and indexing electrical circuit means controlled by said static memory means and including circuit-controlling means controlled by the drive means of the slave machine to operate the differential stop means of the slave machine to arrest the differential actuators of the latter in differential positions determined by the setting of said memory means.

3. Account apparatus comprising a master accounting machine and a slave machine, each machine having a means to drive it through cycles of operation, a corresponding plural order series of differential actuators each movable between a normal position and any of a series of differential positions, means driven by the drive means of the respective machine to advance its differential actuators to differential position and again return them to normal position in a cycle of operation of the respective machine, and differential stop means to arrest the differential actuators of the respective machine in any selected ones of their differential positions, said apparatus further comprising a static memory means for each of said differential actuators of the master machine settable under control of the drive means of the master machine in accordance with the differential position in which said differential actuator is arrested, cycle-initiating electrical circuit means operable under control of the drive means of the master machine at a predetermined time in a selected cycle of operation thereof to initiate a cycle of operation of the slave machine, indexing electrical circuit means controlled by said static memory means to operate the differential stop means of the slave machine to arrest the differential actuators of the latter in differential positions determined by the setting of said memory means, comparing circuit means governed by said memory means, by the drive means of the slave machine, and by the differential actuators of the latter machine in accordance with the differential positions in which they are arrested, and detecting means governed by said comparing circuit means in accordance with the correspondence or non-correspondence of the positions of arrest of the slave machine differential actuators with the setting of the memory means of corresponding orders.

4. Accounting apparatus comprising a master accounting machine and a slave machine, each machine having a means to drive it through cycles of operation, a corresponding plural order series of differential actuators each movable between a normal position and any of a series of differential positions, means driven by the drive means of the respective machine to advance its differential actuators to differential position and again return them to normal position in a cycle of operation of the respective machine, differential stop means to arrest the differential actuators of the respective machine in any selected ones of their differential positions, and a static memory means for each said differential actuator settable under control of the drive means of the respective machine in accordance with the differential position in which said differential actuator is arrested, said apparatus further comprising cycle-initiating electrical circuit means operable under control of the drive means of the master machine at a predetermined time in a selected cycle of operation thereof to initiate a cycle of operation of the slave machine, indexing electrical circuit means controlled by the static memory means of the master machine to operate the differential stop means of the slave machine to arrest the differential actuators of the latter in differential positions determined by the setting of said memory means, comparing circuit means governed by the memory means of both machines and by the drive means of the slave machine in the cycle of operation of the latter, and means governed by said comparing circuit means to disable the drive means of the master machine upon non-correspondence of the settings of the memory means of both machines.

5. Accounting apparatus comprising a master accounting machine and a slave machine, each machine having a means to drive it through cycles of operation, a corresponding plural order series of differential actuators each movable between a normal position and any of a series of differential positions, means driven by the drive means of the respective machine to advance its differential actuators to differential position and again return them to normal position in a cycle of operation of the respective machine, differential stop means to arrest the differential actuators of the respective machine in any selected ones of their differential positions, and a static memory means for each said differential actuator settable under control of the drive means of the respective machine in accordance with the differential position in which said differential actuator is arrested, said slave machine having recording means including recording elements indexable by the slave machine differential actuators and elements operable to effect recording by said indexable recording elements, said apparatus further comprising cycle-initiating electrical circuit means operable under control of the drive means of the master machine at a predetermined time in a selected cycle of operation thereof to initiate a cycle of operation of the slave machine, indexing electrical circuit means controlled by the static memory means of the master machine to operate the differential stop means of the slave machine to arrest the differential actuators of the latter in differential positions determined by the setting of said memory means, comparing circuit means governed by the memory means of both machines and by the drive means of the slave machine in the cycle of operation of the latter, and means governed by said comparing circuit means to prevent recording operation of said operable elements of the slave machine recording means upon non-correspondence of the settings of the memory means of both machines.

6. Apparatus according to claim 5, having means operable by at least some of the master machine differential actuators in dependence upon movement of said actuators to or beyond predetermined differential positions, and means governed by said last means and governing said comparing circuit means to render said preventing means effective.

7. Apparatus according to claim 5, having no-value detecting circuit means including elements controlled by the master machine differential actuators in accordance with their remaining in or moving from their normal positions, and wherein said comparing circuit includes elements governed by said no-value detecting circuit means to cause said comparing circuit means to render said preventing means effective in a slave machine cycle initiated in a master machine cycle in which at least predetermined ones of the master machine differential actuators remained in their normal positions.

8. Apparatus according to claim 5, having no-value detecting means including elements controlled by the master machine differential actuators in accordance with their remaining in or moving from their normal positions, and wherein said comparing circuit includes elements governed by said no-value detecting circuit means to cause said comparing circuit means to render said preventing means effective in a slave machine cycle initiated in a master machine cycle in which at least predetermined ones of the master machine differential actuators remained in their normal positions, and means controlled by said preventing means and effective, when said preventing means is effective, to disable the drive means of the master machine from driving the latter through a further cycle of operation.

9. Apparatus according to claim 5, wherein the master machine has a computing mechanism adapted to reach positive total and negative total conditions, said apparatus having circuit means including elements controlled by said computing mechanism in accordance with its positive or negative total condition and means governed by said elements and governing said comparing circuit means to render said preventing means effective.

10. Apparatus according to claim 5, wherein the master machine has a computing mechanism adapted to reach positive total and negative total conditions, said apparatus having circuit means including elements controlled by said computing mechanism in accordance with its positive or negative total condition and means governed by said elements and governing said comparing circuit means to render said preventing means effective, and means controlled by said preventing means and effective, when said preventing means is effective, to disable the drive means of the master machine from driving the latter through a further cycle of operation.

11. Apparatus according to claim 5, wherein the slave machine has form positioning means associated with its recording means, form feeding means to feed forms to said positioning means, and at least one switch controlling said comparing circuit and having an operating member located for engagement by a correctly positioned form for operating said switch.

12. Account apparatus comprising a master accounting machine and a slave machine, each machine having a means to drive it through cycles of operation, a corresponding plural order series of differential actuators each movable between a normal position and any of a series of differential positions, the number of differential positions of the slave machine differential actuators being equal to the number of differential positions of the master machine differential actuators plus one extra differential position, means driven by the drive means of the respective machine to advance its differential actuators to differential position and again return them to normal position in a cycle of operation of the respective machine, and differential stop means to arrest the differential actuators of the respective machine in any selected ones of their differential positions, said slave machine having recording means including recording elements indexable by the slave machine differential actuators, said apparatus further comprising a static memory means for each of said differential actuators of the master machine settable under control of the drive means of the respective machine in accordance with the differential position in which said differential actuator is arrested, normal position detecting circuit elements for each differential actuator of the master machine and controlled by said differential actuator in accordance with its remaining in or moving from its normal position, cycle-initiating electrical circuit means operable under control of the drive means of the master machine at a predetermined time in a selected cycle of operation thereof to initiate a cycle of operation of the slave machine, and indexing electrical circuit means controlled by said static memory means to operate the differential stop means of the slave machine to arrest the differential actuators of the latter in differential positions determined by the setting of said memory means, said indexing circuit means including, for the slave machine differential stop means of each order within a predetermined range of orders, circuit means controlled by said normal position detecting circuit elements of all higher orders and, when the differential actuator of the same order of the master machine has remained in normal position, varying the control of the last-mentioned stop means to hold the slave machine differential actuator of said order in its normal position or permit it to move to said extra differential position in dependence upon any or no differential actuator of higher order of the master machine having moved from normal position.

13. Apparatus according to claim 12, wherein said indexable recording elements are type bars having both "O" and safe-guard printing character types, one of which types is indexed to printing position when the associated differential actuator of the slave machine moves to said extra differential position and the other of which types is indexed to printing position when said differential actuator is held in its normal position in a cycle of operation of the slave machine.

14. Accounting apparatus comprising in combination, a master accounting machine having a cyclically operable drive means, a plural order series of differential actuators driven by said drive means to any of a series of differential positions in a cycle of operation of said machine, means to arrest said actuators in selected differential positions, and, for each differential actuator, a read-out switch means comprising a first contact means including a series of contacts corresponding to the differential positions of said actuators and a second contact means engageable selectively with the contacts of said series, at least one of said contact means being settable under control of said actuator while the latter is in differential position, and a slave machine having a cyclically operable drive means, a like plural order series of differential actuators driven by said drive means to any of a series of differential positions in a cycle of operation of said slave machine, electrically energizable stop means for each of said differential actuators operable to arrest the slave machine differential actuators in differential positions, a control switch means comprising a first contact means including a series of contacts corresponding to different ones of the differential positions of the slave machine differential actuators and a second contact means engageable with the contacts of said series, means operable by said sleeve machine drive means to move one of said contact means of said control switch means in measured relation to the advance of the slave machine differential actuators to differential positions, an electrical power supply means, and circuit means for each of said plurality of orders connecting said electrically energizable stop means for the differential actuator of corresponding order of the slave machine with one side of said power supply and with said second contact means of the read-out switch means for the differential actuator of corresponding order of the master machine, connecting the contacts of the first contact means of said read-out switch means with corresponding contacts of the first contact means of said control switch means, and connecting the second contact means of said control switch means with the other side of said power supply, whereby each said stop means is operated in the slave machine cycle to arrest the associated differential actuator of the slave machine as it reaches that one of its differential positions determined by the selected position of arrest of the differential actuator of corresponding order of the master machine at the time of setting of said read-out switch means.

15. Accounting apparatus according to claim 14, wherein the slave machine is provided with means operable to initiate a cycle of operation of said machine by its drive means, and said apparatus is further provided with electrical circuit means for operating said cycle initiating means and governed by the master machine drive means to become effective to initiate a cycle of operation of the slave machine at a predetermined time in a cycle of operation of the master machine.

16. Accounting apparatus according to claim 14, wherein the master machine has a recording means including a carriage movable to any of a plurality of columnar positions, and the slave machine has means operable to initiate a cycle of operation of the latter machine by its drive means, said apparatus also having circuit means to operate said cycle initiating means and governed by the master machine drive means and carriage and thereby rendered effective at a predetermined time in a master machine cycle initiated with said carriage in a predetermined columnar position to initiate a cycle of operation of the slave machine.

17. Accounting apparatus comprising in combination, a master accounting machine having a cyclically operable drive means, a plural order series of differential actuators driven by said drive means to any of a series of differential positions in a cycle of operation of said machine, means to arrest said actuators in selected differential positions, and, for each differential actuator, a read-out switch means comprising a first contact means including a series of contacts corresponding to the differential positions of said actuators and a second contact means engageable selectively with the contacts of said series, at least one of said contact means being settable under control of said actuator while the latter is in differential position, and a slave machine having a cyclically operable drive means, a like plural order series of differential actuators driven by said drive means to any of a series of differential positions in a cycle of operation of said slave machine, recording means comprising a like plural order series of indexable recording elements, indexing means operable by the differential actuators of said slave machine to index the respective recording elements in accordance with the differential positioning of the differential actuators of corresponding order, electrically energizable stop means for each of said differential actuators operable to arrest the slave machine differential actuators in differential positions, a control switch means comprising a first contact means including a series of contacts corresponding to different ones of the differential positions of the slave machine differential actuators and a second contact means engageable with the contacts of said series, means operable by said slave machine drive means to operate one of said contact means of said control switch means progressively relative to successive contacts of its first contact means in measured relation to the advance of the slave machine differential actuators to differential positions, an electrical power supply means, and circuit means for each of said plurality of orders connecting said electrically energizable stop means for the differential actuator of corresponding order of the slave machine with one side of said power supply and with said second contact means of the read-out switch means for the differential actuator of corresponding order of the master machine, connecting the contacts of the first contact means of said read-out switch means with corresponding contacts of the first contact means of said control switch means, and connecting the second contact means of said control switch means with the other side of said power supply, whereby said stop means is operated in the slave machine cycle to arrest the associated differential actuator of the slave machine as it reaches that one of its differential positions determined by the selected position of arrest of the differential actuator of corresponding order of the master machine at the time of setting of said read-out switch means, and to correspondingly index the recording element of corresponding order of the slave machine.

18. Accounting apparatus comprising in combination, a master accounting machine having a cyclically operable drive means, a plural order series of differential actuators driven by said drive means to any of a series of differential positions in a cycle of operation of said machine, means to arrest said actuators in selected differential positions, and, for each differential actuator, a read-out switch means comprising a first contact means including a series of contacts corresponding to the differential positions of said actuators and a second contact means engageable selectively with the contacts of said series, at least one of said contact means being settable under control of said actuator while the latter is in differential position, and a slave machine having a cyclically operable drive means, a like plural order series of differential actuators driven by said drive means to any of a series of differential positions in a cycle of operation of said slave machine, electrically energizable stop means for each of said differential actuators operable to arrest the slave machine differential actuators in differential positions, a control switch means comprising a first contact means including a series of contacts corresponding to different ones of the differential positions of the slave machine differential actuators and a second contact means engageable with the contacts of said series, means operable by said slave machine drive means to operate one of said contact means of said control switch means progressively relative to successive contacts of its first contact means in measured relation to the advance of the slave machine differential actuators to differential positions, an electrical power supply means, proof switch means for each of the slave machine differential actuators comprising a first contact means including a series of contacts corresponding to the differential positions of said differential actuator and a second contact means engageable selectively with the contacts of said series, one of which contact means is settable under control of said differential actuator of the slave machine while said differential actuator is in differential position, circuit means individually connecting each contact of said first contact means of the read-out switch means for each order with the corresponding contact of the first contact means of the proof switch means of corresponding order, circuit converting means, including switch means having two alternate conditions, and which, with its switch means in one of its conditions, connects the electrically energizable stop means of the respective orders to one side of said power supply and with said second contact means of the read-out switch means for the differential actuator of corresponding order of the master machine, connects the contacts of the first contact means of said read-out switch means with corresponding contacts of the first contact means of said control switch means, and connects the second contact means of said control switch means with the other side of said power supply, whereby said stop means is operated in the slave machine cycle to arrest the associated differential actuator of the slave machine as it reaches that one of its differential positions determined by the selected position of arrest of the differential actuator of corresponding order of the master machine at the time of setting of said read-out switch means, and means controlled by said slave machine drive means to operate said circuit converting switch means from said one of its conditions to the other of its conditions at a predetermined time while the differential actuators of the slave machine are in differential positions and after said proof switch means have been set accordingly, electrically operable circuit continuity detecting means, said circuit converting means, with its switch means in said other of its conditions, connecting the second contact means of both said read-out switch means and said proof switch means for each order as a pair in a single circuit extending through all of said pairs of second contact means in series, and through said circuit continuity detecting means, from one side of said power supply to the other side thereof, whereby the condition of operation of said circuit continuity detecting means when said circuit converting switch means is in said other condition is determined by the presence or absence of correspondence of differential positioning of all of said slave machine differential actuators with the differential positioning of the differential actuators of corresponding order of the master machine at the time setting of said read-out switch means.

19. Accounting apparatus comprising in combination, a master accounting machine having a cyclically operable drive means, a plural order series of differential actuators driven by said drive means to any of a series of differential positions in a cycle of operation of said machine, means to arrest said actuators in selected differential positions, and, for each differential actuator, a read-out switch means comprising a first contact means including a series of contacts corresponding to the differential positions of said actuators and a second contact means engageable selectively with the contacts of said series, at least one of said contact means being settable under control of said actuator while the latter is in differential position, and a slave machine having a cyclically operable drive means, a like plural order series of differential actuators driven by said drive means to any of a series of differential positions in a cycle of operation of said slave machine, electrically energizable stop means for each of said differential actuators operable to arrest the slave machine differential actuators in differential positions, a control switch means comprising a first contact means including a series of contacts corresponding to different ones of the differential positions of the slave machine differential actuators and a second contact means engageable with the contacts of said series, means operable by said slave machine drive means to operate one of said contact means of said control switch means progressively relative to successive contacts of its first contact means in measured relation to the advance of the slave machine differential actuators to differential positions, an electrical power supply means, proof switch means for each of the slave machine differential actuators comprising a first contact means including a series of contacts corresponding to the differential positions of said differential actuator and a second contact means engageable selectively with the contacts of said series, one of which contact means is settable under control of said differential actuator of the slave machine while said differential actuator is in differential position, circuit means individually connecting each contact of said first contact means of the read-out switch means for each order with the corresponding contact of the first contact means of the proof switch means of corresponding order, circuit converting means including switch means having two alternate conditions, and which, with its switch means in one of its conditions, connects the electrically energizable stop means of the respective orders to one side of said power supply and with said second contact means of the read-out switch means for the differential actuator of corresponding order of the master machine, connects the contacts of the first contact means of said read-out switch means with corresponding contacts of the first contact means of said control switch means, and connects the second contact means of said control switch means with the other side of said power supply, whereby said stop means is operated in the slave machine cycle to arrest the associated differential actuator of the slave machine as it reaches that one of its differential positions determined by the selected position of arrest of the differential actuator of corresponding order of the master machine at the time of setting of said read-out switch means, and means controlled by said slave machine drive means to operate said circuit converting switch means at a predetermined time in the slave machine cycle from said one of its conditions to the other of its conditions, electrically operable circuit continuity detecting means, said circuit converting means, with its switch means in said other of its conditions, connecting the second contact means of both said read-out switch means and said proof switch means for each order in a circuit extending across said power supply and including said circuit continuity detecting means, whereby the condition of operation of said circuit continuity detecting means when said circuit converting switch means is in said other condition is determined by the correspondence or non-correspondence of differential positioning of all of said slave machine differential actuators with the differential positioning of the differential actuators of corresponding order of the master machine at the time setting of said read-out switch means.

20. Accounting apparatus according to claim 19, having means to disable the drive means of the master machine and circuit means controlled by said circuit continuity detecting means and governing said disabling means.

21. Accounting apparatus according to claim 19, wherein the slave machine has recording means including elements indexable by the slave machine differential actuators and elements operable to effect recording by said indexable elements, means to prevent recording operation of said operable elements, and circuit means controlled by said circuit continuity detecting means and governing said preventing means.

22. Accounting apparatus according to claim 19, wherein the slave machine has recording means including elements indexable by the slave machine differential actuators and elements operable to effect recording by said indexable elements, means to prevent recording operation of said operable elements, and circuit means controlled by said circuit continuity detecting means and governing said preventing means, the master machine is provided with means to disable its drive means, and circuit means controlled by said preventing means governs said disabling means.

References Cited in the file of this patent

UNITED STATES PATENTS

| | | |
|---|---|---|
| 997,983 | Foote | July 18, 1911 |
| 1,005,555 | Kettering | Oct. 10, 1911 |
| 2,018,420 | Robinson et al. | Oct. 22, 1935 |
| 2,165,556 | Lasker et al. | July 11, 1939 |

U. S. DEPARTMENT OF COMMERCE
PATENT OFFICE

CERTIFICATE OF CORRECTION

Patent No. 2,812,902

November 12, 1957

Byron A. Runde et al.

It is hereby certified that error appears in the printed specification of the above numbered patent requiring correction and that the said Letters Patent should read as corrected below.

Column 4, line 45, before "3503" insert --3502 and--; line 46, for "opposite" read --opposite--; column 5, line 65, for "with" read --which--; column 12, line 38, for "3362" read --3662--; column 23, line 51, strike out "limits"; line 52, strike out "and"; column 27, line 36, for "deluction" read --deduction--; column 30, line 18, after "corrected" and before the period insert --is avoided--; column 33, line 45, for "eigth" read --eighth--; column 34, line 9, for "correspondnig" read --corresponding--; column 38, line 24, for "different" read --differential--; same column 38, line 72 and column 41, line 10, for "Account", each occurrence, read --Accounting--; column 42, line 15, for "sleeve" read --slave--.

Signed and sealed this 8th day of April 1958.

(SEAL)
Attest:

KARL H. AXLINE

Attesting Officer

ROBERT C. WATSON
Commissioner of Patents